United States Patent
Wilson et al.

(10) Patent No.: US 9,449,336 B2
(45) Date of Patent: *Sep. 20, 2016

(54) APPARATUS AND METHOD FOR PROVIDING HARMONIZED RECOMMENDATIONS BASED ON AN INTEGRATED USER PROFILE

(71) Applicant: NARA LOGICS, INC., Cambridge, MA (US)

(72) Inventors: Nathan R. Wilson, Cambridge, MA (US); Luyao Li, Cambridge, MA (US); Emily A. Hueske, Cambridge, MA (US); Eleanor C. Kenyon, Cambridge, MA (US); Thomas C. Copeman, Boston, MA (US)

(73) Assignee: NARA LOGICS, INC., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/657,797

(22) Filed: Mar. 13, 2015

(65) Prior Publication Data

US 2015/0186951 A1 Jul. 2, 2015

Related U.S. Application Data

(63) Continuation of application No. 14/255,712, filed on Apr. 17, 2014, now Pat. No. 9,009,088, which is a continuation of application No. 13/842,665, filed on Mar. 15, 2013, now Pat. No. 8,732,101.

(51) Int. Cl.
*G06F 15/00* (2006.01)
*G06F 15/18* (2006.01)
(Continued)

(52) U.S. Cl.
CPC ..... *G06Q 30/0269* (2013.01); *G06F 17/30867* (2013.01); *G06N 3/063* (2013.01); *G06Q 30/0631* (2013.01); *G06Q 50/01* (2013.01)

(58) Field of Classification Search
CPC .. G06F 17/30867; G06F 15/00; G06F 15/18; G06N 3/063; G06Q 30/0269; G06Q 30/0631; G06Q 50/01; G06Q 10/06395; G06Q 30/02; G06Q 10/0204; G06Q 10/06375; G06Q 30/0203

See application file for complete search history.

(56) References Cited

U.S. PATENT DOCUMENTS

| | | |
|---|---|---|
| 5,819,245 A | 10/1998 | Peterson et al. |
| 6,012,051 A | 1/2000 | Sammon, Jr. et al. |

(Continued)

FOREIGN PATENT DOCUMENTS

| | | |
|---|---|---|
| EP | 2207348 A2 | 1/2009 |
| WO | WO0039725 A2 | 7/2000 |

(Continued)

OTHER PUBLICATIONS

ISR issued Feb. 12, 2014 in PCT/US13/57136, filed Aug. 28, 2013.

(Continued)

*Primary Examiner* — Kakali Chaki
*Assistant Examiner* — Peter Coughlan
(74) *Attorney, Agent, or Firm* — Oblon, McClelland, Maier & Neustadt, L.L.P.

(57) ABSTRACT

In certain implementations, a system may receive attribute data corresponding to attributes of a plurality of users and to one or more venues for which the plurality of users has an affinity. A user personality matrix may be calculated for one or more of the plurality of users based on interrelational nodal link strengths between the one or more users and the venues. The user personality matrices may be merged to calculate a combined personality matrix representing a unified taste profile for the one or more users. A candidate list of venues having the highest link strength with the combined personality matrix may be determined. One or more recommended venues from the candidate list of venues that have the strongest links to the combined personality matrix may be determined, and recommendation data corresponding to the recommended venues may be output.

25 Claims, 43 Drawing Sheets

(51) Int. Cl.
*G06Q 30/02* (2012.01)
*G06F 17/30* (2006.01)
*G06Q 30/06* (2012.01)
*G06Q 50/00* (2012.01)
*G06N 3/063* (2006.01)

(56) References Cited

U.S. PATENT DOCUMENTS

| | | |
|---|---|---|
| 6,041,311 A | 3/2000 | Chislenko et al. |
| 6,112,186 A | 8/2000 | Bergh et al. |
| 6,247,001 B1 | 6/2001 | Tresp et al. |
| 6,266,668 B1 | 7/2001 | Vanderveldt et al. |
| 6,404,424 B1 | 6/2002 | Davis |
| 6,408,288 B1 | 6/2002 | Ariyoshi |
| 6,412,012 B1 | 6/2002 | Bieganski et al. |
| 6,460,060 B1 | 10/2002 | Maddalozzo, Jr. et al. |
| 6,487,541 B1 | 11/2002 | Aggarwal et al. |
| 6,556,211 B2 | 4/2003 | Davis |
| 6,757,691 B1 | 6/2004 | Welsh et al. |
| 6,775,664 B2 | 8/2004 | Lang et al. |
| 6,782,375 B2 | 8/2004 | Abdel-Moneim et al. |
| 6,865,565 B2 | 3/2005 | Rainsberger et al. |
| 6,988,109 B2 | 1/2006 | Stanley et al. |
| 7,069,256 B1 | 6/2006 | Campos |
| 7,080,052 B2 | 7/2006 | Busche |
| 7,102,067 B2 | 9/2006 | Gang et al. |
| 7,113,917 B2 | 9/2006 | Jacobi et al. |
| 7,155,401 B1 | 12/2006 | Cragun et al. |
| 7,328,216 B2 | 2/2008 | Hofmann et al. |
| 7,366,707 B2 | 4/2008 | De Lacharriere et al. |
| 7,389,201 B2 | 6/2008 | Chickering et al. |
| 7,392,231 B2 | 6/2008 | Basak et al. |
| 7,412,042 B2 | 8/2008 | Henry |
| 7,437,368 B1 | 10/2008 | Kolluri et al. |
| 7,505,962 B2 | 3/2009 | Shariff et al. |
| 7,542,951 B1 | 6/2009 | Chakrabarti et al. |
| 7,584,159 B1 | 9/2009 | Chakrabarti et al. |
| 7,624,095 B2 | 11/2009 | Majumder |
| 7,657,493 B2 | 2/2010 | Meijer et al. |
| 7,657,523 B2 | 2/2010 | Ebanks |
| 7,660,459 B2 | 2/2010 | Busche |
| 7,734,609 B2 | 6/2010 | Manfredi et al. |
| 7,743,067 B2 | 6/2010 | Ducheneaut et al. |
| 7,756,753 B1 | 7/2010 | McFarland |
| 7,792,761 B2 | 9/2010 | Murakami et al. |
| 7,813,965 B1 | 10/2010 | Robinson et al. |
| 7,885,986 B2 | 2/2011 | Anderson et al. |
| 7,890,871 B2 | 2/2011 | Etkin |
| 7,904,530 B2 | 3/2011 | Partridge et al. |
| 7,908,183 B2 | 3/2011 | Jacobi et al. |
| 7,953,673 B2 | 5/2011 | Augusto et al. |
| 7,958,066 B2 | 6/2011 | Pinckney et al. |
| 7,958,079 B2 | 6/2011 | Fogel et al. |
| 7,966,282 B2 | 6/2011 | Pinckney et al. |
| 7,991,841 B2 | 8/2011 | Anderson et al. |
| 7,996,255 B1 | 8/2011 | Shenoy et al. |
| 8,010,470 B2 | 8/2011 | Jackson |
| 8,019,707 B2 | 9/2011 | Shani et al. |
| 8,019,743 B2 | 9/2011 | Ebanks |
| 8,032,425 B2 | 10/2011 | Yi |
| 8,032,480 B2 | 10/2011 | Pinckney et al. |
| 8,032,481 B2 | 10/2011 | Pinckney et al. |
| 8,090,625 B2 | 1/2012 | Yi |
| 8,091,032 B2 | 1/2012 | Fischer |
| 8,095,153 B2 | 1/2012 | Jenkins et al. |
| 8,095,432 B1 | 1/2012 | Berman et al. |
| 8,108,414 B2 | 1/2012 | Stackpole |
| 8,108,501 B2 | 1/2012 | Birnie et al. |
| 8,145,661 B1 | 3/2012 | Billman et al. |
| 8,166,013 B2 | 4/2012 | Bandaru et al. |
| 8,170,971 B1 | 5/2012 | Wilson et al. |
| 8,185,487 B2 | 5/2012 | Tuzhilin et al. |
| 8,234,150 B1 | 7/2012 | Pickton et al. |
| 8,234,151 B1 | 7/2012 | Pickton et al. |
| 8,234,688 B2 | 7/2012 | Grandison et al. |
| 8,244,721 B2 | 8/2012 | Morris et al. |
| 8,249,941 B2 | 8/2012 | Saul et al. |
| 8,250,096 B2 | 8/2012 | Su et al. |
| 8,271,352 B2 | 9/2012 | Lifson |
| 8,290,964 B1 | 10/2012 | Guha |
| 8,315,953 B1 | 11/2012 | Hansen et al. |
| 8,316,000 B2 | 11/2012 | Srivastava et al. |
| 8,333,316 B2 | 12/2012 | Heath et al. |
| 8,341,111 B2 | 12/2012 | Patil et al. |
| 8,364,528 B2 | 1/2013 | Selinger et al. |
| 8,380,639 B2 | 2/2013 | Aleong et al. |
| 8,386,406 B2 | 2/2013 | Bolivar et al. |
| 8,417,698 B2 | 4/2013 | Yoo |
| 8,423,323 B2 | 4/2013 | Bonabeau |
| 8,429,106 B2 | 4/2013 | Downs et al. |
| 8,429,160 B2 | 4/2013 | Osann |
| 8,442,891 B2 | 5/2013 | Mendelsohn |
| 8,447,760 B1 | 5/2013 | Tong et al. |
| 8,452,865 B1 | 5/2013 | Heller et al. |
| 8,468,155 B2 | 6/2013 | Sureka |
| 8,484,142 B2 | 7/2013 | Pinckney et al. |
| 8,484,226 B2 | 7/2013 | Elliott-Mccrea et al. |
| 8,489,515 B2 | 7/2013 | Mathur |
| 8,489,527 B2 | 7/2013 | Van Coppenolle et al. |
| 8,494,897 B1 | 7/2013 | Dawson |
| 8,494,946 B2 | 7/2013 | Lortscher, Jr. |
| 8,515,893 B2 | 8/2013 | Wilson et al. |
| 8,539,359 B2 | 9/2013 | Rapaport et al. |
| RE44,559 E | 10/2013 | Flinn et al. |
| 8,583,524 B2 | 11/2013 | Selinger et al. |
| 8,612,134 B2 | 12/2013 | Zheng et al. |
| 8,620,822 B2 | 12/2013 | Wiseman et al. |
| 8,621,563 B2 | 12/2013 | Sathish |
| 8,635,167 B2 | 1/2014 | Buckwalter et al. |
| 8,644,688 B2 | 2/2014 | Fishman et al. |
| 8,661,050 B2 | 2/2014 | Varshavsky et al. |
| 8,666,844 B2 | 3/2014 | Shaya et al. |
| 8,756,187 B2 | 6/2014 | Wilson et al. |
| 8,909,583 B2 | 12/2014 | Wilson et al. |
| 8,972,314 B2 | 3/2015 | Pinckney et al. |
| 8,972,394 B1 | 3/2015 | Tong et al. |
| 8,977,612 B1 | 3/2015 | Tong et al. |
| 9,037,531 B2 | 5/2015 | Pinckney et al. |
| 9,159,034 B2 | 10/2015 | Pinckney et al. |
| 9,183,504 B2 | 11/2015 | Moore et al. |
| 2002/0055890 A1 | 5/2002 | Foley |
| 2002/0116458 A1 | 8/2002 | Bricklin et al. |
| 2003/0025694 A1 | 2/2003 | Davis |
| 2003/0061607 A1 | 3/2003 | Hunter et al. |
| 2004/0044677 A1 | 3/2004 | Huper-Graff et al. |
| 2004/0172267 A1 | 9/2004 | Patel et al. |
| 2005/0120052 A1 | 6/2005 | Miller et al. |
| 2005/0243784 A1 | 11/2005 | Fitzgerald et al. |
| 2006/0106655 A1 | 5/2006 | Lettovsky et al. |
| 2006/0229932 A1 | 10/2006 | Zollo et al. |
| 2007/0060114 A1 | 3/2007 | Ramer et al. |
| 2007/0244747 A1 | 10/2007 | Nikovski |
| 2008/0010258 A1 | 1/2008 | Sureka |
| 2008/0045236 A1 | 2/2008 | Nahon et al. |
| 2008/0059284 A1 | 3/2008 | Solotorevsky et al. |
| 2008/0059455 A1 | 3/2008 | Canoy et al. |
| 2008/0097821 A1 | 4/2008 | Chickering et al. |
| 2008/0183678 A1 | 7/2008 | Weston et al. |
| 2008/0214204 A1 | 9/2008 | Ramer et al. |
| 2008/0215610 A1 | 9/2008 | De Lacharriere et al. |
| 2008/0222064 A1 | 9/2008 | Larimer |
| 2008/0319935 A1 | 12/2008 | Chandak |
| 2009/0106040 A1 | 4/2009 | Jones |
| 2009/0210246 A1 | 8/2009 | Patel et al. |
| 2009/0210475 A1 | 8/2009 | Gadanho et al. |
| 2009/0216563 A1 | 8/2009 | Sandoval et al. |
| 2009/0216626 A1 | 8/2009 | Lund |
| 2009/0222322 A1 | 9/2009 | Anderson et al. |
| 2009/0234876 A1 | 9/2009 | Schigel et al. |
| 2009/0240676 A1 | 9/2009 | Gruen et al. |
| 2009/0287687 A1 | 11/2009 | Martire et al. |
| 2009/0300008 A1 | 12/2009 | Hangartner et al. |
| 2009/0307238 A1 | 12/2009 | Sanguinetti et al. |
| 2009/0327181 A1 | 12/2009 | Lee et al. |

(56) References Cited

U.S. PATENT DOCUMENTS

| | | |
|---|---|---|
| 2010/0030569 A1 | 2/2010 | Okano et al. |
| 2010/0030578 A1 | 2/2010 | Siddique et al. |
| 2010/0058224 A1 | 3/2010 | Chai et al. |
| 2010/0076968 A1 | 3/2010 | Boyns et al. |
| 2010/0082516 A1 | 4/2010 | Basu et al. |
| 2010/0088649 A1 | 4/2010 | Kemp |
| 2010/0145770 A1 | 6/2010 | Hanson et al. |
| 2010/0145771 A1 | 6/2010 | Figler et al. |
| 2010/0169160 A1 | 7/2010 | Wu et al. |
| 2010/0205541 A1* | 8/2010 | Rapaport ............... G06Q 10/10 715/753 |
| 2010/0210364 A1 | 8/2010 | York et al. |
| 2010/0217730 A1 | 8/2010 | Zhao et al. |
| 2010/0223093 A1 | 9/2010 | Hubbard |
| 2010/0250337 A1 | 9/2010 | Kassaei |
| 2010/0262556 A1 | 10/2010 | Shaya et al. |
| 2010/0262658 A1 | 10/2010 | Mesnage |
| 2010/0268574 A1 | 10/2010 | Butcher et al. |
| 2010/0268661 A1 | 10/2010 | Levy et al. |
| 2010/0287282 A1 | 11/2010 | MacLaughlin |
| 2010/0312644 A1 | 12/2010 | Borgs et al. |
| 2010/0312724 A1 | 12/2010 | Pinckney et al. |
| 2010/0325205 A1 | 12/2010 | Murphy et al. |
| 2011/0016001 A1 | 1/2011 | Schieffelin |
| 2011/0071969 A1 | 3/2011 | Doctor et al. |
| 2011/0087661 A1 | 4/2011 | Quick et al. |
| 2011/0099122 A1 | 4/2011 | Bright et al. |
| 2011/0112976 A1 | 5/2011 | Ryan et al. |
| 2011/0153528 A1 | 6/2011 | Bailey et al. |
| 2011/0178839 A1 | 7/2011 | Adra |
| 2011/0201317 A1 | 8/2011 | Karandikar et al. |
| 2011/0207440 A1 | 8/2011 | Ruuspakka et al. |
| 2011/0208822 A1 | 8/2011 | Rathod |
| 2011/0213661 A1 | 9/2011 | Milana et al. |
| 2011/0238608 A1 | 9/2011 | Sathish |
| 2011/0270774 A1 | 11/2011 | Varshavsky et al. |
| 2011/0302117 A1 | 12/2011 | Pinckney et al. |
| 2011/0307327 A1 | 12/2011 | Bixby et al. |
| 2011/0307478 A1 | 12/2011 | Pinckney et al. |
| 2012/0005016 A1 | 1/2012 | Graff |
| 2012/0005201 A1 | 1/2012 | Ebanks |
| 2012/0030198 A1 | 2/2012 | Beck et al. |
| 2012/0066072 A1 | 3/2012 | Kanigsberg et al. |
| 2012/0089328 A1 | 4/2012 | Ellanti et al. |
| 2012/0089623 A1 | 4/2012 | Sobotka et al. |
| 2012/0095862 A1 | 4/2012 | Schiff et al. |
| 2012/0095863 A1 | 4/2012 | Schiff et al. |
| 2012/0109749 A1 | 5/2012 | Subramanian et al. |
| 2012/0130976 A1 | 5/2012 | Cone et al. |
| 2012/0136852 A1 | 5/2012 | Geller |
| 2012/0158720 A1 | 6/2012 | Luan et al. |
| 2012/0166232 A1 | 6/2012 | Neubardt |
| 2012/0166432 A1 | 6/2012 | Tseng |
| 2012/0166960 A1 | 6/2012 | Salles |
| 2012/0173324 A1 | 7/2012 | Vallery et al. |
| 2012/0185262 A1 | 7/2012 | Dalesandro et al. |
| 2012/0185481 A1 | 7/2012 | Björk et al. |
| 2012/0190386 A1 | 7/2012 | Anderson |
| 2012/0303415 A1 | 11/2012 | Edelson |
| 2012/0303569 A1 | 11/2012 | Tuzhilin et al. |
| 2012/0303676 A1 | 11/2012 | Tuzhilin et al. |
| 2012/0323725 A1 | 12/2012 | Johnston et al. |
| 2013/0013595 A1 | 1/2013 | Tseng et al. |
| 2013/0024449 A1 | 1/2013 | Chatterji et al. |
| 2013/0024456 A1 | 1/2013 | Goodson et al. |
| 2013/0024464 A1 | 1/2013 | Berner et al. |
| 2013/0024465 A1 | 1/2013 | Schiff et al. |
| 2013/0024471 A1 | 1/2013 | Mitrovic |
| 2013/0041896 A1 | 2/2013 | Ghani et al. |
| 2013/0054407 A1 | 2/2013 | Sabur |
| 2013/0054662 A1 | 2/2013 | Coimbra |
| 2013/0054698 A1 | 2/2013 | Lee et al. |
| 2013/0060744 A1 | 3/2013 | Roychoudhuri et al. |
| 2013/0066821 A1 | 3/2013 | Moore et al. |
| 2013/0066973 A1 | 3/2013 | Macadaan et al. |
| 2013/0073336 A1 | 3/2013 | Heath |
| 2013/0073422 A1 | 3/2013 | Moore et al. |
| 2013/0073473 A1 | 3/2013 | Heath |
| 2013/0080364 A1 | 3/2013 | Wilson et al. |
| 2013/0085844 A1 | 4/2013 | Neystadt et al. |
| 2013/0103667 A1 | 4/2013 | Minh |
| 2013/0117329 A1 | 5/2013 | Bank et al. |
| 2013/0124449 A1 | 5/2013 | Pinckney et al. |
| 2013/0138512 A1 | 5/2013 | Sandoval et al. |
| 2013/0159826 A1 | 6/2013 | Mason et al. |
| 2013/0173485 A1 | 7/2013 | Ruiz et al. |
| 2013/0198203 A1 | 8/2013 | Bates et al. |
| 2013/0218667 A1 | 8/2013 | Mohamed |
| 2013/0218713 A1 | 8/2013 | Gottfurcht et al. |
| 2013/0268468 A1 | 10/2013 | Vijayaraghavan et al. |
| 2013/0304691 A1 | 11/2013 | Pinckney et al. |
| 2014/0032325 A1 | 1/2014 | Weiss et al. |
| 2014/0058990 A1 | 2/2014 | Benson et al. |
| 2014/0059213 A1 | 2/2014 | Ollikainen et al. |
| 2014/0067901 A1 | 3/2014 | Shaw et al. |
| 2014/0129371 A1 | 5/2014 | Wilson et al. |
| 2014/0279196 A1 | 9/2014 | Wilson et al. |
| 2014/0358836 A1 | 12/2014 | Moore et al. |
| 2015/0127585 A1 | 5/2015 | Pinckney et al. |
| 2015/0127586 A1 | 5/2015 | Pinckney et al. |
| 2015/0127587 A1 | 5/2015 | Pinckney et al. |
| 2015/0127597 A1 | 5/2015 | Pinckney et al. |
| 2015/0127598 A1 | 5/2015 | Pinckney et al. |
| 2015/0142711 A1 | 5/2015 | Pinckney et al. |
| 2015/0278225 A1 | 10/2015 | Weiss et al. |

FOREIGN PATENT DOCUMENTS

| | | |
|---|---|---|
| WO | WO0133410 A2 | 5/2001 |
| WO | WO0137193 A1 | 5/2001 |
| WO | WO02097701 A1 | 12/2002 |
| WO | WO2009111211 A2 | 9/2009 |
| WO | WO2013049829 A1 | 4/2013 |

OTHER PUBLICATIONS

Written Opinion issued Feb. 12, 2014, in PCT/US13/57136, filed Aug. 28, 2013.

ISR issued Dec. 17, 2012 in PCT/US12/57780.

Written Opinion issued in PCT/US12/57780 on Dec. 17, 2012.

Yu, Shijun., Contextualized and Personalized Location-based Services. BSc in Computer Science and Technology, Norther Jiaotong University, Chine et de nationalite chinoise, 2008.

"Elements of Artificial Neural Networks", Mehrotra, 1998 MIT Press.

Koren, Yehuda et al.; "Matrix Factorization Techniques for Recommender Systems"; 2009; IEEE; pp. 30-37.

Koren, Yehuda et al.; "Collaborative Filtering with Temporal Dynamics"; 2010; ACM; Communications of the ACM, vol. 53, No. 4; pp. 89-97.

Ricci, Francesco et al.; "Recommender Systems Handbook"; Oct. 29, 2010; Springer; 847 pages.

O'Dell, "Google Unveils Hotpot, a Recommendation Engine for Places," Mashable, Nov. 16, 2010, http://mashable.com/2010/11/15/google-hotspot/.3pp.

Extended European Search Report issued Mar. 14, 2016 in Patent Application No. 13852285.9.

\* cited by examiner

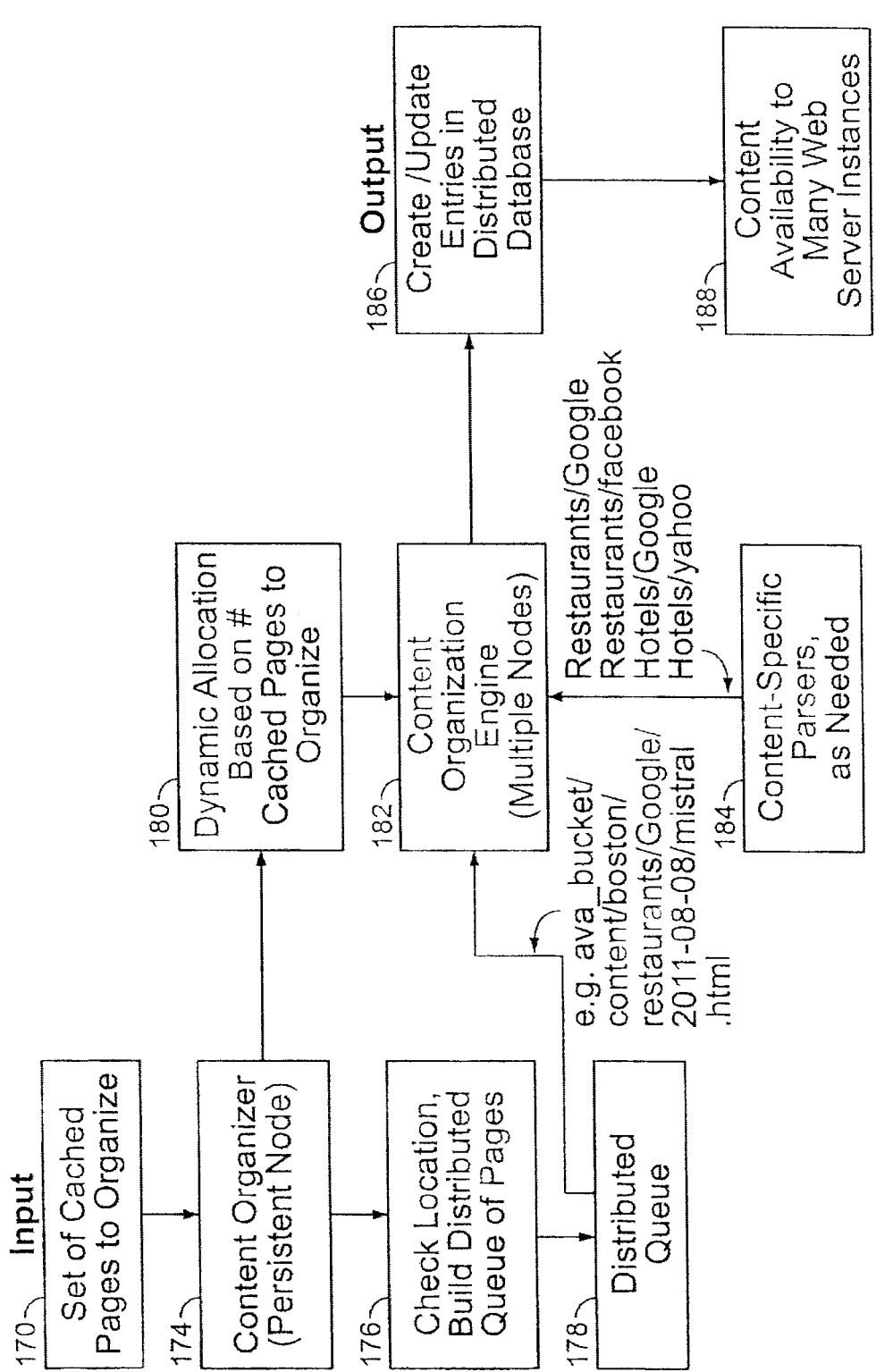

FIG. 3

| | Ratings (1-5 Stars) | | | | | | |
|---|---|---|---|---|---|---|---|
| | Reviewer 1 | Reviewer 2 | Reviewer 3 | Reviewer 4 | Reviewer 5 | Reviewer 6 | Reviewer 7 |
| Restaurant 1 | 2 | 4 | | 3 | | 2 | 3 |
| Restaurant 2 | | 2 | | 3 | | 2 | 3 |
| Restaurant 3 | 4 | 4 | 3 | 3 | 3 | 3 | |
| Restaurant 4 | 3 | 4 | 3 | | 3 | | |
| Restaurant 5 | 1 | | 1 | 4 | 5 | 1 | 1 |
| Restaurant 6 | | 5 | 5 | 3 | 2 | | |
| Restaurant 7 | 1 | | | 4 | 4 | 3 | 3 |
| Restaurant 8 | 4 | 1 | 1 | 2 | | 2 | 2 |
| Restaurant 9 | | | | 5 | 2 | | 4 |
| Restaurant 10 | 3 | 4 | 1 | | 1 | 3 | |
| Restaurant 11 | 1 | | 1 | | 3 | 3 | 4 |
| Restaurant 12 | 3 | 4 | 2 | 1 | 3 | 3 | 2 |

FIG. 4

| | Venue Attributes | | | | | | | |
|---|---|---|---|---|---|---|---|---|
| | City | State | Price | Genre | Hours of Operation | Attire | Neighborhood |
| Restaurant 1 | Boston | MA | 1 | Japanese | xxxxx | Casual | 02163 |
| Restaurant 2 | Boston | MA | 3 | Italian | xxxxx | Casual | 02196 |
| Restaurant 3 | Boston | MA | 5 | American | xxxxx | Casual | 02199 |
| Restaurant 4 | Boston | MA | 5 | Japanese | xxxxx | Casual | 02163 |
| Restaurant 5 | Boston | MA | 7 | Italian | xxxxx | Casual | 02196 |
| Restaurant 6 | Boston | MA | 2 | American | xxxxx | Casual | 02199 |
| Restaurant 7 | Boston | MA | 9 | Japanese | xxxxx | Formal | 02163 |
| Restaurant 8 | Boston | MA | 2 | Italian | xxxxx | Formal | 02196 |
| Restaurant 9 | Boston | MA | 4 | American | xxxxx | Formal | 02199 |
| Restaurant 10 | Boston | MA | 6 | Japanese | xxxxx | Formal | 02163 |
| Restaurant 11 | Boston | MA | 8 | Italian | xxxxx | Formal | 02196 |
| Restaurant 12 | Boston | MA | 2 | American | xxxxx | Formal | 02199 |

Reviewer Attributes

| | Gender | Age | Profession Code | Education Code | Marital Status Code | # of Children | # of Reviews | Review Accuracy |
|---|---|---|---|---|---|---|---|---|
| Reviewer 1 | F | 42 | xxxxx | xxxxx | xxxxx | 1 | 13 | 8 |
| Reviewer 2 | F | 26 | xxxxx | xxxxx | xxxxx | 2 | 23 | 9 |
| Reviewer 3 | F | 40 | xxxxx | xxxxx | xxxxx | 3 | 24 | 9 |
| Reviewer 4 | F | 60 | xxxxx | xxxxx | xxxxx | 2 | 32 | 9 |
| Reviewer 5 | M | 21 | xxxxx | xxxxx | xxxxx | 1 | 26 | 6 |
| Reviewer 6 | M | 30 | xxxxx | xxxxx | xxxxx | 4 | 30 | 2 |
| Reviewer 7 | M | 57 | xxxxx | xxxxx | xxxxx | 3 | 27 | 1 |

FIG. 5

User Attributes

| | Gender | Age | Profession | Education | Marital Status | # of Children | Favorite Venue 1 | Favorite Venue 2 | Favorite Venue 3 | Favorite Venue 4 |
|---|---|---|---|---|---|---|---|---|---|---|
| User 1 | M | 40 | xxxxx | xxxxx | xxxxx | 1 | xxxxx | xxxxx | xxxxx | xxxxx |
| User 2 | M | 30 | xxxxx | xxxxx | xxxxx | 1 | xxxxx | xxxxx | xxxxx | xxxxx |
| User 3 | M | 33 | xxxxx | xxxxx | xxxxx | 1 | xxxxx | xxxxx | xxxxx | xxxxx |
| User 4 | M | 54 | xxxxx | xxxxx | xxxxx | 0 | xxxxx | xxxxx | xxxxx | xxxxx |
| User 5 | F | 35 | xxxxx | xxxxx | xxxxx | 3 | xxxxx | xxxxx | xxxxx | xxxxx |
| User 6 | F | 34 | xxxxx | xxxxx | xxxxx | 2 | xxxxx | xxxxx | xxxxx | xxxxx |
| User 7 | F | 41 | xxxxx | xxxxx | xxxxx | 2 | xxxxx | xxxxx | xxxxx | xxxxx |

FIG. 6

Content-based Venue Links

| | Restaurant 1 | Restaurant 2 | Restaurant 3 | Restaurant 4 | Restaurant 5 | Restaurant 6 | Restaurant 7 | Restaurant 8 | Restaurant 9 | Restaurant 10 | Restaurant 11 | Restaurant 12 |
|---|---|---|---|---|---|---|---|---|---|---|---|---|
| Restaurant 1 | | | | | | | | | | | | |
| Restaurant 2 | +0.25 (same attire) | | | | | | | | | | | |
| Restaurant 3 | +0.25 (same attire) | +0.25 (same attire) | | | | | | | | | | |
| Restaurant 4 | +1.25 (same neighborhood), +1 (same genre), +0.25 (same attire) | +0.25 (same attire) | +0.25 (same attire) | | | | | | | | | |
| Restaurant 5 | +0.25 (same attire) | +1.25 (same neighborhood), +1 (same genre), +0.25 (same attire) | +0.25 (same attire) | +0.25 (same attire) | | | | | | | | |
| Restaurant 6 | +0.25 (same attire) | +0.25 (same attire) | +1.25 (same neighborhood), +1 (same genre), +0.25 (same attire) | +0.25 (same attire) | +0.25 (same attire) | | | | | | | |
| Restaurant 7 | +1.25 (same neighborhood), +1 (same genre) | | +1.25 (same neighborhood), +1 (same genre) | | | | | | | | | |

FIG. 7A

| | | | | | | | | | | |
|---|---|---|---|---|---|---|---|---|---|---|
| Restaurant 8 | +1.25 (same neighborhood), +1 (same genre) | | | | +0.25 (same attire) | | | | | |
| Restaurant 9 | | +1.25 (same neighborhood), +1 (same genre) | | +0.25 (same attire) | +0.25 (same attire) | | | | | |
| Restaurant 10 | +1.25 (same neighborhood), +1 (same genre) | | +1.25 (same neighborhood), +1 (same genre) | | +1.25 (same neighborhood), +1 (same genre), +0.25 (same attire) | +0.25 (same attire) | −0.25 (same attire) | | | |
| Restaurant 11 | +1.25 (same neighborhood), +1 (same genre) | | +1.25 (same neighborhood), +1 (same genre) | | | +0.25 (same attire) | +1.25 (same neighborhood), +1 (same genre), −0.25 (same attire) | −0.25 (same attire) | +0.25 (same attire) | |
| Restaurant 12 | | +1.25 (same neighborhood), +1 (same genre) | | +1.25 (same neighborhood), +1 (same genre) | +0.25 (same attire) | | +0.25 (same attire) | +1.25 (same neighborhood), +1 (same genre), +0.25 (same attire) | +0.25 (same attire) | +0.25 (same attire) |

FIG. 7B

| Collaborative Venue Links | | | | | | | | | | | | |
|---|---|---|---|---|---|---|---|---|---|---|---|---|
| | Restaurant 1 | Restaurant 2 | Restaurant 3 | Restaurant 4 | Restaurant 5 | Restaurant 6 | Restaurant 7 | Restaurant 8 | Restaurant 9 | Restaurant 10 | Restaurant 11 | Restaurant 12 |
| Restaurant 1 | | | | | | | | | | | | |
| Restaurant 2 | | | | | | | | | | | | |
| Restaurant 3 | +1 (both rated 4 by Reviewer 2) | | | | | | | | | | | |
| Restaurant 4 | | | +1 (rated 4 by Reviewer 2) | | | | | | | | | |
| Restaurant 5 | | | -0.75 (opposite affinity expressed by Reviewer 1) | | | | | | | | | |
| Restaurant 6 | | | | | -1.00 (strongly opposite affinity expressed by Reviewer 3) | | | | | | | |
| Restaurant 7 | +1 (both rated 4 by Reviewer 2) | | +1 (both rated 4 by Reviewer 2), -0.75 (opposite affinity expressed by Reviewer 1) | +1 (both rated 4 by Reviewer 2) | -1.00 (strongly opposite affinity expressed by Reviewer 3) | | | | | | | |
| Restaurant 8 | | | +1 (both rated 4 by Reviewer 1) | | +1 (both rated 4 by Reviewer 4), +1.25 (both rated 4 or 5 by Reviewer 5) | | -0.75 (opposite affinity expressed by Reviewer 1) | | | | | |

FIG. 8A

| | | | | | | | | | |
|---|---|---|---|---|---|---|---|---|---|
| Restaurant 9 | -0.75 (opposite affinity expressed by Reviewer 2) | | -0.75 (opposite affinity expressed by Reviewer 2) | -0.75 (opposite affinity expressed by Reviewer 2) | -0.75 (opposite affinity expressed by Reviewer 7) | -1.00 (strongly opposite affinity expressed by Reviewer 3) | -1.00 (strongly opposite affinity expressed by Reviewer 3) | | |
| Restaurant 10 | +1 (rated 4 by Reviewer 2) | | +1 (rated 4 by Reviewer 2) | +1 (rated 4 by Reviewer 2) | | | -0.75 (opposite affinity expressed by Reviewer 3); +1.25 (both rated 4/5 by Reviewer 2) | | |
| Restaurant 11 | | | -0.75 (opposite affinity expressed by Reviewer 1) | | +1.25 (both rated 4 or 5 by Reviewer 4); -1.00 (strongly opposite affinity expressed by Reviewer 5) | -1.00 (strongly opposite affinity expressed by Reviewer 3) | +1.25 (both rated 4 or 5 by Reviewer 4); -0.75 (opposite affinity expressed by Reviewer 1); -0.75 (opposite affinity expressed by Reviewer 5) | +1 (both rated 4 by Reviewer 7); -0.75 (opposite affinity expressed by Reviewer 7) | -0.75 (opposite affinity expressed by Reviewer 2) | |
| Restaurant 12 | +1 (both rated 4 by Reviewer 2) | | +1 (both rated 4 by Reviewer 2) | +1 (both rated 4 by Reviewer 2) | -0.75 (opposite affinity expressed by Reviewer 4) | +1.25 (both rated 4 or 5 by Reviewer 2) | +1.25 (both rated 4 or 5 by Reviewer 2) | -0.75 (opposite affinity expressed by Reviewer 4) | +1 (both rated 4 by Reviewer 2); -1.00 (strongly opposite affinity expressed by Reviewer 4) | |

FIG. 8B

| | Recommendation Generation for American Restaurant based on User Affinity for Restaurant 7 | | | | | | |
|---|---|---|---|---|---|---|---|
| | Content-based link strength 901 | Weighting factor 902 | Collaborative link strength 903 | Weighting factor 904 | Content-collaborative link strength 905 | Weighting factor 906 | Overall link strength 907 |
| Restaurant 3 | 0 | 0.35 | 0.25 | 0.4 | 0.5 | 0.25 | 0.225 |
| Restaurant 6 | 0 | 0.35 | 1.5 | 0.4 | 0.7 | 0.25 | 0.775 |
| Restaurant 9 | 0.25 | 0.35 | -1 | 0.4 | 0.4 | 0.25 | -0.2125 |
| Restaurant 12 | 0.25 | 0.35 | 1.25 | 0.4 | 0.8 | 0.25 | 0.7875 |

FIG. 9

| | Connection Growth from Collaborative Venue Links for Restaurant 8 | | | | | | | | | | | |
|---|---|---|---|---|---|---|---|---|---|---|---|---|
| | Restaurant 1 | Restaurant 2 | Restaurant 3 | Restaurant 4 | Restaurant 5 | Restaurant 6 | Restaurant 7 | Restaurant 8 | Restaurant 9 | Restaurant 10 | Restaurant 11 | Restaurant 12 |
| Restaurant 1 | | | | | | | | | | | | |
| Restaurant 2 | | | | | | | | | | | | |
| Restaurant 3 | | | | | | | | | | | | |
| Restaurant 4 | | | | | | | | | | | | |
| Restaurant 5 | | | +0.25 (both positively linked to Restaurant 8) | | | | | | | | | |
| Restaurant 6 | | | | | | | | | | | | |
| Restaurant 7 | | | | | | | | | | | | |
| Restaurant 8 | | | | | | | | | | | | |
| Restaurant 9 | | | | | | | | | | | | |
| Restaurant 10 | | | | | | | | | | | | |
| Restaurant 11 | | | | | | | +0.15 (both negatively linked to Restaurant 8) | | | | | |
| Restaurant 12 | | | | | | | | | | +0.05 (both negatively linked to Restaurant 8, but substantially different magnitude) | | |

FIG. 10

| | Normalization of Collaborative Venue Links: Pre-Normalization Data | | | | | | | | | | | |
|---|---|---|---|---|---|---|---|---|---|---|---|---|
| | Restaurant 1 | Restaurant 2 | Restaurant 3 | Restaurant 4 | Restaurant 5 | Restaurant 6 | Restaurant 7 | Restaurant 8 | Restaurant 9 | Restaurant 10 | Restaurant 11 | Restaurant 12 |
| Restaurant 1 | | | | | | | | | | | | |
| Restaurant 2 | 8.28 | | | | | | | | | | | |
| Restaurant 3 | -2.02 | 14.16 | | | | | | | | | | |
| Restaurant 4 | 10.05 | 11.54 | -0.18 | | | | | | | | | |
| Restaurant 5 | -1.71 | 3.52 | 4.68 | 8.33 | | | | | | | | |
| Restaurant 6 | 2.97 | 4.36 | 13.24 | 12.49 | 2.38 | | | | | | | |
| Restaurant 7 | 3.40 | -1.65 | 1.70 | -0.53 | -0.45 | 3.28 | | | | | | |
| Restaurant 8 | 5.38 | 3.33 | 9.03 | 6.59 | 11.68 | -4.11 | 0.68 | | | | | |
| Restaurant 9 | 11.60 | 2.92 | 12.75 | 2.22 | 11.22 | 5.97 | -1.01 | 8.77 | | | | |
| Restaurant 10 | 14.43 | 11.49 | 3.69 | 3.26 | 6.67 | 7.11 | 9.87 | 8.36 | 12.87 | | | |
| Restaurant 11 | 12.33 | 9.68 | 4.70 | 6.24 | -0.09 | -2.05 | 8.00 | 5.23 | -1.34 | 14.86 | | |
| Restaurant 12 | 6.21 | 0.36 | -4.03 | 8.13 | 14.89 | 6.66 | 5.04 | 3.52 | 11.85 | 6.70 | 12.26 | |

FIG. 11

Normalization of Collaborative Venue Links: Post- Normalization Data

| | Restaurant 1 | Restaurant 2 | Restaurant 3 | Restaurant 4 | Restaurant 5 | Restaurant 6 | Restaurant 7 | Restaurant 8 | Restaurant 9 | Restaurant 10 | Restaurant 11 | Restaurant 12 |
|---|---|---|---|---|---|---|---|---|---|---|---|---|
| Restaurant 1 | | | | | | | | | | | | |
| Restaurant 2 | 3.28 | | | | | | | | | | | |
| Restaurant 3 | -7.02 | 9.16 | | | | | | | | | | |
| Restaurant 4 | 5.05 | 6.54 | -5.18 | | | | | | | | | |
| Restaurant 5 | -6.71 | -1.48 | -0.32 | 3.33 | | | | | | | | |
| Restaurant 6 | -2.03 | -0.64 | 8.24 | 8.49 | -2.62 | | | | | | | |
| Restaurant 7 | -1.60 | -6.65 | -3.30 | -5.53 | -5.45 | -1.72 | | | | | | |
| Restaurant 8 | 0.38 | -1.67 | 4.03 | 1.59 | 6.68 | -9.11 | -4.32 | | | | | |
| Restaurant 9 | 6.60 | -2.06 | 7.75 | -2.78 | 6.22 | 0.97 | -6.01 | 3.77 | | | | |
| Restaurant 10 | 9.43 | 6.49 | -1.31 | -1.74 | 1.67 | 2.11 | 4.87 | 3.36 | 7.87 | | | |
| Restaurant 11 | 7.33 | 4.68 | -0.30 | 1.24 | -5.09 | 7.05 | 3.00 | 0.23 | -6.34 | 9.85 | | |
| Restaurant 12 | 1.21 | -4.64 | -9.03 | 3.13 | 9.89 | 1.66 | 0.04 | -1.48 | 6.85 | 1.70 | 7.26 | |

FIG. 12

| Connection Creep from Restaurant 10 | | | | | | | | | | | | |
|---|---|---|---|---|---|---|---|---|---|---|---|---|
| | Restaurant 1 | Restaurant 2 | Restaurant 3 | Restaurant 4 | Restaurant 5 | Restaurant 6 | Restaurant 7 | Restaurant 8 | Restaurant 9 | Restaurant 10 | Restaurant 11 | Restaurant 12 |
| Restaurant 1 | | +0.5 | | | | | | | | | | |
| Restaurant 2 | | | | | | | | | | | | |
| Restaurant 3 | | | | | | | | | | | | |
| Restaurant 4 | | | | | | | | | | | | |
| Restaurant 5 | | | | | | | | | | | | |
| Restaurant 6 | | | | | | | | | | | | |
| Restaurant 7 | | | | | | | +0.5 | | | | | |
| Restaurant 8 | | | | | | | | +0.5 | | | | |
| Restaurant 9 | | | | | | | | | (No Change Because Above Threshold) | | | |
| Restaurant 10 | -1.5 | | | | | | | | | | | |
| Restaurant 11 | | | | | | | | | | | | |
| Restaurant 12 | | | | | | | | | | | | |

FIG. 13

|  | Member 1 | Member 2 | Member 3 | Member 4 |
|---|---|---|---|---|
|  | RESTAURANT 1 | RESTAURANT 2 | RESTAURANT 5 | RESTAURANT 1 <br> 1704 |
|  | RESTAURANT 4 | RESTAURANT 5 | RESTAURANT 12 <br> 1710 | RESTAURANT 9 |
|  | RESTAURANT 7 <br> 1706 | RESTAURANT 6 | RESTAURANT 11 | RESTAURANT 11 <br> 1714 |
|  | RESTAURANT 10 | RESTAURANT 7 <br> 1708 | RESTAURANT 12 |  |

RESTAURANT 7
1700

RESTAURANT 4
1702

LAST CHANGED:
10/07/2012
10:06 PM

LAST VOTE:
User: Member 4
Vote: Restaurant 11

DEADLINE:
10/08/2012
12:00 PM

MEETING TIME:
10/08/2012
5:00 PM

FIG. 17

| | Price | Genre | Hours | Attire | Neighborhood | Reviewers | Age | Children |
|---|---|---|---|---|---|---|---|---|
| Data Repository of Previous Recommendations | | | | | | | | |
| User 2 | | | | | | | | |
| Rec #1 | 3 | Italian | XXXX | Casual | 02196 | 2, 4, 6, 7 | 30 | 0 |
| Rec #2 | 3 | Italian | XXXX | Casual | 02196 | 2, 4, 6, 7 | 30 | 0 |
| Rec #3 | 2 | Italian | XXXX | Formal | 02196 | 1, 4, 5, 6, 7 | 31 | 1 |
| | | | | | | | | |
| User 4 | | | | | | | | |
| Rec #1 | 8 | Italian | XXXX | Formal | 02196 | 1, 3, 5, 6, 7 | 54 | 0 |
| Rec #2 | 6 | Japanese | XXXX | Formal | 02163 | 1, 2, 4, 5 | 55 | 0 |
| Rec #3 | 9 | Japanese | XXXX | Formal | 02163 | 1, 2, 3, 7 | 55 | 0 |
| Rec #4 | 5 | American | XXXX | Casual | 02199 | 1-6 | 55 | 0 |
| | | | | | | | | |
| User 7 | | | | | | | | |
| Rec #1 | 1 | Japanese | XXXX | Casual | 02163 | 1, 2, 4, 6, 7 | 35 | 3 |
| Rec #2 | 3 | Italian | XXXX | Casual | 02196 | 2, 4, 6, 7 | 35 | 3 |
| Rec #3 | 2 | American | XXXX | Casual | 02199 | 3, 4, 5 | 35 | 3 |
| Rec #4 | 1 | Japanese | XXXX | Casual | 02163 | 1, 2, 4, 6, 7 | 35 | 4 |

FIG 18

| Aggregate Repository Recommendation Data | | | | | | | | |
|---|---|---|---|---|---|---|---|---|
| | # of Recs | Price | Genre | Hours | Attire | Neighborhood | Age | Children |
| User 2 | 3 | 3 (2), 2 (1) | Italian (3) | XXXX | Casual (2) Formal (1) | 02196 (3) | 30.33 | 0 (2), 1 (1) |
| User 4 | 4 | 8 (1), 6 (1), 9 (1), 5 (1) | Italian (1) Japanese (2) American (1) | XXXX | Casual (1) Formal (3) | 02196 (1) 02163 (2) 02199 (1) | 52.5 | 0 (4) |
| User 7 | 4 | 1 (2), 3 (1), 2 (1) | Japanese (2) Italian (1) American (1) | XXXX | Casual | 02163 (2) 02196 (1) 02199 (1) | 35 | 3 (3), 4 (1) |

FIG 19

Recommendation Generation for an American Restaurant with Casual Attire Based on User Affinity for Restaurant 5

| | Content-based link strength 2100 | Weighting Factor 2102 | Collaborative link strength 2104 | Weighting Factor 2106 | Content-Collaborative link strength 2208 | Weighting Factor 2110 | Overall link strength 2112 |
|---|---|---|---|---|---|---|---|
| Restaurant 3 | 0 | 0.35 | 0 | 0.4 | 0.3 | 0.25 | 0.075 |
| Restaurant 6 | 0.25 | 0.35 | -1.0 | 0.4 | 0.5 | 0.25 | -0.1875 |
| Restaurant(s) X | A | B | C | D | E | F | G |

FIG. 21A

Geometric Contextualization of Recommended Values

| User 2 | Venue | Overall Link Strength 2114 | Number of Recommendations in Filter State 2116 | Quality of Recommendations: Quality Factor 2118 | Diversity of Recommendations 2120 | Normalized Link Strengths 2122 |
|---|---|---|---|---|---|---|
| Rec #1 | Restaurant 3 | 0.075 | 3 | XXXX | XXXX | 0.25 |
| Rec #2 | Restaurant 6 | -0.1875 | | | | -0.0125 |
| Rec #3 | Restaurant X1 | 0.08 | | | | 0.255 |

| User 2 | Geometric Contextualization of Recommended Values | | | | |
|---|---|---|---|---|---|
| | Venue | Overall Link Strength 2114 | Number of Recommendations in Filter State 2116 | Quality of Recommendations: Quality Factor 2118 | Diversity of Recommendations 2120 | Normalized Link Strengths 2122 |
| Rec #1 | Restaurant 3 | 0.075 | XXXX | 0.65 | XXXX | 0.3 |
| Rec #2 | Restaurant 6 | -0.1875 | | 0.55 | | 0.255 |
| Rec #3 | Restaurant X1 | 0.08 | | 0.15 | | 0.1 |

FIG. 21D

| User 2 | Geometric Contextualization of Recommended Values | | | | |
|---|---|---|---|---|---|
| | Venue | Overall Link Strength 2114 | Number of Recommendations in Filter State 2116 | Quality of Recommendations: Quality Factor 2118 | Diversity of Recommendations 2120 | Normalized Link Strengths 2122 |
| Rec #1 | Restaurant 3 | 0.075 | XXXX | XXXX | 0.75 | 0.1 |
| Rec #2 | Restaurant 6 | -0.1875 | | | 0.25 | 0.3 |
| Rec #3 | Restaurant X1 | 0.08 | | | 0.4 | 0.255 |

| | Ratings (1-5 Stars) | | | |
|---|---|---|---|---|
| | Reviewer 1 | Reviewer 2 | Reviewer 3 | Reviewer 4 |
| Restaurant A (New York) | 5 | | 4 | 1 |
| Restaurant B (New York) | 4 | 2 | | |
| Restaurant C (New York) | | | | |
| Restaurant D*** (Boston) | 1 | 2 | | 4 |
| Restaurant E (Boston) | | | 5 | |
| Restaurant F (Boston) | 5 | 4 | | 4 |

FIG. 23

| | Collaborative Venue Links | | | | | |
|---|---|---|---|---|---|---|
| | Restaurant A | Restaurant B | Restaurant C | Restaurant D | Restaurant E | Restaurant F |
| Restaurant A | | | | | | |
| Restaurant B | +1.25 (both rated 4 or 5 by Reviewer 1) | | | | | |
| Restaurant C | | | | | | |
| Restaurant D | -1.0 (strongly opposite affinity expressed by Reviewer 1) | -0.75 (opposite affinity expressed by Reviewer 1) +0.25 (both rated 2 by Reviewer 2) | | | | |
| Restaurant E | +1.0 (both rated 4 or 5 by Reviewer 3) -0.75 (Opposite affinity expressed by Reviewer 4) | | | | | |
| Restaurant F | +1.5 (both rated 5 by Reviewer 1) -0.75 (Opposite affinity expressed by Reviewer 4) | +1.25 (both rated 4 or 5 by Reviewer 1 -0.5 (Opposite affinity expressed by Reviewer 2) | | -1.0 (strongly opposite affinity expressed by Reviewer 1) -0.5 (Opposite affinity expressed by Reviewer 2) | +1.25 (both rated 4 by Reviewer 4) | |

FIG. 24

Venue Attributes

|  | City | State | Price | Genre | Hours | Attire | Neighborhood |
|---|---|---|---|---|---|---|---|
| Restaurant A | New York | NY | 5 | Japanese | XXXX | Casual | 10001 |
| Restaurant B | New York | NY | 7 | Italian | XXXX | Formal | 10002 |
| Restaurant C | New York | NY | 2 | American | XXXX | Casual | 10065 |
| Restaurant D | New York | NY | 8 | Japanese | XXXX | Formal | 10001 |
| Restaurant E | New York | NY | 5 | American | XXXX | Casual | 10065 |

FIG. 26A

Restaurant 6
(Price: 2, Genre: American, Attire: Casual)

|  | Price | Genre | Attire | Congruency Factor |
|---|---|---|---|---|
| Restaurant A | 5 | Japanese | Casual | 0.24 |
| Restaurant B | 7 | Italian | Formal | 0.15 |
| Restaurant C | 2 | American | Casual | 0.85 |
| Restaurant D | 8 | Japanese | Formal | 0.10 |
| Restaurant E | 5 | American | Casual | 0.50 |

Restaurant 10
(Price: 6, Genre: Japanese, Attire: Formal)

|  | Price | Genre | Attire | Congruency Factor |
|---|---|---|---|---|
| Restaurant A | 5 | Japanese | Casual | 0.65 |
| Restaurant B | 7 | Italian | Formal | 0.40 |
| Restaurant C | 2 | American | Casual | 0.18 |
| Restaurant D | 8 | Japanese | Formal | 0.75 |
| Restaurant E | 5 | American | Casual | 0.30 |

FIG. 26B

| Properties | Attributes | | | Property Weight |
|---|---|---|---|---|
| Cuisine | American 0.8 | Chinese 0.2 | Japanese 0 | Italian 0.3 | Mexican 0.9 | 0.75 |
| Attire | Casual 0.9 | Formal 0.1 | Business 0.2 | | | 0.9 |
| Price | High 0.65 | Medium 0.6 | Low 0.75 | | | 0.2 |
| Ambiance | Formal 0.1 | Casual 0.8 | Romantic 0.2 | Hipster 0.65 | | 0.7 |
| Kid Friendly | Yes 0.4 | No 0.6 | | | | 0.3 |
| Neighborhood | Atlas District 0.7 | Dupont 0.5 | Chinatown 0.6 | Georgetown 0.2 | | 0.5 |

Table 3200:

| PROPERTIES | ATTRIBUTES | | | | | Property Weight |
|---|---|---|---|---|---|---|
| Cuisine | American | Chinese | Japanese | Italian | Mexican | 0.750 |
|  | 0.8 | 0.2 | 0 | 0.3 | 0.9 |  |
| Attire | Casual | Formal | Business |  |  | 0.900 |
|  | 0.9 | 0.1 | 0.2 |  |  |  |
| Price | High | Medium | Low |  |  | 0.200 |
|  | 0.65 | 0.6 | 0.75 |  |  |  |
| Ambiance | Formal | Casual | Romantic | Hipster |  | 0.700 |
|  | 0.1 | 0.8 | 0.2 | 0.65 |  |  |
| Kid Friendly | Yes | No |  |  |  | 0.300 |
|  | 0.4 | 0.6 |  |  |  |  |
| Neighborhood | Atlas District | Dupont | Chinatown | Georgetown |  | 0.500 |
|  | 0.7 | 0.5 | 0.6 | 0.2 |  |  |

Table 3202:

| PROPERTIES | ATTRIBUTES | | | | | Property Weight |
|---|---|---|---|---|---|---|
| Cuisine | American | Chinese | Japanese | Italian | Mexican | 0.65 |
|  | 0.3 | 0.7 | 0.9 | 0.5 | 0.1 |  |
| Attire | Casual | Formal | Business |  |  | 0.60 |
|  | 0.6 | 0.2 | 0.5 |  |  |  |
| Price | High | Medium | Low |  |  | 0.80 |
|  | 0.2 | 0.7 | 0.8 |  |  |  |
| Ambiance | Formal | Casual | Romantic | Hipster | Trendy | 0.70 |
|  | 0.2 | 0.65 | 0.4 | 0.1 | 0.3 |  |
| Kid Friendly | Yes | No |  |  |  | 0.30 |
|  | 0.2 | 0.8 |  |  |  |  |
| Neighborhood | Atlas District | Dupont | Chinatown | Georgetown | U Street | 0.50 |
|  | 0.8 | 0.5 | 0.3 | 0.4 | 0.4 |  |

| | | ATTRIBUTES | | | | | Property Weight |
|---|---|---|---|---|---|---|---|
| PROPERTIES | Cuisine | American | Chinese | Japanese | Italian | Mexican | 0.70 |
| | | 0.55 | 0.45 | 0.45 | 0.40 | 0.50 | |
| | | ATTRIBUTES | | | | | |
| | Attire | Casual | Formal | Business | | | 0.75 |
| | | 0.43 | 0.65 | 0.78 | | | |
| | | ATTRIBUTES | | | | | |
| | Price | High | Medium | Low | | | 0.50 |
| | | 0.20 | 0.70 | 0.80 | | | |
| | | ATTRIBUTES | | | | | |
| | Ambiance | Formal | Casual | Romantic | Hipster | Trendy | 0.70 |
| | | 0.15 | 0.73 | 0.30 | 0.38 | 0.30 | |
| | | ATTRIBUTES | | | | | |
| | Kid Friendly | Yes | No | | | | 0.30 |
| | | 0.30 | 0.70 | | | | |
| | | ATTRIBUTES | | | | | |
| | Neighborhood | Atlas District | Dupont | Chinatown | Georgetown | U Street | 0.50 |
| | | 0.75 | 0.50 | 0.45 | 0.30 | 0.40 | |

Figure 32B

APPARATUS AND METHOD FOR PROVIDING HARMONIZED RECOMMENDATIONS BASED ON AN INTEGRATED USER PROFILE

CROSS-REFERENCE TO RELATED APPLICATIONS

This application is a continuation of U.S. application Ser. No. 14/255,712, filed Apr. 17, 2014, which is a continuation of U.S. application Ser. No. 13/842,665, filed Mar. 15, 2013 (now U.S. Pat. No. 8,732,101, issued May 20, 2014), which is related to U.S. application Ser. No. 13/416,945, filed on Mar. 9, 2012 (now U.S. Pat. No. 8,515,893, issued Aug. 20, 2013), and U.S. application Ser. No. 13/842,165, filed Mar. 15, 2013, all of which are related to U.S. application Ser. No. 13/247,289, filed Sep. 28, 2011 (now U.S. Pat. No. 8,170,971, issued May 1, 2012), the entire contents of each of which are incorporated herein by reference.

BACKGROUND

Systems have used the explicit stated interests of one person to construct recommendations for another. For example, Person A may be connected with Person B by way of a social networking interface. The social networking interface may allow users to indicate a preference for certain consumer goods, movies, music, television shows, venues, and the like. In this case, the social network may provide recommendations to Person A based on the stated preferences of Person B. That is, Person B's preferences are directly mapped to Person B.

A recent system even suggests making "joint recommendations" in U.S. Pat. No. 7,756,753. However, this system only analyzes specific items in one user's list (e.g., shopping cart, etc) to offer those items or related items to another user. That is, recommendations are provided to individual users based on purchase history similarities with other users.

Lastly, systems are available for providing recommendations based on personality traits. For example, online dating services may develop a personal profile for a user, and provide recommendations on potential partners based on personality metrics indicating a likely favorable match. Again, these systems merely provide individualized recommendations for partners; however, such systems fail to provide harmonized recommendations based on characteristics of a group of individuals.

SUMMARY

In certain implementations, a system may receive attribute data corresponding to attributes of a plurality of users and to one or more venues for which the plurality of users has an affinity. A user personality matrix may be calculated for one or more of the plurality of users based on interrelational nodal link strengths between the one or more users and the venues. The user personality matrices may be merged to calculate a combined personality matrix representing a unified taste profile for the one or more users. A candidate list of venues having the highest link strength with the combined personality matrix may be determined. One or more recommended venues from the candidate list of venues that have the strongest links to the combined personality matrix may be determined, and recommendation data corresponding to the recommended venues may be output.

The foregoing general description and the following detailed description thereof are merely exemplary aspects of the teachings of this disclosure, and are not restrictive.

The details of one or more implementations are set forth in the accompanying drawing and description below. Other features, objects, and advantages will be apparent from the description and drawings, and from the claims.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1C is a diagram of a process flow executed by an exemplary content organization system;

FIG. 3 is chart including reviewer ratings according to one example;

FIG. 4 is a chart including venue attributes according to one example;

FIG. 5 is a chart including reviewer attributes according to one example;

FIG. 6 is a chart including user attributes according to one example;

FIGS. 7A and 7B show a matrix of content-based venue links according to one example;

FIGS. 8A and 8B show a matrix of collaborative venue link according to one example;

FIG. 9 is a chart illustrating a recommendation generation according to one example;

FIG. 10 is a chart illustrating a connection grown according to one example;

FIG. 11 is a chart illustrating pre-normalization matrix data according to a second example;

FIG. 12 is a chart illustrating post-normalization matrix data according to a second example;

FIG. 13 is a chart illustrating connection creep according to a second example;

FIG. 17 illustrates a collaborative decision making user interface according to one example.

FIG. 18 is a chart illustrating the data repository of previous recommendations served to users according to one example.

FIG. 19 is a chart illustrating aggregate data repository recommendation data according to one example.

FIGS. 21A-21D illustrate recommendation generation and recommended data values after geometric contextualization according to one example.

FIG. 23 is a chart illustrating reviewer ratings between different locales according to one example.

FIG. 24 shows a matrix of collaborative venue links based on the reviewer ratings illustrated in FIG. 23 according to one example.

FIG. 26A is a chart illustrating venue attributes according to one example.

FIG. 26B is a chart illustrating congruency factors determined via interconnectivity augmentation according to one example.

FIG. 30 is an exemplary user personality matrix according to one example;

FIGS. 32A and 32B are illustrative examples of calculating a combined personality matrix according to one example;

DETAILED DESCRIPTION

Figure 1A:
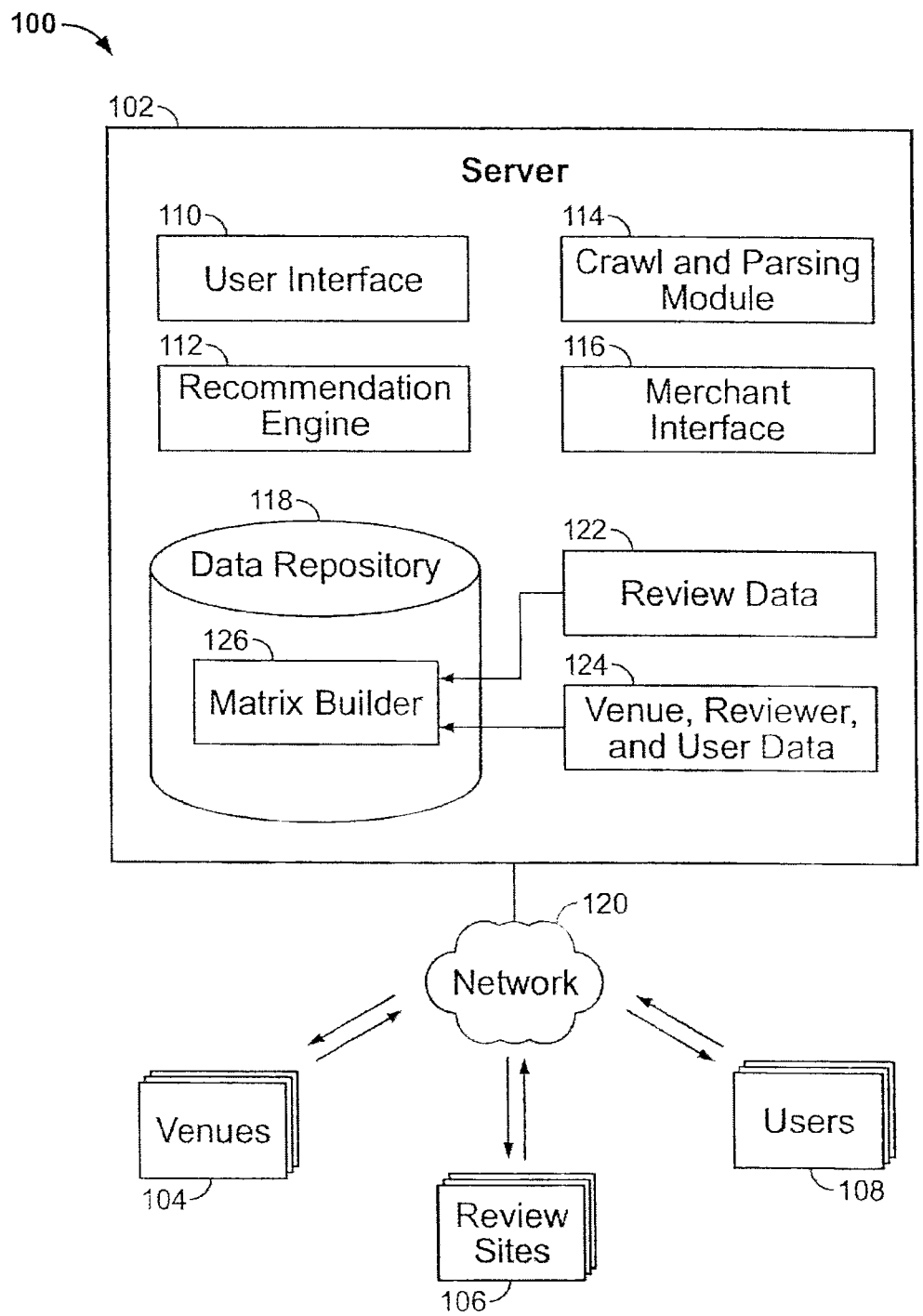
FIG. 1A is a block diagram of an environment for developing and utilizing a network of interrelated nodes.

Referring now to the drawings, wherein like reference numerals designate identical or corresponding parts throughout the several views.

In certain aspects of the present disclosure, personalization profiles may be determined concurrently for a plurality of users for the purpose of providing "shared recommendations." Shared recommendation generation may include defining a "user personality matrix" defining features of each user in the plurality of users (i.e., the group), generating a combined personality matrix defining features of the group, and determining a set of shared recommendations based on the combined personality matrix.

Exemplary Recommendation System Architecture

In certain aspects of the present disclosure, a user's affinity for a particular entity or property (i.e., a feature of a person, place, thing, etc.) may be determined when generating a user personality matrix. Mathematical computations for determining a user's affinity for a particular entity or property may include data mining functions for analyzing previous indications of an affinity for the entity or property. As a non-limiting example, a positive or negative affinity for an entity or property may include an analysis of purchase history, user reviews, interrelationships with users and/or venues, similarities between properties, survey results, and other factors described herein. It should also be appreciated that corollary principles of utilizing a user or group of users' affinities apply when determining shared recommendations based on a combined personality matrix. That is, in addition to analyzing a user's affinity for a particular entity when determining an individual's taste profile (i.e., a user personality matrix), aspects of the present disclosure may include creating and utilizing a unified taste profile (i.e., a combined personality matrix derived from aggregated user personality matrices) when determining recommendation candidates for a group of users. In this case, the recommendation candidates may, e.g., indicate an optimal decision recommendation, based on the unified taste profile represented by the combined personality matrix.

FIG. 1A illustrates an exemplary network architecture for a server-based recommendation generation system 100. It will be understood that some or all of the functionality described herein may be relocated to a client device application (such as a smart phone application) based on the client device's communication, data storage, and computational capabilities.

The server 102 may host a plurality of engines and modules. In this example, the user interface module 110 resides on the server 102 and serves web pages and/or suitable content to a client side application. The crawl and parsing module 114 executes the web crawling and source data collection operations described below. The recommendation engine 112 accesses the matrices of interrelationships and/or combined personality profile matrices to generate recommendations according to the techniques described herein. The merchant interface provides the functionality described below concerning venue operators' interaction with the server and accessing projections and reports generated thereby.

The data repository 118 stores the matrices of interrelationships. The repository includes a matrix builder 126 that builds data structures reflecting nodal interrelationships based on review data 122, which is collected from review sites 106 by the crawl and parsing module 114. The matrix builder 126 also incorporates at least venue, reviewer, and user data 124 collected from users 108, venues 104, and other web pages (by the crawl and parsing module 114).

In certain embodiments, the network 120 includes the Internet or World-Wide Web. The network may also comprise proprietary and semi-propriety networks such as cellular data networks, intranets, VPNs, or extranets.

Those skilled in the art will understand that the techniques described herein may be implemented in various system and database topologies consistent with various computational methodologies. Topologies and methodologies suitable for aspects of various embodiments are described in K. R. Nichols, A Reconfigurable Computing Architecture for Implementing Artificial Neural Networks on FPGA, Master's Thesis, The University of Guelph, December 2003; F. Rosenblati, The Perception: A Probabilistic Model For Information Storage And Organization In The Brain, Psychol, Rev., 65(6):386-408, 1958; K. Steinbuch and U. A. W. Piske; Learning Matrices and their Applications. IEEE Trans. Electron. Computers; 12:846-862, 1963; J. A Bamden, High-level Reasoning, Computational Challenges for Connectionism, and the Conposit solution. Appl. Intell., 5(2):103-135, April 1995; B. Denby, P. Garda, B. Granado, C. Kiesling, J.-c. Prevotet and A. Wassatch, Fast Triggering in High Energy Physics Experiments Using Hardware Neural Networks, IEEE Trans. On Neural Networks, 14(5):1010-1027, September 2003; R. O. Duda, P. E. Hart, and D. G. Stork. Pattern Classification. John Wiley & Sons, New York, 2nd edition, 2001; H. Eichenbaum, The Cognitive Neuroscience of Memory: An Introduction, Oxford University Press, New York, 2002; K. Fukushima, Cognitron: A Self-Organizing Multilayered Neural Network, Bioi. Cybern, 20(3-4): 127-136, 5 Nov. 1975; K. Fukushima and S. Miyake. A Self-Organizing Neural Network With A Function Of Associative Memory: Feedback Type Cognitron, Bioi. Cybern., 28(4): 201-208, 3 Mar. 1978; J. M. Fuster. Cortex and Mind: Unifying Cognition. Oxford University Press, New York, 2002; R. Gadea, J. Cerda, F. Ballesterand A. Mocholi, Artificial Neural Network Implementation On A Single FPGA Of A Pipelined On-Line Backpropagation, ISSS 2000, Madrid, Spain, September 2000; S. Grossberg, Adaptive Pattern Classification And Universal Recoding: I. Parallel Development And Coding Of Neural Feature Detectors. Bioi. Cybern., 23(3):121-134, 30 Jul. 1976; S. Grossberg, Adaptive Pattern Classification And Universal Recoding: II. Feedback, Expectation, Olfaction, Illusions, Bioi. Cybern., 23(4):187-202, 30 Aug. 1976; S. Haykin. Neural Networks: A Comprehensive Foundation. Prentice Hall, Upper Saddle River, N.J., 2nd edition, 1999; R. Hecht-Nielsen, Neurocomputing, Addison Wesley, Reading, Mass., 1989; R. Hecht-Nielsen, A Theory Of Thalamocortex, in R. Hecht-Nielsen and T. McKenna, editors, Computational Models for Neuroscience: Human Cortical Information; S. Y. Kung, M. W. and S. H. Lin., Biometric Authentication: A Machine Learning Approach. Prentice Hall PTR, Upper Saddle River, N.J., 2005; B. Widrow and M. Kamenetsky, On The Efficiency Of Adaptive Algorithms, In S. Haykin and B. Widrow, editors, Least-Mean-Square Adaptive Filters, John Wiley & Sons, New York, 2003; B. Widrow and M. Kamenetsky, Statistical Efficiency Of Adaptive Algorithms, Neural Netw., 16(5-6):735-744, June July 2003; B. Widrow and M. A. Lehr, 30 Years Of Adaptive Neural Networks: Perception, Madaline, and backpropagation, Proc. IEEE, 78(9):1415-1442, September 1990; U.S. Pat. No. 7,840,569, entitled "Enterprise relevancy ranking using a neural network," which is incorporated herein by reference; U.S. Pat. No. 7,895,140, entitled "Neural Network Learning Device, Method, And Program," which is incorporated herein by reference; and U.S. Pat. No. 7,979,370, entitled "Neural Network For Electronic Search Applications," which is incorporated herein by reference.

Node/Venue Types

The nodes in the neural network in one implementation are venues such as restaurants, theaters, night clubs, hotels, concerts and other events. However, due to the flexibility of the systems and methodologies described herein they may be applied in a variety of other manners. Nodes in the network may be sub-venue items such as specific menu items or specific rooms inside a hotel. The nodes may also be style consumables such as clothing, furniture, or wine. The nodes may also be content such as music, books, magazines, TV shows, or movies. The nodes are optionally set to be services such as mechanics, barbers, transportation, doctors, dentists, landscape architects, interior designers, or nanny services. In other implementations the nodes may be neighborhoods or cities in which to live, real estate to purchase/rent, colleges to apply to, careers that are a good fit, or grocery stores. In still other applications the nodes may be associated with social aspects such as friends and activities the user or group of users might like. The nodes in other embodiments may be medical conditions or treatments. In other implementations, the nodes may be business, political, and military strategies, which may included simulated outcomes.

The techniques described herein may also be used for fraud detection by providing predictions of what a user or group of users is unlikely to do, which in turn is more likely to be associated with fraudulent use of a credit card (for instance). The techniques may also be used for marketing/co-branding opportunities by predicting brand affinity even across disparate categories. The techniques may also be applied to actuarial/risk assessment applications by analyzing co-occurrences between a user's fine-scale likes and dislikes, which can be utilized as indicators of risk. The techniques may also be used to predict financial market behavior or trends by aggregating markets into "group users" and predicting behavior of that group user as described hereinbelow. In a similar vein, predictions on mass human behavior can be achieved with respect to geographic movement (migratory patterns) and thereby census and demographic projections over time may be generated for use by retailers, real estate developers, and others. Moreover, the techniques may be used to gauge affinity for certain types of media (such a television shows) or media channels (cable or web).

As will be appreciated from the following description, in each such implementation the nodal attributes, reviewer attributes, and the corresponding interrelationships will be selected to correspond in part to the factors that are causally associated with a user or group of users' preferences for certain nodes. For instance, in a system designed to provide career suggestions the nodal attributes may includes skills associated with each profession and user attributes may include aptitude scores or survey questionnaire results.

Hereinbelow the system 100 is described in connection with exemplary systems in which the nodes are venues such as restaurants, hotels, or theaters. For convenience the term "venue" is used to refer to neural network nodes. It should be understood that the term "venue" in the following sections is used broadly to refer to any entity or item that is interrelated in the network with other network nodes such as users and/or reviewers.

Identification of Venue Reviews

A user's or reviewer's affinity (again, positive or negative) for a venue may be derived from both evaluations and assessments of venues, such as reviews or ratings, and implicit data sources, such as ant trails. Individuals may publish ratings on social web pages, review forums and websites or blogs. Ratings may also be published by votes placed via "Like" or "Digg" buttons disposed on various websites. As one example, user reviews of restaurants can be found at menuism.com, dine.com, opentable.com, google.com, reviewsahoy.com, and realeats.com. An individual's affinity for certain venues can also be discerned from their spending habits or purchase history, data of which can be gleaned from financial transaction records such as credit card statements. An individual's web browsing history or ant trail can also provide insight into affinities for certain venues, as discerned from cookies or the various reviews an individual generates across multiple forums, including but not limited to websites associated with each venue. An individual's website navigation bookmarks and browsing history also reflect browsing behavior and may likewise be mined for source data. The geographic position of an individual over time, such as information derived from cellular GPS data, can likewise be correlated with venues and thereby generate data reflective of venue affinity. This approach may provide dwell time data as well, which can be used to sort or arrange the data. Magazine subscription information may also be used as an indicator of an individual's affinity for given venues (as that term is broadly used herein). An individual's professional licenses can also be used as data sources for determining an affinity for venues, including but not limited to organizations.

The foregoing sources of data concerning venue affinity can be prioritized based on factors germane to the strength of the correlation between the data and the affinity of interest. Data or sites that refer to a greater number of venues might be more probative since such sites are more likely to compare, contrast or rank venues. Similarly, sites that specify a greater number of properties, such as in structured fields, for each venue or reviewer tend to be more effective or probative. Sites with a greater number of reviews per venue and/or reviews per reviewer are, on balance, to include more reliable affinity. The inclusion of "related items," "also viewed," or "people who purchased this also purchased" fields or boxes can also be considered as indicators that the site's data will be strongly correlated to actual affinities. In a similar vein, a site's inclusion of geographically proximate recommendations, recommendations based on social networking, and recommendations based of complementary venues (e.g. hotel and restaurant) may be indicative of more reliable data. The behavior of the more effective or accurate reviewers also can be analyzed to differentiate various data sources, for example, by determining where those reviewers tend to post reviews. The existence of grouping structures, such as data structures associated with a plurality of socially networked individuals, can also be used as a metric to grade or rate the potential value of the site's data. Blogs may also be crawled to determine which reviews or ratings sites are the most commonly referenced.

In one embodiment, numeric values are associated with some or all of the foregoing variables and weights are assigned to each variable based on the system designer's estimation of the relative strength of correlation between the variable and the predictive value of the review data on the site. For instance, the density of the best reviewers on a site may be weighted more heavily than the number of venues referenced on a site. The resulted weighted numerical grades can be used to prioritize harvesting operations.

Harvesting Venue Reviews and Reviewer Data

The reviews may be harvested using web crawling techniques such as those described in U.S. Pat. No. 6,631,369, entitled "Method and System for Incremental Web Crawling," and assigned to IBM Corporation, which is incorporated herein by reference. According to that technique, in an initial crawl, the crawler creates a first full index for the document store after which incremental crawls are executed.

Alternatively or in addition, the system 100 may target cached web pages served by commercial search engines. A suitable protocol for rebuilding content sites from search engine caches is as follows. First, a complete venue listing for a category by crawling a directory such as a Yellow Pages or other suitable directory. For each item in the directory, the system 100 runs a series of search queries in various search engines, each query restricted to results for the content site of interest, such as dine.com. The search results are parsed and the URLs for the relevant cached pages are retrieved. The cached pages are then retrieved and in a repository, after which they are parsed based on the name, city, phone number, and other data fields associated with a venue of interest. In this manner the cached review page for the venue of interest may be identified. This process is optionally repeated across search engines and across multiple venues, targeting the sites prioritized as set forth in the preceding section, to collect the desired array of source data.

The data may optionally be validated by checking parsed venue or reviewer content for blank fields. Venue or reviewer content may also be checked against unique identification information (a venue phone number or a reviewer email address or screen name) to ensure sure that it corresponds to the target venue or reviewer.

After validation, the pages may be parsed to extract the data of interest. Parser code may be used to segregate out the structured fields of interest, the reviews, and other information of interest as described above. The extracted data may be uploaded to database tables or files to be analyzed for computing personalization. Techniques such as those taught in U.S. Pat. No. 7,788,293, entitled "Generating Structured Information," assigned to Google Inc., the contents of which are herein incorporated by reference, may be used for this purpose.

The same approaches can be used to harvest data concerning reviewers or users (discussed in more detail below). The data is preferentially in a structured format on a public site and is predictive of personality and affinities. The data sources may be prioritized or ranked as set forth in the preceding section, such as according to the number of reviews given by the reviewer, the citation of a reviewer's reviews on other sites and the alignment of a reviewer's reviews with overall ratings generated by the system 100 (as discussed below) and third party review sites from which data is harvested. The reviewer data is then selectively crawled and parsed as explained above.

The crawl and parser module 114 may be configured to coordinate the crawling and digestion of certain web or network nodes. Due to practical limitations, the entire World Wide Web cannot be crawled and parsed simultaneously. The crawling and parsing process may be coordinated across different content-gathering computers or agents. Multiple remote crawling engines (at remote network nodes) may be deployed, each of which can check data sources (such as web pages or cached web pages) for the properties described above and recruit crawling and parsing nodes in the event rich data sources are located. The remote crawling nodes can coordinate their crawling based on real-time breaking news events, or optimize content gathering in response to shifts in mass user behavior as reflected in the data matrices described herein.

Figure 1B:
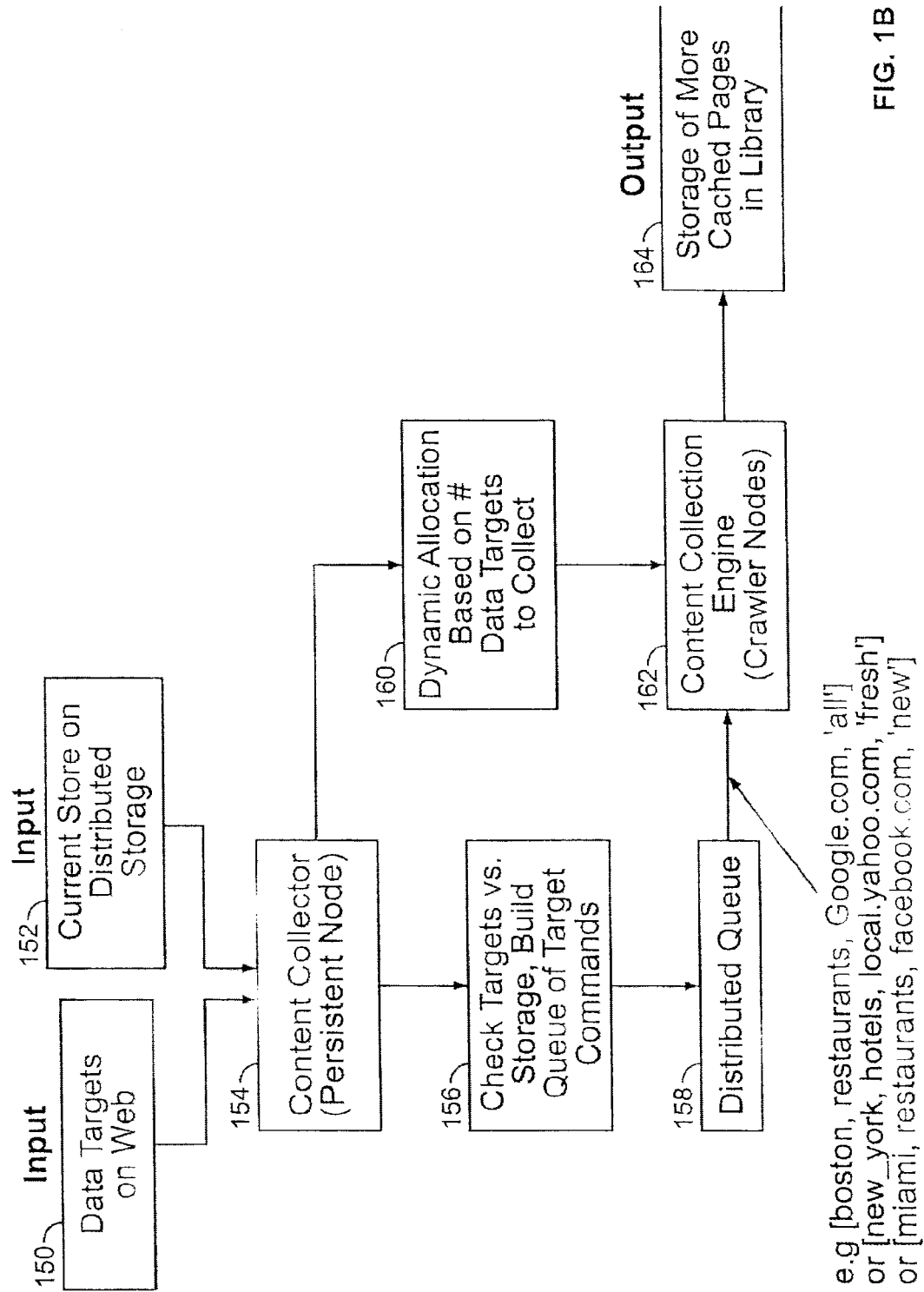
FIG. 1B is a diagram of a process flow executed by an exemplary content collection system.

Examples of content collection and content organization systems and process flows are shown in FIGS. 1B and 1C. FIG. 1B illustrates the process executed by the content collection system, which may include the crawl and parsing module 114. At step 150 the crawl and parsing module 114 identifies subject matter targets, such as rock-climbing, are needed in the neural network. The targets may also take the form of specific URLs or collections thereof. At step 152 the module 114 identifies the current content, in the form of previously collected web pages (or representations thereof), that already resides within the system's storage network. At step 154 the content collector, which in one embodiment takes the form of a persistent system network node, determines from a comparison and analysis of the two inputs which subject matter or URLs are to be gathered by the module 114. The content collector verifies the addresses and content of the target sites containing the subject matter which is to be collected and creates a queue of items to be crawled and parsed by the module 114. As an example, the distributed queue's first entry might be [Boston, restaurants, google.com, 'all'], which corresponds to a request that the crawler nodes collect all cached pages associated with google.com's reviews of any Boston area restaurant. The content collector may also dynamically allocate certain queue items to specific crawling nodes based on their relative priority (160). At step 162 the content collection engine, which includes a distributed array of crawler nodes, receives or access the distributed queue and dynamically assigned collection commands from the content collector. The content collection engine, under the control of crawl and parsing module 114, collects cached web pages as discussed above. The output is a library of cached web content which is parsed according to the methods described herein.

FIG. 1C shows an exemplary process executed by the content organizer, which may comprise the matrix builder 116. A set of cached pages to organize is obtaining as an input at step 170. At step 174 the content organizer receives or accesses the library of cached pages to be parsed and added to the network. The content organizer may be a persistent system network node in various embodiments. The content organization engine (see step 182) may include a distributed array of parsing nodes that access a distributed queue of parsing assignments and receive assignments which are dynamically assigned, optionally to specific crawling nodes or crawling nodes having certain attributes such as bandwidth or throughput. The content organization engine also accesses an array of site-specific parsers that are specially designed to parse data as it is presented on certain sites. For instance, because google.com may present its hotel data in a format different than restaurants, a parser engine specific to Google's hotel pages is presented to the content organization engine for use in parsing corresponding cached web pages. Other examples, as shown in FIG. 1C, include a parser specific to facebook.com's venue or event pages. This architecture may facilitate modification of parser engines as sites alter the manner in which they present data. For example, local.yahoo.com may alter the data format of its hotel pages, in response to which a single parser engine can be updated. The output of the content organization engine (182) is used by the matrix builder 114 to create additional nodes and matrices of interrelationships as described herein. The resulting matrices and databases of web content are presented for simultaneous access by multiple instances of web servers which present the user interface described below or which communicate with mobile device client applications as discussed herein.

Collection of User Data

Upon creation of an account or in response to another triggering event such as a request for a new recommendation, the system 100 may require a user to input various data including gender, age, marital status, children ages, children gender, third parties with whom the user is socially networked, hobbies, interests, favorite venue information (in one or more venue categories), preferred or non-preferred reviewing entities (if any).

The user is then asked to list favorite or preferred venues. As an example, the user may list favorite restaurants, movies, or activities. The system 100 may asks for alternative favorites in the event a venue is not included within the neural network.

The system 100 optionally may crawl the web for additional information concerning the user and then parse and validate the data according to the methods described above. This supplemental data may be added to the user's profile, data from which will be used in various operations as set forth below.

Creating Nodal Interrelationships

The following provides an exemplary description of aspects of creating nodal interrelationships. For the purposes of the present disclosure, it should be appreciated that these aspects may be applicable to forming nodal interrelationships as part of determining an individual user's personality matrix, as well as a group of users' combined personality matrix. Therefore, for simplicity the term "user" hereinafter may represent an individual user or a unified set of users represented by a combined personality matrix.

Nodes in the data network may represent venues, venue properties, users, user properties, reviewers, reviewer properties, and the like. Links represent relations between those nodes. The number of links between two items might therefore grow as data on two items grows. The strength of each link denotes the affinity between the two connected items, such as similarity of star rating (in a review of a venue), number of attributes held in common. Links can be either positive or negative in sign.

Figure 2:
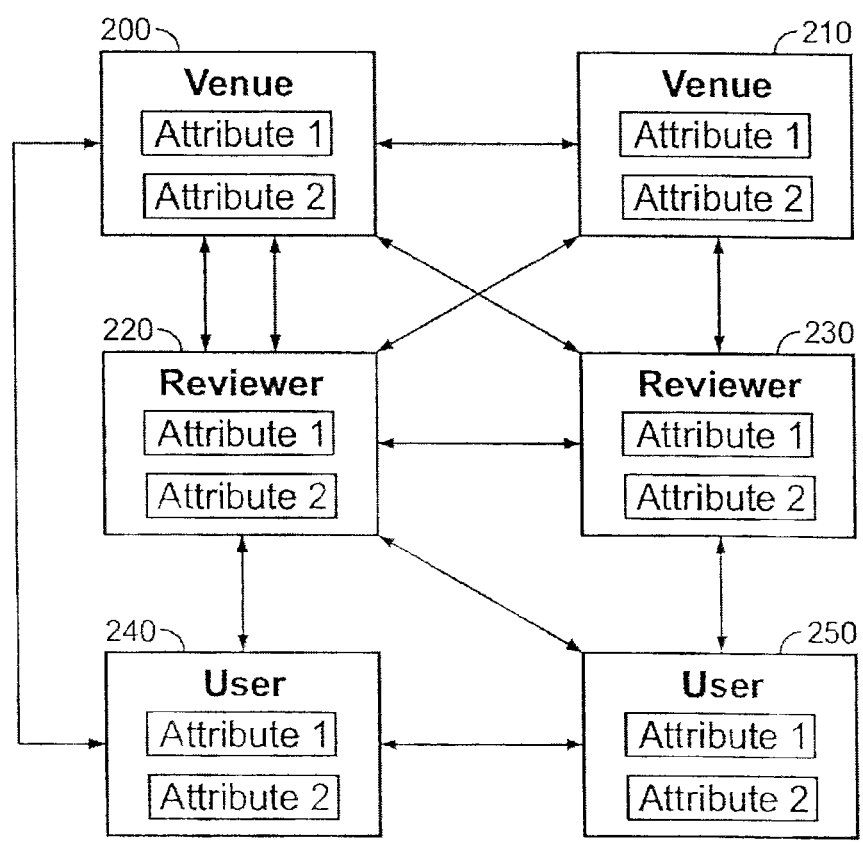
FIG. 2 is a diagram showing the interrelationships between venues, reviewers and users.

Links can be associated to designate affinity between and amongst, venues, properties of venues, users, reviewers, content sources, or any combination thereof. For instance, as shown in FIG. 2, two venues 200, 210 may be interrelated in that they have several attributes 201, 211 in common, namely that they are both Italian restaurants in the same neighborhood. Reviewers 220, 230 are related in that they likewise have multiple attributed in common. Users 240, 250 are likewise interrelated by shared attributes. Reviewer 220 is interrelated with both venues 200 and 210 in that Reviewer delivered a review to both venues and that in turn creates an additional relationship between venues 200 and 210 (namely, they were reviewed by the same reviewer. User 250 is related to both Reviewers 220 and 230 via shared attributes and User 240 is related only to Reviewer 220 via the shared attributes. Reviewers 220 and 230 are thus interrelated also in that they share attributes of user 240. User 240 is also directly linked to venue 200 by virtue of the fact that the user has expressed an affinity for that specific venue. Reviewers 220 and 230 thus have a second order relationship with venue 200 through user 240.

This data architecture permits links, or interrelationships, to be adjusted independently from one another. Links touching the same node can be adjusted for one partner node but not others. Links on the same node can be "scaled" together to maintain relative values of each of their partners while changing the overall drive/influence to that node.

In selected embodiments, subtractive or "anti-related" links can weaken relationships from one node onto another. Subtractive nodes also can be added to the network to normalize the total positive timbre of local nodes where the average link values are too strongly positive. Subtractive nodes also can serve to mediate competition between nodes to influence one another, as the strength of the link dictates the effect one node will have on the other. Subtractive nodes can help sharpen, or focus, the positive influence cast by a given node.

Links can in various implementations be sorted according to priority of influence over (or strength of link to) their downstream node. Links may interact and influence one another, where the addition of one changes the strength or presence of another, in a manner that is restricted or targeted to other links on the same node.

Links from reviewer nodes can be normalized based on how positive or negative they are. In other words, if a given reviewer is an "easy grader" his or her reviews may be lessened in magnitude to normalize the reviews to a statistic goal or mean. Links from reviewer nodes may also be normalized to lessen the influence of those links where, for instance, a reviewer has an extraordinarily high number of reviews (each of which creates a link) and thus that single reviewer's opinion would unduly influence the data network if not scaled appropriately. Conversely, the strength of a reviewer link make by scaled upwards based on measured or perceived effectiveness or accuracy of the reviewer. This may be executed, for instance, through rankings or ratings of reviewers or statistical feedback whereby accuracy or predictiveness of reviewers is measured.

Weighting or normalization may also be used to alter a link's strength based on the number of attributes in held in common. For instance, the system 100 may be configured to give each additional link of a given type a linearly or exponentially decreasing affect, such as where a substantial number of interrelated reviewers given a venue a similar review. Links between nodes that are hyper-connected may be likewise be scaled downward to reduce the effect that one of the two nodes has on the extended network. The converse—giving cumulative links escalating effect or increasing link strength for under-connected nodes—may also be implemented with the opposite effects.

Links may also be weighted based on the predictiveness of the reviewer. For instance, reviewers may be graded based on number of reviews, number of citations on other web sites, or ratings of reviewers on third party sites crawled by the system. The links created based on each reviewer's reviews may accordingly be scaled linearly or non-linearly according to the relative grade of the reviewer. Reviews provided by more highly rated reviewers may be assigned correspondingly higher values or strengths.

Reviewers may be weighted on a user-specific basis as well. For example, the neural network of links may be re-weighted based on the fact that the user requesting a recommendation, or a "unified user" represented by a combined personality matrix, has affinities or attributes held in common with certain reviewers. Conversely, certain reviewers with which a user and/or a unified user has indicated a negative association may result in re-weighting to correspond with the negative association. Reviewers' ratings may be correspondingly weighted more heavily or more lightly in correspondence to the link between the user and the various reviewers.

Reviewers may optionally be pruned from the network if they have below a threshold level of relevance as measured by a corresponding grade or effectiveness. As noted elsewhere herein, the grades of reviewers may be based on ratings of reviewers at third party sites and/or feedback of users of the system 100 concerning agreement or disagreement with recommendations which were calculated in part based on a given reviewer's review. If a reviewer is pruned from the system the remaining reviewer's weightings may be adjusted upwards to maintain normalization.

Similarly, aspects of the present disclosure may allow for indicating certain "filters" related to affinities or attributes other than reviewers, which can be utilized to screen against candidate recommendations. Screening candidate recommendations may, e.g., include re-weighting link strength or eliminating a link altogether.

The links in the neural network may be bidirectional (as shown in the figures) or unidirectional. In certain circumstances, the predictiveness of a link may be asymmetrical or unidirectional. For example, it may be the case that almost everyone who likes restaurant A likes restaurant B, but very few who like restaurant B also like restaurant A. In that case, the links associated with affinity for restaurant A may unidirectionally point to (i.e., be linked to) restaurant B, but the converse would not be true (i.e., node B would not have a positive link to restaurant A based on this data point). For simplicity of illustration, the figures address the simpler scenario wherein all data points are symmetrical, but in various implementations some or all of the links may be unidirectional or have asymmetric strengths (such as +1.5 in one direction and +0.5 or −0.5 in the other direction).

The neural network may be refined based on an active feedback loop concerning the effectiveness of the recommendations provided by the system 100. Links can be refined (in either direction) based on feedback for how effective the recommendation was. One measure of the effectiveness of the recommendation is whether funds were spent by the user based on the recommendation, which in turn might be measured via data provided by partners such as financial transaction card issuers. Another measure may be feedback provided by the user in response to a query or survey concerning the recommendation or venue in question. Yet another measure of recommendation effectiveness is a user's browsing behavior and the fact that the user left a positive review for the recommended venue on a third party site (which can be collected and parsed as set forth above). Still another technique to assess effectiveness of a recommendation is geographic dwell time at a physical location associated with a venue, as measured by mobile device GPS data, for instance.

It should be noted that not only first order connections are updated based on feedback. Rather, in various implementations second and higher order connections are optionally updated based on feedback. For instance, when a reviewer's ranking or grade is updated, the second order connection between two restaurants which are both liked by the reviewer may be updated or correspondingly modified as well. Mismatch between the recommendation and the user's evaluation can drive a reduction or weakening of the links between the associated nodes such that the converse could also be executed. In response to positive feedback between a reviewer node's recommendation, the links between that node and neighboring nodes may be strengthened. Similarly, links created by the reviewer's reviews may be assigned a greater strength.

The nodal structure facilitates computations and scaling of the network. As will be seen, the nodal network may create a natural look-up table that is convenient to search and operate over. The nodal structure with inter-node links of varying types provides a convenient way to update the structure as new pieces of information are added, and in certain embodiments this may be executed without losing the original information as in traditional databases that represent affinity as single number weights between items. The data in various embodiments may be represented as either an indexed rows of databases, linked lists, or distributed files.

The matrix of interrelationships or links can be broadly categorized as content-based interrelationships, collaborative interrelationships, and content-collaborative interrelationships. The first type, content-based links, are in certain embodiments premised on venue attributes for multiple venues reviewed by same reviewer. The content-based links establish interrelationships between venues based on shared attributes. The strength of the link (or anti-link) may be dependent on the number of things held in common, comparative ratings, and other factors as described herein.

Collaborative venue interrelationships associate venues that are liked by the same reviewer, often without any dependency or relation to the reason(s) why the reviewer likes the venue. The strength of the link (or anti-link) may be dependent on reviewer rating, proximity on same list, and other factors described herein. Collaborative links arise when two venues co-occur, for example, in the same person's list of favorite or preferred venues, on the same "top 10" or other grouping lists on ranking or recommendation sites, or on the same search engine search results page. Proximity within the list may be used as a variable to control link strength. Ant trails may also be used to create collaborative links by tracking people's surfing behavior and linking venues a given user often visits, independent of spiderwebbing. In this way, restaurant A may be deemed interrelated to museum B if many tracked users visit both of those sites. The user's dwell time at each site or the fact that a user left a rating or review may also factor into whether a link is created. In certain embodiments, this tracking is accomplished without the use of cookies, rather by collecting from the web data concerning the user's activities on rating and review sites according to the techniques described elsewhere herein.

Content-collaborative interrelationships or links may arise from common (or anti-common) reviewer attributes for reviewers who liked (or disliked) the same venue. The venue attributes may be analyzed for common or anti-common features, and links may be established between either a specific venue and reviewer attributes or between venue attributes and reviewer attributes. The strength of the link may depend on the incidence of an attribute among reviewers giving a venue a certain grade, or similar comparative ratings.

The exemplary architecture illustrated in FIGS. 3-12 facilitates in certain embodiments dynamic updating and adapting of the network. For example, when a new restaurant or review is added to the network, those nodes each create first, second and higher order links which are added to the network. The affected links can be updated by a relatively computationally simple (and non-resource intensive) addition or other arithmetic operation and the neural network need not be substantially entirely recalculated or reformed.

Generating Recommendations

Either the system or users may trigger the recommendation engine. The users may do so by entering through a web portal, client application, or electronic message a request that a shared recommendation be generated based on provided venue attributes such as type, geography, or price. The system 100 may access user profiles to collect data for each user in a group requesting a shared recommendation. Exemplary user data collected by the system 100 includes other venues liked, gender, profession, age, location, pricing preferences, cuisine preferences, entertainment content preferences (e.g., favorite movies, music, books, etc.), preferred venue features, allergies, preferred modes of transportation, relative weight in shared decision making, schedule/calendar information, style preferences, and any other user information set forth herein. As will be described in further detail in later paragraphs, user data collected by the system 100 may be utilized to form a user personality matrix and combined personality matrices with which to determine shared recommendations.

The system 100 may also automatically generate recommendations for inclusion in electronic messages, such as text messages, or email messages, sent to targeted users or for presentation on a web portal or client application accessed by users. The system 100 may also include features for determining available times for a show, reservation, appointment, etc. Accordingly, the system 100 may control an interface for scheduling an event and/or purchasing tickets for shared recommendation results.

The recommendation engine may responsively identify venues with strongest links according to the following protocols in selected embodiments. Based on the identified "liked venue(s)" the system 100 may identify the top N venues that have strongest link value to that the identified venue and which have the specified venue attributes. Alternatively or in addition, based on highest rated venue(s) having specified attributes, the system 100 may identify the top N venues that have strongest link value to that the identified venue. Still another alternative which can be used alone or in combination with the foregoing is to, based on the highest rates venue(s) having specified attributes and being recommended by friends or selected reviewers, identify the top N venues that have strongest link value to that the identified venue. The recommendation engine may also generate recommendations based on the user attributes, for instance by identifying the top N venues that have strongest link to attributes of the user personality matrix and the combined personality matrix. Further, in selected embodiments a recommendation threshold at which the nodal link strengths have to cross may be implemented such that the recommendation engine will not recommend venues with link strengths below the recommendation threshold.

In certain embodiments, a plurality of these techniques are used and resulting venue recommendations are weighted based on empirical observations concerning the predictiveness or accuracy of each protocol. The weight factors may be simple coefficients or first, second, or higher order equations.

In the case of recommendations provided for a group of users, these same techniques may be used but with the modification that the user attributes are selected to match the group, either by direct user input or by arithmetic blending or averaging the user attribute values to arrive at a composite group user profile.

Recommendations may also be provided based on real-time location information, such as that provided by smartphone GPS data. As described more fully below, the system 100 may send an electronic message or alert either including a recommendation based in part on the location and/or time or prompting a user to access an interface to receive the recommendation. For instance, if one or more users is known to be proximate to a theater shortly before a show which the recommendation engine ranks highly for that particular combined personality matrix, the system 100 may generate an electronic alert to the one or more users including the recommendation, a hyperlink to the system 100 web portal, or a link to activate a client recommendation application that can launch a user interface, such as the exemplary interfaces described herein.

Alerts or recommendations may be accompanied by, and be generated based on, promotional offers related to the venues. For instance, an electronic notification may contain a recommendation along with a promotional discount offer for the related potential booking or reservation. Recommendations presented in the interface (or via electronic messages) may also be selected based in part on promotional status. That is to say, the recommendation engine may strengthen links nodes associated with promotional offers and thus the engine will factor in promotional offers when determining nodes to recommend (i.e. those most strongly linked to nodes associated with the user or a recommendation request).

Users' feedback concerning recommended venues and the associated "take rates" may likewise be factored in by the recommendation engine. For example, the link strengths may be increased for venues for which users more frequently make reservations based on the recommendations, consistent with the techniques taught herein.

Example

FIGS. 3-12 illustrate one simplified implementation of the recommendation engine described herein. Those skilled in the art will understand that this example can be extended to incorporate any or all of the additional features described herein. Selected of these substitutions and extensions will be mentioned below and those explanations are not intended to be limiting.

FIG. 3 shows an exemplary matrix of reviewer ratings. Reviewer 1 has provided reviews for nine out of the twelve restaurants, the ratings spanning from one star to five, five being the highest. Reviewers 2-7 have likewise each provided ratings for a different subset of the twelve restaurants. In other embodiments the venues could be venues of different types, such as four restaurants, four night clubs, and four theaters. The ratings may use a wider numerical or alphabetic scale, and integer or non-integer values.

FIG. 4 shows the corresponding matrix of attributes for the venues of FIG. 3. In this example, each restaurant is in Boston, Mass. and the price varies on a ten point scale. Attire is assigned alphabetic codes (formal and casual), although numeric codes may be used in certain embodiments. Zip codes may be used as neighborhood values in this example, although neighborhood values may be determined based on GPS position location information, or another predefined system indicating geographical boundaries. The hours of operation may be assigned a code selected from a predetermined library of operational hours and in other embodiments the hours of operation is provided various fields, one for each day of the week.

FIG. 5 shows the reviewer attributes for the Reviewers 1-7 of FIG. 3. In this example, reviewer attributes are limited to gender, age, profession, education, marital status, number of children, number of reviews, and review accuracy. The codes may be selected from predetermined libraries. The number of reviews is based on the data collected as described above. The review accuracy may be calculated based on the feedback control data as discussed above. Alternatively, a composite reviewer grade may be used, which optionally factors in number of reviews, citations of reviews on other sites, number sites hosting reviews, and/or consistency of recommendation with positive user feedback.

FIG. 6 is a chart showing an array of user attributes for seven users. The methodology is similar to that set forth above for reviewers, but additional or different data fields are used for the users. In this embodiment, each user is asked for four favorite venues. In other embodiments, a list of preferred venues in various different venue categories may be included in the user profile. This user data, as noted above, may be input by each user and/or collected from web data sources in the manner set forth above. Additionally, as will be discussed in further detail in later sections, the user data may be used to form user personality matrices and combined personality matrices for shared recommendations.

FIGS. 7A and 7B illustrate an array of content-based venue links based on the venue attributes of FIG. 4. Referring to FIG. 7A, Restaurant 4 has one link with Restaurant 2 associated with common attire. The value of the link, +0.25, is less than the other links such that it has a lesser impact on the recommendation, as will be seen. In other words, the link is relatively weak. Restaurant 4 has three links with Restaurant 1, +1.25 associated with the common neighborhood, +1 based on the common genre and +0.25 based on the same attire. The net value of the content-based links between links Restaurant 4 and Restaurant 1 is +2.50. The exemplary matrix of FIGS. 7A and 7B could optionally include links associated with a plurality of additional venue attributes and could also include anti-links (or negative links) associated with anti-common properties, as will be illustrated in connection with FIG. 8.

FIGS. 8A and 8B show a matrix of collaborative venue links based on the reviews set forth in FIG. 3. Taking as an example the association between Restaurant 7 and Restaurant 3, there is a +1 link associated with the fact that Reviewer 2 rated both of these restaurants as four star. Restaurants 6 and 7 are given a stronger positive link based on common positive reviews because Reviewer 3 rated both restaurants as five star. Returning to the link between Restaurant 7 and 3, an anti-link of −0.75 is assigned based on the opposite affinity for these restaurants expressed by Reviewer 1 (who gave the Restaurant 3 four stars and Restaurant 7 one star). A higher negative magnitude could be used where a review rated restaurants in a more strongly opposite manner (i.e. one star and five star), as shown in the link between Restaurant 11 and Restaurant 5 where a −1.00 anti-link is shown based on the one star/five star ratings of Reviewer 5. As noted above, a greater array of different links could be assigned based on commonalities or anti-commonalities— these are merely representative.

A matrix of content-collaborative interrelationships (not shown) may reflect links arising from common or anti-common features between each venue and each reviewer. For example, reviewers may have a characteristic called "genre affinity," and a link of predetermined strength may be created when a genre affinity matches the venue genre. Additionally, the content-collaborative matrix may show links between affinity for a venue and reviewer attributes. In that example, common attributes among reviewers who rated a venue highly may be linked to the venue. For instance, reviewers aged 31-35 may disproportionately rate a venue poorly, in which case an anti-link may be created between the venue and the reviewer attribute "age 31-35."

FIG. 9 shows illustrative exemplary outputs of the recommendation engine based on a query for a recommendation for an American restaurant and a user affinity for Restaurant 7, which may be indicated by an aggregated user taste profile represented by a combined personality matrix. In other embodiments more inputs may be used, such as venue attributes and other preferred venues. In this example, the recommendation is a blending of the content-based link strength 901, collaborative link strength 903, and content-collaborative link strength 905. Each link strength is assigned a distinct weighting factor 902, 904, 906, although in other embodiments the blending equation may be a second order or higher order equation rather than a first order sum of products. The values 910-914 derive from the fact that Restaurant 3 and Restaurant 7 have no link shown in FIG. 7. The same is true for Restaurants 6/7, while Restaurants 9/7 and 12/7 show a +0.25 link. Similarly, the matrix in FIG. 9 shows the cumulative link strengths 915-918 for restaurant links 3/7, 6/7, 9/7 and 12/7, respectively. The content-collaborative link strength are based on the content-collaborative link matrix (not shown). The weighting factors 902, 904, 906 are constant but may be set to vary according to the predictiveness or accuracy of each type of link (based on feedback control as discussed above). The resulting recommendation values 920-923 reflect the overall link strength 907 between each restaurant and restaurant 7, as shown above.

Second order relationships could also be included in the link matrices used to calculate overall link strength. For example, Restaurant 8 is liked by both Reviewer 4 and Reviewer 5. Those reviewers, in turn, both like Restaurant 5. Restaurant 5 could be assigned a direct +0.25 link to Restaurant 8 based on this second order relationship. That link could operate in the matrix independently of the nodes associated with Reviewer 4 or Reviewer 5.

An alternative form of a second order relationship is shown in FIG. 10. FIG. 10 illustrates second order links arising from collaborative venue links. As shown in FIG. 8, Restaurant 8 is positively linked to both Restaurant 3 and Restaurant 5, so a +0.25 link is created directly between Restaurants 3 and 5. Restaurants 12 and 7 are both negatively linked to Restaurant 8 so a +0.15 link is created to reflect the belief that this anti-link is weaker than the positive link previously mentioned. In a similar vein, an even weaker second order link is established between Restaurants 11 and 12 because while both are negatively linked to Restaurant 8 the links are substantially different in magnitude.

These second order relationships can be added directly to the related matrices or otherwise computationally combined when calculating overall link strength between two nodes.

FIG. 11 shows an exemplary set of arbitrary link values in a more complex system that factors in a wider variety of links (such as second order links) across the same nodes. It can be seen that the values are strongly positive and few values are negative. This can be observed where the data has a skew associated with reviewer tendency to give generous ratings, for instance. If the data of FIG. 11 is content based, it may have a skew different than parallel matrices for collaborative links or content-collaborative links. Accordingly, it may be useful to normalize the data of FIG. 11 to facilitate computational combination with links in the other matrices.

FIG. 12 shows the data after an exemplary normalization operation. In this example, a constant value of five was subtracted from all data points. In other embodiments, the value subtracted may be selected such that the data set hits a common or desired mean or median. In other embodiments normalization may be accomplished by multiplication or division. For example, a certain percentage may be subtracted like a tax from affected links by multiplying the link strengths by (1−X), wherein X is a tax rate from 0 to 1. The tax rates in this approach may be progressive to accommodate the tendency of users and reviewers to aggregate toward a small number of more popular venues, which as discussed herein can cause those venues to cast too large a shadow or have an undue influence on the remainder of the neural network.

It should be noted that normalization can occur at local level or at the network level. At the local level, all links connected to a certain nodes may be normalized or all links coming to or going from a certain node may be normalized (recalling that links may be unidirectional or asymmetric). Alternatively, normalization may occur at the data matrix level. For example, content-based link matrices may be normalized or other data subsets of network may be normalized.

FIG. 13 shows another form of higher order connection, referred hereinafter as connection creep. In this example the link between Restaurant 10 and Restaurant 1 in FIG. 12 is considered too high in that it might have an undue influence on the connected nodes. Accordingly, a link strength value of 1.5 is subtracted from link 10/1 and 0.5 is added to the less strongly positive links 10/2, 10/7 and 10/8. No portion of link 10/1's strength is reassigned to link 10/9 because it is already above a predetermined threshold above which links are not to have connection creep bonuses added or above which no higher order links should be added.

Interface

Figure 14:
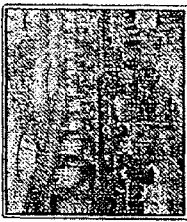
FIG. 14 is an exemplary user interface.

FIG. 14 illustrates an exemplary user interface for deployment at a web portal or client device such as a desktop computer, smart phone, tablet PC, automotive multimedia interface, or other mobile computing device. The server or local application provides an evolving personalized brand logo and personalized audio soundtrack to match the displayed itinerary. The sound track may persist and "travel" with the user as he or she navigates different functionalities or pages through the interface. The interface is also designed to provide bio-visual data feedback to the user. The system permits users to state their goals and intentions based on the feedback they have received from the system.

FIG. 14 is an overview page that provides users with an immediate perspective on options, a space for collection/comparison/pre-screening/deliberation, and the ability to immediately act. Specifically, the overview page has three distinct sections and functionalities. The interface of FIG. 14 may be provided as an interface for initiating shared recommendation requests and/or viewing results and taking corresponding actions.

First, at the recommendation panel 1410, a plurality of recommendations is presented. In preferred embodiments, there are five recommendations provided as shown in FIG. 14. In other embodiments, two to seven, three to six, four to six, four to eight, four to nine, or two to ten recommendations are provided. The number of recommendations may be on a per-venue basis so that five recommendations are provided for restaurants and a like number of hotels are recommended. Alternatively, a lesser number of complementary venue (e.g. hotel) recommendations are provided.

Second, the collection and comparison panel 1420 provides a place to compare and contrast recommendations of interest. The panel provides venue genre or type, the venue name, geographic area, and price. The panel also provides buttons to book a reservation or check availabilities or rates for the various venues. Buttons for adding the event to a calendar are optionally provided adjacent each venue. Also provided are status identifiers indicating the current state of activities and/or bookings for each venue. Optionally, buttons may be provided to launch a window or image that depicts the venue on a map.

Third, the calendar panel (not shown) may feed or import a view of the user's personal calendar and provide interactivity for immediate assessment of the user's schedule and available times. The calendar permits import of the user's other appointments and export of the calendar items to any third party calendar systems such as Outlook, Google, and iCal.

These three panels are arranged down the page so that decision-making flows down the page from menu of options (top), to deliberation and comparison (middle), to arriving at a decision, and finally to scheduling/booking/publishing/sharing/taking action (bottom). This arrangement may in certain embodiments facilitate decision-making.

A user can directly book a recommendation at any of these three stages, or add to calendar at either of the first two stages. This arrangement may in certain embodiments enhance the likelihood that a user makes reservation or booking based on the recommendations.

Additional optional functionalities (not shown) include a transportation reservation interface. For example, the interface may present a transportation button that launches an booking or reservation portal which communicates with a third party transportation provider, such as a taxi service, and makes a reservation corresponding to a restaurant or other reservation. The interface may also permit the arrangement of transportation services between and amongst a plurality of other recommended events spanning one or more days.

In similar vein, booking functionality may be provided for a variety of complementary venues, services, or activities. Examples include hotel rooms, airline reservations, movie tickets, theatre tickets, museum tickets, music tickets, sporting events, product delivery (such as flowers or flowers), rental car services, car share services, public transportation services, restaurant takeout/delivery services, parking services, real estate services, or moving services (such as inter-city packing and transportation services).

The interface may selectively suggest alternative actions or venues based on a first booked venue or action. For instance, the booking of a restaurant reservation may prompt the generation of night club or theater recommendations. As another example, the booking of a real estate tour through a real estate agency may prompt a recommendation for moving services. Subsequent bookings may in turn generate additional recommendations complementary to the most recent booking, the earlier booking, or both.

These follow-on recommendations may be filtered and selected according to the techniques set forth above. In particular, the recommendations may be a function of the user's profile, attributes, venue preferences, past booking behavior and/or previous feedback concerning certain venues. For instance, the recommendations may be filtered as set forth above according to the user's most recent reservations and the user's expressed preferences for given venues that are linked to potential secondary or tertiary recommendations.

Recommendations may also be provided based on real-time location information, such as that provided by smartphone GPS data. The system 100 may send an electronic message or alert either including a recommendation based in part on the location and/or time or prompting the user to access an interface to receive the recommendation. For instance, if a user is known to be proximate to a theater shortly before a show which the recommendation engine ranks highly for that particular user the system 100 may generate an electronic alert to the user including the recommendation, a hyperlink to the system web portal, or a link to activate a client recommendation application that can launch an interface such as those described herein.

Alerts or recommendations may be accompanied by, and be generated based on, promotional offers related to the venues. For instance, an electronic notification may contain a recommendation along with a promotional discount offer for the related potential booking or reservation. Recommendations presented in the interface (or via electronic messages) may also be selected based in part on promotional status. That is to say, the recommendation engine may strengthen linked nodes associated with promotional offers and thus the recommendation engine may factor in promotional offers when determining nodes to recommend (i.e. those most strongly linked to nodes associated with the user or a recommendation request).

Users' feedback concerning recommended venues and the associated "take rates" may likewise be factored in by the recommendation engine. For example, the link strengths may be increased for venues for which users more frequently make reservations based on the recommendations, consistent with the techniques taught herein.

Users may be provided a profile page or "my account" page that provides analytics on that data and any other data collected or contributed to provide perspective and insight into behavior. The page provides a feedback mechanisms to the user that is "habit honing" in that analytics on self activity is provided in a visual format. For example, the page may present graphical trends of actions within customizable goal categories such as health (gym, yoga), family (museums, travel, dining), and errands (dentist, mechanic, groceries). Based on user defined goals, the overview page suggestions can be featured to highlight relevant activities to fill existing calendar time-slots.

The interface may also provide other prompts to facilitate actions and hone habits. For example, the interface may provide cues and triggers embedded in mobile device applications to cue initiation of plans and transitions between scheduled events. For instance, the mobile client application may trigger chimes upon next scheduled event, music to reduce anxiety surrounding errands, tailored music transitions upon the occurrence of the next scheduled event, or visual (blinking LED) cues upon next scheduled events.

Bio-Visual Personalized Feedback

The user interface described above presents a plurality of recommendations to the user based on a user search query thereby allowing a user to pick various venues and/or add them to a calendar. However, based on this view, a user may not fully grasp the interrelationships between the venues that led the recommendation engine 112 to recommend the venues in the first place. Further, as long as the recommendation engine 112 is providing recommendations to the user, the user may not have as much of an incentive to provide more information to the system 100 thereby enabling an enhanced neural network topology that will provide better recommendation results.

To ensure a better user understanding of the nodal links between venues within the neural network topology and to provide motivation for users to input more information into the system 100, an additional bio-visual personalized feedback interface is provided to users of the system 100. Through the bio-visual feedback user interface, the user is able to view an overall network topology of various nodes within the system 100 and the interconnections therebetween thereby allowing users to grasp the nodal link strengths and relationships between venues.

The bio-visual feedback interface is a two-dimensional interface that provides an overhead aerial "bird's eye" view of the network topology presented topographically in an easy to understand manner. For instance, at the highest level, a topographical view of the system may depict clusters of nodes in various regions with some node clusters being venues of interest to the user based on previous recommendations and/or nodal interrelationships having strong overall link values and other cluster areas may include nodes known to have low overall link scores or, in other words, nodes that would be bad recommendations to the user. To enhance the understand of the user, nodal clusters having nodes that would be strong recommendations for a user or nodes that have previously determined to have been effective to the user can be displayed in hot colors, such as red or orange, whereas other nodal clusters having poor recommendation choices can be displayed in cold colors, such as blue or purple. Nodal links may or may not be provided at this level to give the user an understanding of how various nodes are linked to each other.

The topographical view of the nodes can further be enhanced via contour mapping features. Accordingly, certain areas of the clusters which include strong nodal links therein can be presented in an "elevated" contour with a different color mapping than venues with lesser overall link strengths positioned in lower elevations. Further, nodes having antilinks with other nodes may be positioned farther apart in the aerial view and have dotted links to indicate the negative link strength therebetween. Further, nodes that do not have links to other nodes may be placed apart from the nodal clusters to represent their independence from the other nodes of the neural network.

Figure 15:
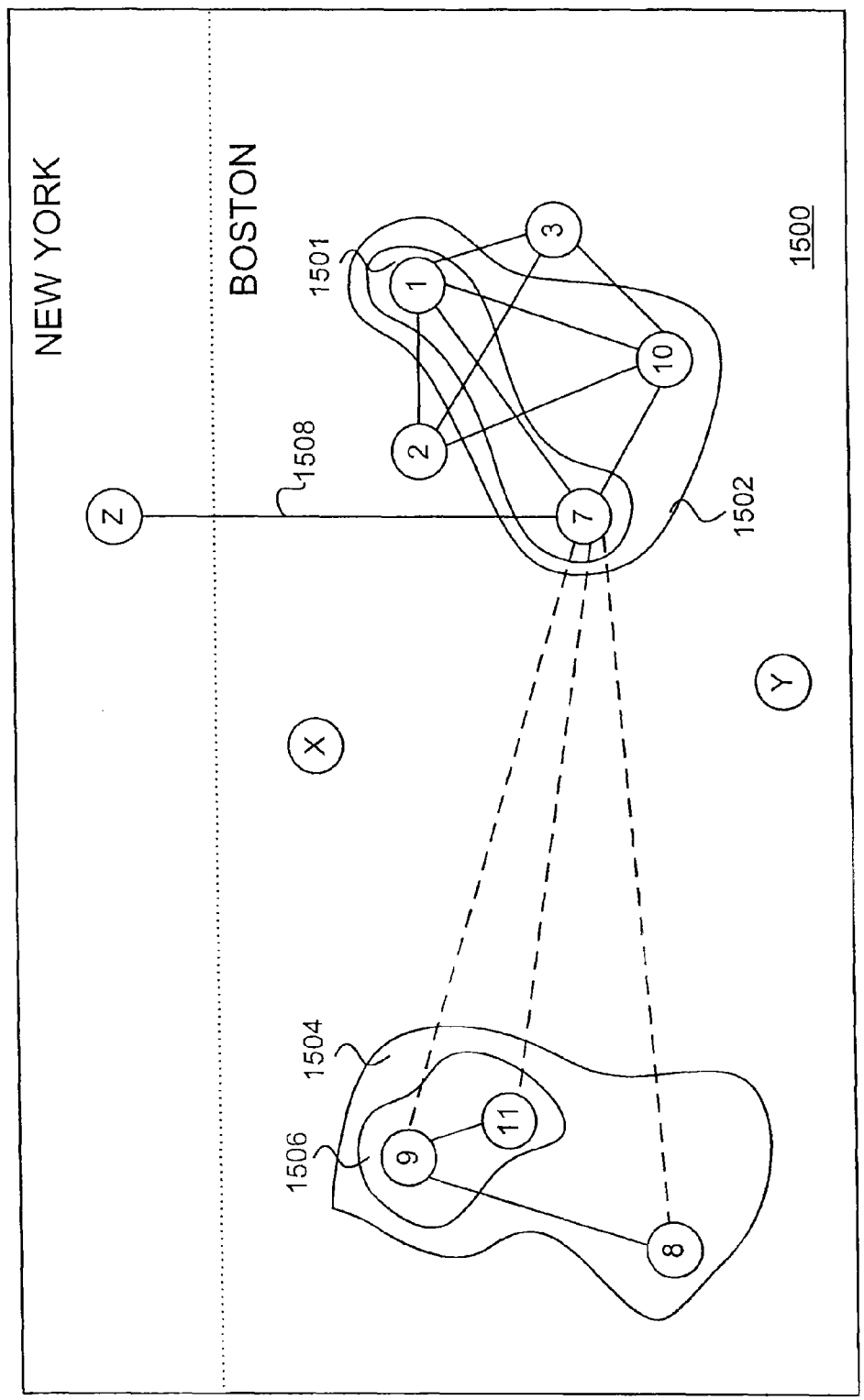
FIG. 15 illustrates a topographical world view user interface displaying the neural network topology according to one example.

FIG. 15 illustrates an exemplary bio-visual personalized feedback user interface using a topographical contour mapping system based on a user search query for Restaurant 7. As illustrated in FIG. 15, the neural network topology, or neural network "world" view 1500, includes nodes representing Restaurants 1-3, 7-11 and Restaurants X and Y. Restaurants 1-3 and 7-11 are the same Restaurants illustrated in FIG. 4 and therefore have the same venue attributes, content-based relationships, collaborative relationships and content-collaborative relationships as described above with respect to at least FIGS. 5-9. Accordingly, the links shown between the nodes are in accordance with the content-based venue links and collaborative venue links identified in FIGS. 7 and 8. Restaurants X and Y represent two venues that are not linked to any other venues within the neural network. In selected embodiments, the world view 1500 represents the "highest" aerial view the user can obtain via the bio-visual feedback user interface.

As described above, Restaurants 1-3 and 10 represent a cluster of venues having strong overall link strengths with Restaurant 7 and as such may be represented using hot colors. Restaurant 7 itself may be indicated in a neutral color to identify that it is the restaurant expressed in the search query by the user. Further, Restaurant 7 could be displayed larger than the other nodes in the topology depicted in FIG. 15 to identify it as a restaurant that was part of a search query. Restaurants 8, 9 and 11 may be depicted in cold colors as they have low recommendation values based on low overall link strengths with respect to Restaurant 7. Further, as illustrated in FIG. 15, the links between Restaurant 7 and Restaurants 8, 9 and 11 are dashed as they represent antilinks having negative overall link strengths.

FIG. 15 further includes elevated contour zones 1501, 1502, 1504 and 1506. These topographical contours represent elevated nodal areas containing nodes having strong overall link strengths with a node or nodes included in a search query. Accordingly, contour zone 1501 includes Restaurant 7 and Restaurant 1 and is depicted as having the highest elevation as Restaurant 1 has strong content-based and collaborative venue link strength. Further, contour zone 1502 has a median elevation and includes Restaurant 10 which has a higher overall link strength with Restaurant 7 than Restaurants 2 and 3 but has a lower overall link strength than Restaurant 1. As Restaurants 2 and 3 have the lowest overall link strengths with Restaurant 7 when compared to Restaurant 1 and Restaurant 10, they are depicted at the lowest elevation or "ground" level. Therefore, contour zones 1501 and 1505 provide the user with an easy-to-understand view of restaurants that would be good recommendations with respect to Restaurant 7. On the hand, contour zone 1504 and 1506 represent elevations containing nodes that would be bad recommendations as contour zone 1504 and 1506 contain nodes having lower overall link strengths with respect to Restaurant 7. For instance, contour zone 1506 includes Restaurant 9 and Restaurant 11 which have comparable negative overall link strength values with respect to Restaurant 7 but that are elevated higher than Restaurant 8 as Restaurant 8 has a lower negative overall link strength value with respect to Restaurant 7. Accordingly, alternatively from the depiction of Restaurants 2 and 3, the lowest elevation or ground level may be depicted via a contour zone.

The system 100, as illustrated in FIG. 15, can also display links to nodes in other locales. For example, in selected embodiments, the world view 1500 may include different locales such as New York and Boston. As such, link 1508 identifies a connection between Restaurant 7 of Boston and Restaurant Z of New York. The link between different locales may be represented in various manners such as a squiggly line in order to indicate to the user that the link represents a connection to a different area. Further, as the line is solid and not dashed it represents a positive overall link strength between Restaurant 7 and Restaurant Z as described above. While not shown, New York will likely have its own neural network topology with corresponding contours and internodal connections. Accordingly, the bio-visual personalized feedback user interface provides the user with the ability to quickly identify restaurants in different locales that may be strongly connected to known restaurants in the user's location. In other words, if the user is planning on traveling to New York he can "virtually travel" over transit link 1508 to determine restaurants in New York that he may want to visit based on their relationship with Restaurant 7.

To further aid the understanding of the user upon a close or cursory inspection of the bio-visual feedback user interface, the contour zones may also be colored using hot or cold colors based on overall link strength with respect to a designated restaurant. The more information the system 100 contains, the more detailed and comprehensive contour map can be provided to the user. Accordingly, by interacting with the bio-visual feedback user interface, the user is motivated to provide more information to the system in order to discover new avenues of connectability with respect to the nodes of the neural network topology. This in turn enables the system 100 to provide more accurate information to the user for future recommendation requests.

In addition to viewing network topology via the bio-visual feedback user interface, the user may interact with the nodes in order to redefine and redisplay the neural network image. For instance, world view 1500 identifies the neural network topology with respect to Restaurant 7 but the user may designate, via a mouse, speech or other input device, another node in which to view the network topology. The system 100 will then recalculate the overall link strengths as previously described herein and will redisplay the world view 1500 based on the newly designated node. Therefore, the bio-visual feedback user interface allows the user to easily grasp interconnections between a variety of different nodes and to realize an expansion of internodal links based on input provided by the user.

While FIG. 15 illustrates a world view 1500 representation, the system 100 also allows the user to zoom into lower levels of "aerial coverage". Accordingly, if there are too many connections between nodes in various clusters, the user may not be able to fully grasp specific connections between specific nodes. Therefore, the user can zoom in on a particular portion of the world view 1500 to see more granular arrangements of nodes and connections therebetween. The user may zoom in by clicking a magnification button (not shown), by right clicking a specific node which pops up a dropdown menu having an option to zoom in with respect to that node, by speech, touch or any other method as would be understood by one of ordinary skill in the art.

Figure 16:
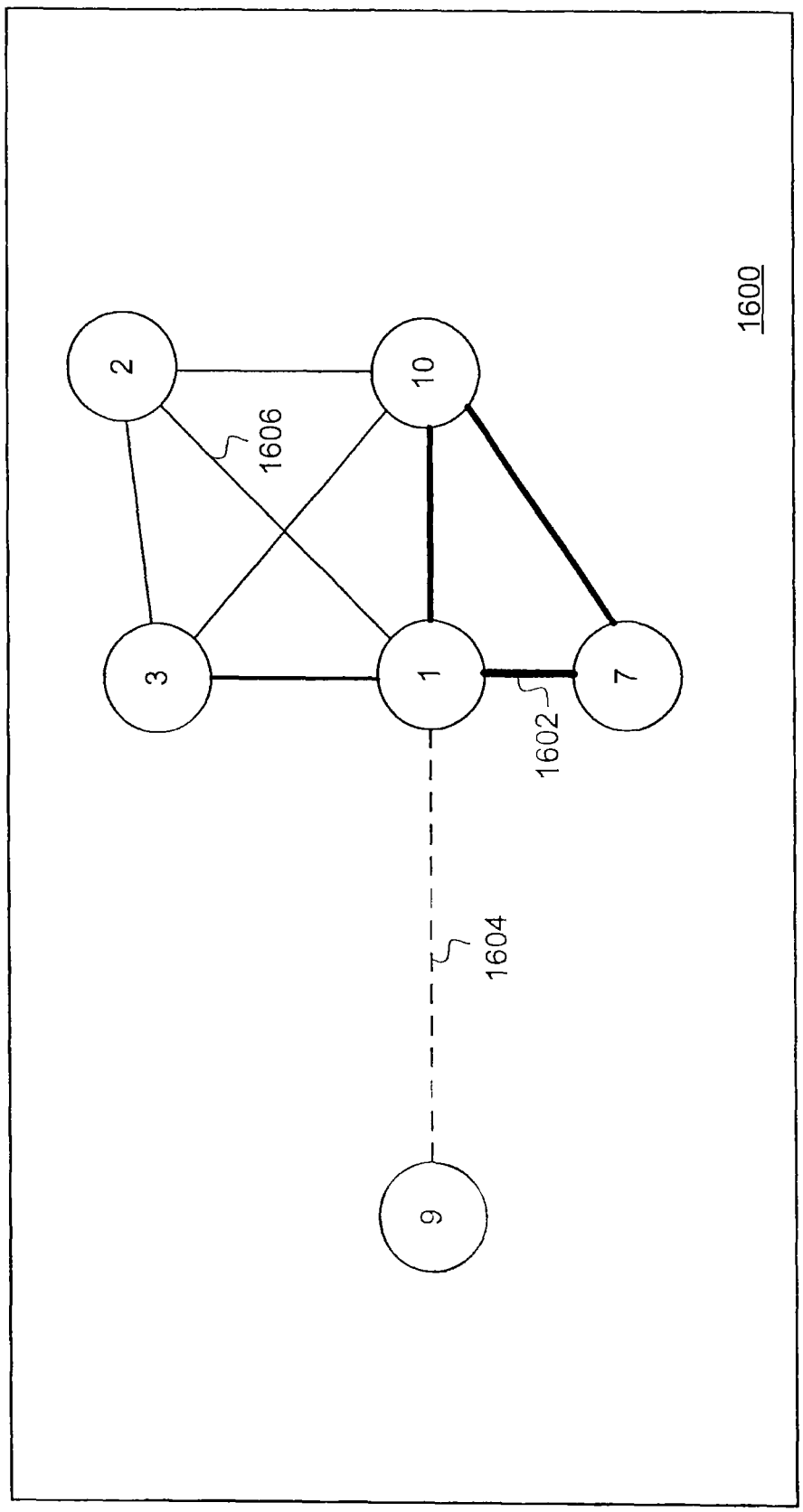
FIG. 16 illustrates a topographical local view user interface displaying the neural network topology according to one example.

FIG. 16 represents a local view 1600 of the world view 1500 of FIG. 15 based upon a command from the user to zoom in with respect to Restaurant 1. In other words, the local view 1500 illustrated in FIG. 15 depicts nodal connections based on Restaurant 1. In selected embodiments, the system, whether in the world view 1500 or local view 1600, may center on the screen whichever node has been selected by the user. FIG. 16 is intended to be exemplary and therefore only a handful of the connections are illustrated for the ease of explanation. Accordingly, Restaurant 1 has a variety of connections with Restaurants 2, 3, 7, 9 and 10 and the user is able to grasp a better understanding of these connections as compared with the world view 2500. For instance, different link strengths are represented by different link thicknesses and anti-links are represented by dashed lines. The user can further designate particular lines themselves and the system 100 will display the overall link strength values for that particular connection.

As illustrated in FIG. 16, link 1602 connecting Restaurants 1 and 7 has the thickest line as compared to other connections as they share the same neighborhood and genre and both received highly positive reviews from Reviewer 2. Link 1606 connecting Restaurant 1 and Restaurant 2 has a small line thickness as they only share the same attire and do not share any positive review data. Link 1604 connecting Restaurant 1 and Restaurant 9 is dashed as they share a negative overall link strength due to an opposite affinity expressed by Reviewer 2. However, the link 1604 is not that thick as the overall link strength value, while negative, is close to zero.

In the local view 1600, the links may be depicted in different colors to identify which links have strong or small overall link strengths with respect to a designated node. For instance, link 1602 may appear to be bright red due to a strong overall link strength between Restaurant 7 and Restaurant 1 and link 1604 may appear blue based on a low overall link strength value between Restaurant 1 and Restaurant 9. Alternatively, the user may request link colors solely based on the designated node such that link 1606 would be assigned a "hotter" color than link 1602 because it is a direct link with Restaurant 1. Further, links having a stronger overall link strength with respect to a designated node may appear closer to the designated node than other links. For instance, Restaurant 7 is closer in proximity to Restaurant 1 than Restaurant 3 as Restaurant 3 has a lower overall link strength with Restaurant 1 as compared to the overall link strength value between Restaurant 7 and Restaurant 1. In addition to or alternatively, other indications may be used to designate link strengths such as making nodal appearances larger than others if they have a strong overall link strength with respect to a designated node.

Figure 25:
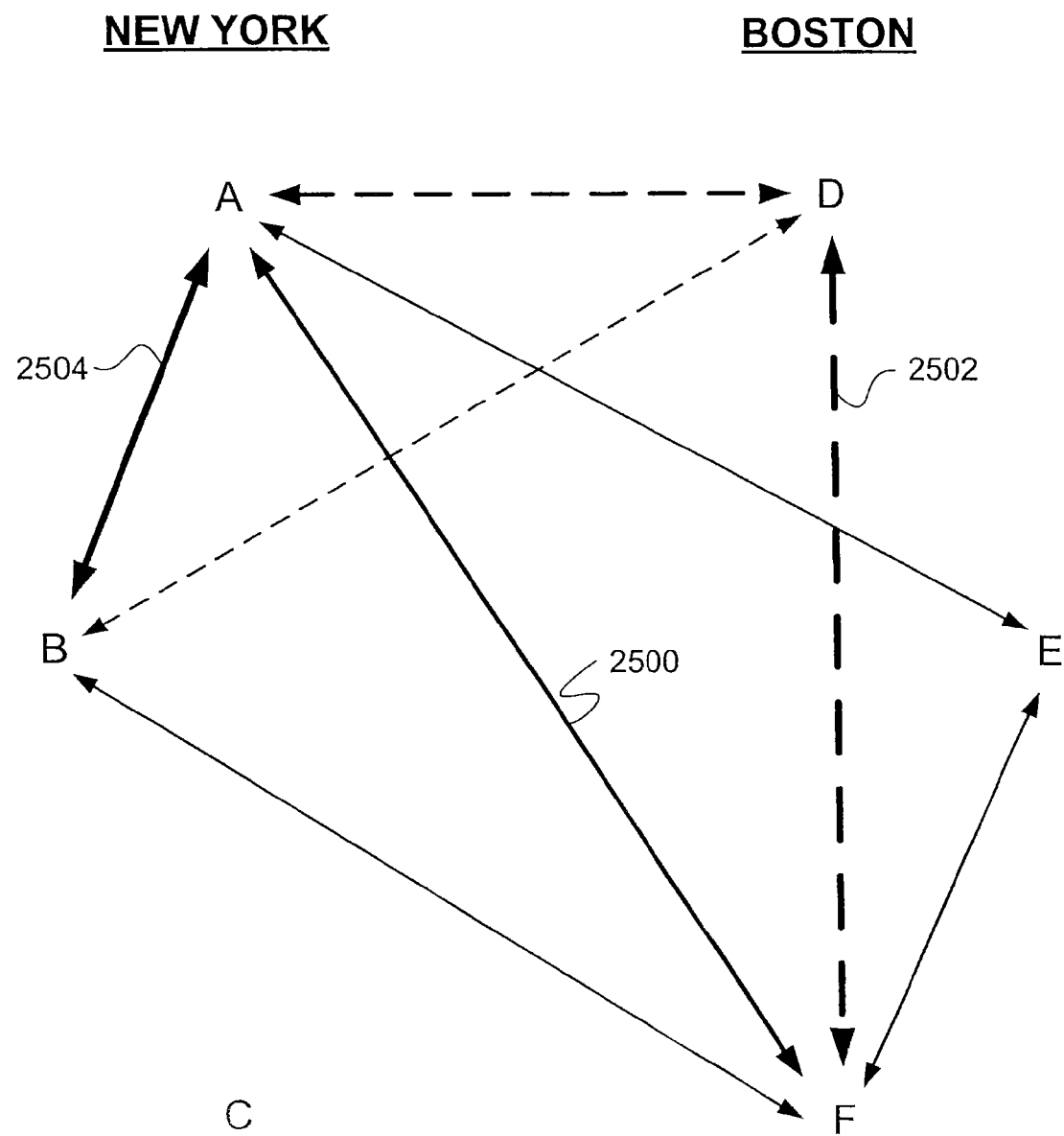
FIG. 25 illustrates inter nodal connections after interconnectivity augmentation processing according to one example.

Therefore, both the world view 2500 depicted in FIG. 25 and the local view depicted in FIG. 16 provide an easy-to-understand view of the neural network topology thereby providing the user with insight into potential recommendations while also providing an incentive to present more information to the system to bolster internodal links. While the nodes illustrated in FIG. 15 and FIG. 16 are represented by the number of the restaurant, other depictions are contemplated such as thumbnail pictures, logos and/or names of the restaurants. Further, the system in selected embodiments may display a three-dimensional view of the neural network topology thereby giving the user a real-world impression of the internodal connections. For example, in a three-dimensional system, connections with strong overall link strengths may represent highways whereas connections with low overall links strengths may be represented as dirt roads. In addition to or alternatively, venues that are located close to each other which are thereby in "walking distance" may represent strong overall link connections as opposed to venues that appear far off in the horizon.

Collaborative Decision Making

Group events can often cause problems between individuals in the group because it may be hard for everyone to come to agreement on particular topics. For instance, a group of friends that are also users of the system 100 may have plans to go out to dinner but may be unsure of which restaurant to go to or may be unable to come to an agreement with respect to a restaurant. As such, each user may have his own opinion of where the group should go based on recommendations provided by the system 100. Therefore, in addition to providing users with a variety of ways in which to view recommendation data and nodal connections between various venues, the system 100 also provides user interfaces enabling a group of users to collaboratively select venues.

Initially, the system 100 performs a group search using information provided by members of the group. Specifically, the members of the group may submit a venue choice and a list of requirements to the system 100 in which they want the search query to adhere to when determining recommended venues. As such, some members may specify the genre whereas other members may request a low price point. The recommendation engine 112 will then perform a search for each particular member based on their individual requests and recommendations are generated by the recommendation engine 112 as previously described herein such that each member has their own recommendation set.

Once the recommendation engine 112 has generated the various recommendation sets for each member of the group, the collaborative decision making user interface depicts each group member in a different row with recommendations for each corresponding member appearing in a column beneath that member. The system 100 also highlights one of the recommended venues for each member that represents the strongest overall link strength based on the venue provided by the user and the filter state input as part of the search query. The highlighted venue may be displayed in a certain color, have a varied border as compared to other recommendations, may be displayed larger than the other recommendations or may be displayed in a particular order with respect to the position of the member information.

The recommendation engine 112 will also determine, based on the information included the search queries by each member, a recommended group venue having the greatest average affinity with respect to the recommendations identified for each member. The recommendation engine may also use attribute information to prevent clashes between members of the group. For example, the system may not recommend a steakhouse as a group venue when one or more of the members of the group are known vegetarians. Further, for example, if a majority of group members dislike seafood, the recommendation engine may avoid generating a seafood restaurant as a group recommendation regardless of how close other calculations come with respect to other attributes such as price and attire. Accordingly, to generate a group recommendation, the recommendation engine 112 takes into account at least the nodal interrelationships between venues identified by the group members and user attribute data.

Once the recommendation engine 112 determines the group recommendation, the system 100 highlights the group recommendation if it already appears in the user interface and/or displays the recommended venue separately for the members of the group to see. In selected embodiments, each member of the group will have the ability to vote on the recommended venue or to select a different venue from the options listed on the display screen. The recommendation engine 112 will then continuously recalculate a recommended group venue or venues having the strongest overall affinity based on the recommendations provided by recommendation engine 112 or those voted on by the members. To prevent an endless recommendation cycle, each member may be limited to a certain number of votes and/or a time limit, such as a certain time before the planned event, may be prescribed to ensure a limited voting period.

FIG. 17 illustrates an exemplary collaborative decision making user interface, or group interface. In FIG. 17, Members 1-4 represent a group of users of the system 100 who are planning to meet for dinner on Oct. 8, 2012, at 5:00 PM. In selected embodiments, one user may setup the meeting time of an event and can send invites to other users of the system 100. If these users accept the invite, the system 100 will indicate that they are part of a group. Once the group is formed, the users may each provide a venue and other filter parameters to have the recommendation engine 112 provide a recommendation set for each user. In other embodiments, the recommendation set of a founder of the group may hold more weight or may be the only recommendation set provided to the group members.

Once the recommendations have been determined by the recommendation engine 112 for each user, the system 100 displays these recommendations as illustrated in FIG. 17 such that each user is shown along with their corresponding recommendations. Within each column containing the recommendation set for each user, a recommended venue (1706, 1708, 1710 and 1714) having the strongest overall link strength with a venue provided by the user as part of the search query is highlighted. Some users may have more recommended venues in their recommendation set based on the development of the neural network with respect to the particulars of the search query made by that user. For example, Member 4 only was provided three recommendations by the recommendation engine 112. Once the individual recommendations are generated, the system 100 then calculates a group recommendation having the greatest average affinity based on the recommendations identified by the recommendation engine 112 and presents the venue as a current group recommendation 1700. The previous group recommendation 1702 may also be provided to illustrate to the members of the group that the venue has changed.

The collaborative user interface also identifies the last time at which the group recommendation was changed as well as the last vote for a venue and who placed that vote. Further, a deadline for submitted votes can be set by the group founder and/or voted upon by group members and is displayed to inform group members of the last time at which a vote may be cast. Accordingly, as the meeting time is set to 5:00 PM on Oct. 8, 2012, the group members must submit their final votes, if any, by Oct. 8, 2012, at 12:00 PM. As such, the initial group recommendation is dynamic and can change up to the deadline by receiving different votes and recalculating the group recommendation based on overall link strengths and user attribute data with respect to the newly voted venue and previously identified venues for particular group members. In other selected embodiments, the group founder may prevent voting thereby locking the group recommendation calculated by the system 100.

In the exemplary user interface illustrated in FIG. 17, the system 100 calculated Restaurant 7 as being the best group recommendation 1700 based on the individual recommendations generated for each user by the recommendation engine 112. Recommendation 1704 is highlighted to indicate that Member 4 changed his choice for a venue from Restaurant 1 to Restaurant 11 by voting for Restaurant 11. This change may have been made from the original recommendation made by the system 100 or a from a previous vote cast by Member 4. For the purposes of this example, it is assumed that the recommendation engine 112 originally generated Recommendation 1704 and based on this recommendation in conjunction with the Recommendations 1706, 1708 and 1710 for Members 1-3, the system 100 originally generated the group recommendation 1702 of Restaurant 4. However, as explained further below, the recommendation engine 112 recalculated a group recommendation of Restaurant 7 based upon the vote for recommendation 1714 by Member 4. In other selected embodiments, recommended venues other than those highlighted within the user interface are used by the system 100 to calculate a group recommendation 1700.

Group recommendations are based, in part, on recommended venue attributes such as those illustrated in FIG. 4. For instance, Recommendations 1706 and 1708 have the same genre but have different price points than Recommendation 1710 and Recommendation 1704 with Restaurant 7 being expensive and Restaurants 1 and 12 being inexpensive. However, as Recommendations 1710 and 1704 have different genres, the Japanese genre of Recommendations 1706 and 1708 is the dominant genre. Accordingly, as the predominant genre was Japanese but the price points were opposite, the system 100 originally generated the group recommendation 1702 of Restaurant 4 having the same Japanese genre but a medium price point. However, when Member 4 decided to vote for Recommendation 1714, the system 100 recalculated the group recommendation and recommended the current group recommendation 1700 of Restaurant 7. For instance, Recommendation 1714 has a high price point and therefore only one recommendation, Recommendation 12, has a low price point. Further, as Recommendation 1710 and Recommendation 1714 have different genres, the Japanese genre of Recommendations 1706 and 1708 is still predominate. Accordingly, the system calculated Restaurant 7 as the group recommendation as it has the predominate genre and a high price point. Of course, these examples are for the sake of illustration and user attributes, other venue attributes, and link strengths based on the neural network topology between the various recommendations can all be used by the system 100 to calculate a group recommendation 1700.

The collaborative user interface illustrated in FIG. 17 is exemplary and as such can be displayed in a variety of ways.

Members of a group may be listed in columns with corresponding recommendations being listed in rows adjacent to the group members. Members may customize images representing their virtual user identity within the system 100. Thumbnail images, logos, or videos may be used in addition to or alternatively to the textual display of the restaurant in the recommendation slots. The strongest recommendations, such as 1706, 1708, 1710 and 1714 illustrated in FIG. 17, may be highlighted, may appear larger than other recommendations, and/or may contain animations or audio representations of the recommended venue itself. Further, video streams of group members themselves may be depicted in the collaborative user interface via an imaging device to virtually interact with each other when determining meeting times, discussing group recommendations, or taking votes. Further, a group member may vote on recommendations listed for the group member or any other group member as well as for venues not illustrated in the collaborative user interface.

The collaborative user interface illustrated in FIG. 17 thereby presents users with the option of having the system 100 generate a group recommendation when members are having a hard time determining a venue amongst themselves. The group recommendations further provide the user with the comfort of knowing that the group recommendation is not only based on strong links to the interests of the user but also to other members of the group thereby increasing the likelihood of a speedy resolution when determining venues amongst large groups. Further, in selected embodiments, the system 100 may incorporate votes may by users into the data repository 118 such that the system 100 may further update the neural network topology and enhance future recommendations. Additionally, the system 100 may in real time repopulate the recommendations within the collaborative user interface based on updated nodal links between venues with respect to votes cast by one member or other group members.

The interfaces described herein may be presented, as noted, through a variety of devices. Still additional devices are contemplated, including television screens, third party websites (through partnerships), in-store kiosks, or personal keychains or dongles.

Error Correction and Data Verification

In selected embodiments, the recommendation engine 112 generates recommendations for venues based on a variety of information such as user data, venue data and reviewer data. More specifically, the user data, venue data and reviewer data are combined as previously described herein to form link matrices the strength of which can be used to generate the recommendations for the user. However, while recommendations based on link strengths between nodes of the neural network provide a strong gauge as to the accuracy of the generated recommendations, it is possible that nodal link values can "trick" the recommendation engine 112 into generating an outlying recommendation for the user. For instance, a neural net configuration having nodal link strengths strongly geared to specific data such as venue attire, genre and price as well as reviewer data positively identifying venues having these traits may recommend a venue in a neighborhood that is quite different from the neighborhood where the user normally eats dinner. The system 100 may also strongly link user attribute data such as work hours and profession to venues having corresponding business hours and attire such that the recommendation engine 112 recommends an exorbitant venue that is drastically outside the price range of venues the user typically frequents based on past recommendations. Therefore, while the recommendation engine 112 will typically generate a recommendation set having a plurality of accurate recommendations, it is possible due to particular nodal links that the recommendation engine 112 may generate an outlying recommendation that does not "resonate" with the previous recommendations served to the user.

Referring back to FIGS. 3-8, an illustrative example of this effect is provided wherein the recommendation engine 112 generates a recommendation for a venue that is in a neighborhood the user does not typically visit or typically receive recommendations to visit. Referring, for the purposes of this example, solely to the affinity expressed by Reviewer 7, there is a +0.75 collaborative-based link formed between Restaurant 7 and Restaurant 11. Further, based on the venue attributes themselves, there is a +0.25 rating as both Restaurant 7 and Restaurant 11 have the same attire. Additional ratings could be added therebetween as described previously based on similar hours and the fact that the price points of the Restaurant 7 and Restaurant 11 are similar. Therefore, the nodal link strength between Restaurant 7 and Restaurant 11 would be quite strong upon the formation of link matrices by the Matrix Builder 126 such that the recommendation engine 112 may generate a recommendation for Restaurant 7 in response to receiving a query of Restaurant 11 by the user via the user interface. However, assuming for the purposes of this example that previous recommendations to this user were typically in neighborhood 02196 and/or rarely, if ever, involved Japanese food, the recommendation engine 112 would be providing a recommendation of Restaurant 7 that clearly does not resonate with recommendations previously made to the user.

To prevent the risk of an erroneous recommendation, one exemplary embodiment of the system 100 provides processing for error correction and data verification via the recommendation engine 112. Through this improved processing, the recommendation engine 112 can provide recommendations that correlate strongly to the content-based, collaborative-based and content-collaborative based interrelationships and that resonate with the plurality of recommendations that were previously made to the user. Accordingly, the error correction and data verification acts as a guardian against recommendations that, although based on strong nodal links of the neural network topology, do not resonate with recommendations that were previously served to the user and acted upon by the user.

The error correction and data verification processing begins, in one embodiment by storing in the data repository 118 recommendations data that was previously generated by the recommendation engine 112 and served to the user. The system 100 may designate a minimum number of recommendations that have to be stored before error correction and data verification processing is implemented but may also impose limits on the number of stored recommendations based on storage capacity and processing considerations. The recommendations data stored in the data repository 118 can in selected embodiments store not only the recommended venue itself but also the user data, venue data and review data that was considered most pertinent to the recommendations generated by the recommendation engine 112. Therefore, the data repository 118 can store a recommended venue in relation to the data values ascribed with the recommended venue itself such as genre, hours of operation, attire, neighborhood and any other value described herein or as would be understood by one of ordinary skill in the art. The data repository 118 can also store any other data strongly relied upon by the recommendation engine 112 when generating the recommendation such as reviewer information, content-based link values, collaborative-based link values and user attribute data such as age, education and profession.

FIG. 18 illustrates an exemplary data repository 118 storing previous recommendation data for Users 2, User 4 and User 7. This example is of course non-limiting as the data repository can contain more entries as well as different types of recommendation data previously described herein and as would be recognized by one of ordinary skill in the art. Further, although the recommendation engine 112 can provide a recommendation set to the user consisting of a plurality of recommended venues, it is assumed for he purposes of the examples provided by FIG. 18 that each recommendation set provided to each user contained only one item of recommendation data. As it may be difficult to detect recommendation resonate outliers with a limited amount of prior recommendations, the system 100 in selected embodiments can set a minimum number of recommendation data that is required for each user before the recommendation data can be relied upon for performing error correction and data verification processing. Therefore, the system 100 may not perform error correction and data verification processing until a predetermined threshold quantity of recommendation data has been stored in the data repository 118 for the particular user. This predetermined number relating to initiation of error correction and data verification processing may be manually set by the user via the user interface or automatically set by the system 100.

In FIG. 18, each user is stored in relation with recommendation data that has been previously recommended by the recommendation engine 112. For example, the first recommended venue for User 2 contained data such as a price point value of 3, an Italian genre, casual dress attire requirements and location neighborhood 02196 data. Further, the recommendation data stores the reviewers that reviewed the recommended venue (Restaurant 2) and user attribute information such as the age at which the recommendation was made and the number of children the user had at the time the recommendation was made. Therefore, the recommendation data stores values that will change over time such as the number of children and the age of the reviewer and user. Although not illustrated, it is further expected that venue attributes values such as the price point value and neighborhood and reviewer affinity ratings may change over time.

FIG. 19 illustrates an example of aggregate repository recommendation data stored in the data repository 118 according to selected embodiments that is generated based on the data repository of previous recommendations illustrated in FIG. 18. In one embodiment, the system 100 collates the recommendation data for each user to determine statistical values for each item of information stored in the data repository 118 relating to previous recommendations. For example, it can be seen that User 2 has received three recommendations all of which were Italian Venues. Further, the aggregate data indicates that the recommended venues to User 2 were often at the lower price point range as User 2 received two recommendations at a price point of three and one recommendation at a price point value of two. Further, FIG. 18 illustrates that User 2 has always received recommendations for neighborhood 02196. Therefore, as discussed previously and explained further below, a recommendation set for User 2 including venues having high price points and/or venues in a neighborhood outside of 02196 may not resonate with the aggregate data stored in the data repository 118.

The system 100 can determine the aggregate recommendation data based on the previous recommendations stored in the data repository 118 in real time when making a recommendation and performing error correction and data verification. In other selected embodiments, the system 100 can aggregate the previous recommendations at a time when the system 100 is experiencing a lower than normal processing load and store the aggregate data as illustrated in FIG. 19. Accordingly, the system 100 has the option of determining the latest aggregate information by aggregating the data at the time of performing error correction and data verification processing or can lower the processing load required for error correction and data processing by aggregating the stored recommendation data at periodic or predetermined intervals.

Whether the aggregated data is collated simultaneously with the issuance of a recommendation or at a previous time, the stored recommendations can be aggregated in a variety of ways. For example, in one embodiment, the system 100 determines a quantification value for each attribute of the recommendation data which can then be used in the error correction and data verification processing. An illustration of this methodology is shown in FIG. 19 wherein quantification values for the price of the various venues previously recommended to User 2 are stored separately such that a price point of "3" was provided twice by the recommendation engine 112 and a price point of "2" was provided only once by the recommendation engine 112. As the data collected from venues, reviewers and users is likely to change over time, the aggregated data can also be collated based on running averages. FIG. 19 provides an example of this type of collation wherein the ages of the reviewer has changed based on the time at which previous recommendations have been made and therefore an average age value is provided in the aggregate data. The recommendation engine 112 may also limit the error correction and data verification processing to a certain number of recommendations to prevent out-of-date data from affecting resonate recommendation computations. As such, in selected embodiments, the data repository 118 can store a time stamp with each data recommendation entry such that the recommendation engine 112 can implement temporal filter values when performing error correction and data verification.

The system 100 can therefore adapt over time to the changing affinities of users and reviewers alike. For example, recommendations to a long-time system 100 user may have originally all been tailored to venues at a low price point with casual attire whereas the user is now older and mostly frequents venues at a higher price point with formal attire. However, the introduction of children into the user's lifestyle may then shift recommendations back to a lower price point. Reviewer ratings will most likely also change over time and therefore the recommendation engine 112 can reflect only the most recent and accurate ratings when performing error correction and data verification.

The previous recommendation data illustrated in FIG. 18 and FIG. 19 may also be weighted based on affinities explicitly expressed by a user such that the recommendation engine 112 provides more emphasis on specific attributes of data when performing error correction and data verification. For example, User 4 may indicate via the user interface that he prefers Japanese and Italian venues and venues in the neighborhood 02163. Therefore, when the recommendation engine 112 performs error correction and data verification it will determine whether the current recommendation resonates with the various aggregated datum of previous recommendation data but will also place particular emphasis on verifying that the current recommendation resonates with User 4's affinity for Japanese and Italian venues as well as venues in the neighborhood 02163. It is likely that the recommendations will already be tailored somewhat towards these feature sets based on the nodal links formed by the matrix builder 126 based on user-expressed affinity but the error correction and data verification processing provides an extra filter of protection to ensure a more accurate recommendation to the user.

Weights may also be provided to the aggregate data of previous recommendations based on the "primary" nodal link strengths of the neural network used by the recommendation engine 112 to generate the previous recommendations. For example, based on content-based interrelationships, collaborative-based interrelationships, content-collaborative interrelationships, and higher-order interrelationships, the recommendation engine 112 may generate a recommendation primarily based on genre data and neighborhood data. FIG. 18 provides an illustrative example wherein all of the previous recommendations to the User 2 have been for an Italian venue within the neighborhood 02196. Therefore, the recommendation engine 112 may attach weights to these values such that they provide more influence on resonation calculations via the error correction and data verification processing as described above.

Figure 20:
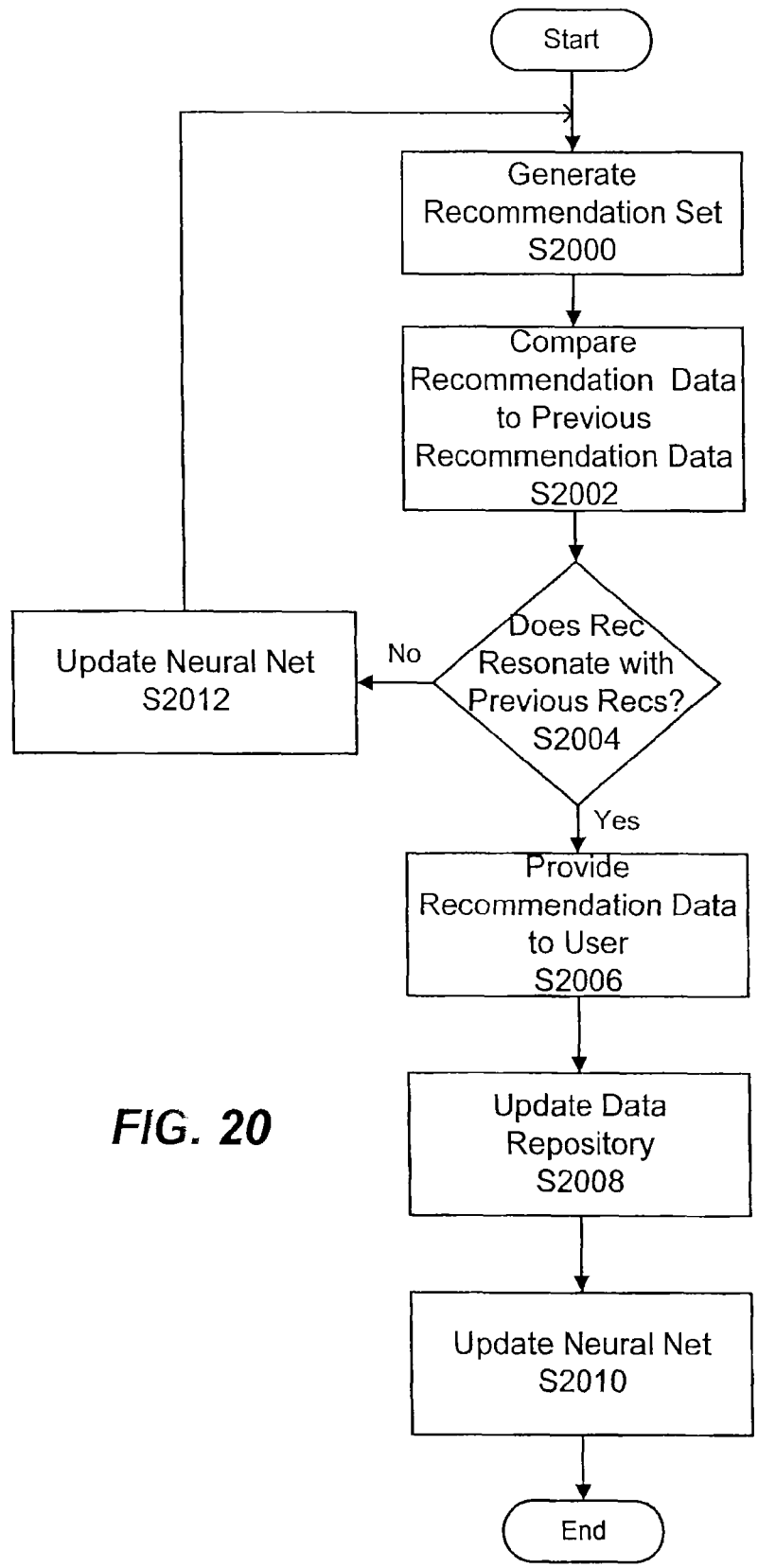
FIG. 20 is a flow chart illustrating error correction and data verification processing according to one example.

FIG. 20 is a flow chart illustrating error correction and data verification processing according to one embodiment. The process is initiated at S2000 with the recommendation engine 112 determining a recommendation set based on the neural network methodology described above. Processing then proceeds to S2002 to perform a comparison of the current recommendation data generated by the recommendation engine 112 with the aggregate recommendation data stored in the data repository 118. Although not illustrated in FIG. 20 but as previously discussed, the recommendation engine 112 can determine whether to initiate error correction and data verification based on the number of recommendations for a particular querying user that are stored in the data repository 118.

Assuming the recommendation engine 112 has access to the requisite amount of aggregate recommendation data, the recommendation engine 112 compares the current recommendation to the aggregate recommendation data stored in the data repository 118. In one embodiment, the recommendation engine 112 systematically compares each attribute included in the current recommendation data to each corresponding aggregated quantification value of each attribute to determine a resonate value for that attribute. Once each resonance value is determined for each of the attributes corresponding to those contained in the current recommendation, a resonance quantifier is determined based on the plurality of resonance values. If the resonance quantifier is less than a predetermined threshold, then the recommendation engine 112 determines that the current recommendation does not "resonate" with previous recommendations at S2004. Accordingly, at S2004, if the resonant quantifier is greater than a predetermined threshold, the recommendation engine 112 confirms that the current recommendation "resonates" with previous recommendations.

If the recommendation engine 112 determines at S2004 that the resonance quantifier does not exceed the predetermined threshold and therefore that the current recommendation does not resonate with previous recommendations to the user, the recommendation engine 112 identifies the deficiencies in the current recommendation such that the matrix builder 126 can back propagate these deficiencies into the neural network to establish increased accuracy within the nodal links. For example, with reference to FIG. 18 and FIG. 19, if the recommendation engine generated a recommendation for a venue in a neighborhood outside 02196, the error correction and data verification processing may indicate this recommendation as an outlier based on previous recommendations for User 2 that were all within the neighborhood 02196. Accordingly, at S2012, the neural network is updated such that a negative link value is ascribed to the neighborhood identified in the recommendation with respect to the nodal links established for User 2. Alternatively, or in addition, the matrix builder 126 may ascribe an additional positive link value to the neighborhood 02196 to further ensure that neighborhood 02196 is given increased link strength thereby ensuring increased consideration in any future recommendations provided by the recommendation engine 112. Accordingly, the error correction and data verification processing not only provides an additional filter for accurate recommendations but also acts as a vehicle for driving increased accuracy within the nodal links of the neural network itself. After updating the neural network at S2012, the processing proceeds back to S2000 for the recommendation engine 112 to generate a new recommendation for the user based up the updated neural network.

Referring back to FIG. 20, once it is determined that the current recommendation resonates with previous recommendations at S2004, the current recommendation is provided to the user at S2006 and the data repository 118 is updated to include an entry for the current recommendation. As noted above, this entry may include a time stamp indicating the time and date at which the recommendation data was entered into the data repository 118.

After updating the data repository 118 with the current recommendation, processing proceeds to updating the neural net nodal links at S2010. As the system 100 has determined that the recommendation data generated by the recommendation engine 112 resonates with previous recommendations, the matrix builder 126 may update the nodal link strengths of the neural network based on data included in the recommendation data. For example, if the recommendation data for User 2 includes casual attire for the recommended venue, the matrix builder 126 may even out the nodal link strengths with respect to this attribute as User 2 has now been recommended the same amount of venues for both casual and formal attire. Further, this recommendation data "approved" by the error correction and data verification processing may be applied more weight when updating the neural network than recommendation data that was created before error correction and data verification processing was initiated by the recommendation engine 112 as it has confirmed resonance with previous recommendations and is therefore more likely to be accurate.

Further, in addition to the methods of refining the neural network based on the effectiveness of recommendations as determined by the system 100, a recommendation that is approved by the error correction and data verification processing may also be identified as a recommendation that has been determined to be effective based on the resiliency of the aggregate previous recommendation data. Further, in selected embodiments, when the system 100 determines the effectiveness of the recommendation data as describe herein based on financial data, feedback data, web browsing data, geographic data or the like, the system 100 may store this recommendation data in the data repository 118 with a special label such that the recommendation engine 112 applies more weight to this information when performing error correction and data verification processing. For example, in referring to FIG. 18, if the system 100 determines the effectiveness of recommendation #2 by receiving financial information that User 2 visited the venue, by receiving user feedback from User 2 that he liked the venue, by determining that User 2 spends a lot of time on the venue website, or by determining that User 2 spends a lot of time in a geographic location proximate to the recommended venue, the system 100 may apply a "validation" label to this recommendation data in the data repository 118. In doing so, if the recommendation engine 112 is using only a predetermined number of previous recommendations, the recommendation engine 112 can improve error correction and data verification accuracy by using only "validated" previous recommendations. In other embodiments and if the recommendation engine 112 is using more previous recommendations than currently available validated previous recommendations, the recommendation engine 112 may apply special weight to the validated previous recommendations such that the error correction and data verification processing generates a resonance quantifier that is more strongly influenced by previously validated recommendations.

While error correction and data verification provides enhanced accuracy with respect to recommendations to the user, the system 100 must be constantly vigilant with respect to the changing attributes within the recommendation data, particularly the user attribute data. For example, if the user moves to a different part of the country then the matrix builder 126 will update the neural network accordingly thereby lowering the strength of links identifying venues in neighborhoods that are no longer in proximity to the user. Therefore, the nodal link strengths will be reflected in a new recommendation such that any recommendation by the recommendation engine 112 will be in neighborhoods in close proximity to the user's new location. However, when comparing a new recommendation to this user, the recommendation engine 112 may identify this recommendation as an outlier as all previous recommendations were in neighbors geographically distant from the user's new location. Accordingly, the recommendation engine 112 may assign a label on the neighborhood attribute data within the data repository 118 of previous recommendations thereby identifying certain values of this attribute as data which should not be used when performing error correction and data verification. Therefore, the system 100 provides adaptive functionality to limit error correction and data verification processing to attributes that will not induce the recommendation engine 112 to provide erroneous results.

Another method for providing enhanced recommendations via error correction and data verification is to dynamically ensure resonance between information, such as review data, from various source sites that are used during harvesting operations. For example, the harvesting of data to create the neural network as previously described herein obtains information from a variety of sources such as web sites. However, as web sites are constantly changing, as well as user review data and venue data contained therein, the system 100 may not always have an up-to-date capture of information. As described previously, the system 100 periodically updates the neural network based on information gathered from source sites. However, the user may perform a search query at a time before an update but after information from the source sites has changed. Accordingly, nodal link strengths of the neural network topology, while providing a strong representation of links between different venues, may not be optimized as they were determined based on information that was "out of date". Therefore, error correction and data verification further provides the ability to dynamically determine resonance between information contained within the data repository 118 and information obtained from source sites as well as between information from different source sites.

Specifically, in selected embodiments, the recommendation engine 112 will, just prior to generating a recommendation set, dynamically harvest data items from multiple source sites, such as web sites across the Internet, and resolve any differences between these data items. For example, venue data items from a majority of web sites relating to Restaurant 1 of FIG. 4 may include information identifying Restaurant 1 as low cost and casual. However, it is possible that other websites may mistakenly indicate Restaurant 1 as expensive and requiring formal attire. Therefore, the recommendation engine 112 can resolve these differences by indicating certain web sites as containing inaccurate information with respect to a venue. Once the outlying information is obtained, the neural network is dynamically updated as previously described herein while excluding the outlying information thereby allowing the recommendation engine 112 to provide a more accurate recommendation set based on new overall link strengths of the updated network topology.

In selected embodiments, a sliding scale resonance threshold may be applied to determine at what point information can be deemed accurate as opposed to outlying with respect to other harvested information. For example, the scale may be set by the system 100 or a user such that 75% of the information harvested must conform in order to determine that information not conforming with information in the $75^{th}$ percentile is outlying information. The system 100 may further adjust the threshold based on the amount of web sites containing information about a certain venue. For example, the more information with respect to the same data items that the system 100 can obtain during harvesting operations, the higher the threshold may be set as there is a large data set from which to draw accurate information. Accordingly, if the system 100 harvests information from 100 sites of which 65 indicate Restaurant 1 as low cost and casual and 45 indicate that Restaurant 1 is expensive and formal, the system 100 may determine that the 45 web sites indicating Restaurant 1 as expensive and formal are outliers and will not take their information into account when updating the neural network. However, if the system 100 harvests information from 1000 sites of which 650 indicate Restaurant 1 as low cost and casual and 450 indicate Restaurant 1 as expensive and formal, the system 100 may not identify the 450 items of Restaurant 1 venue information as outlying information as there is a larger data set of which 65% is not a high enough resonance threshold. In this instance, the system 100 may opt to use the information contained within the 650 web sites but provide a negative weighting to this information so that it does not have too much of an effect upon an update of the neural network topology. Alternatively, the system 100 may ignore all of the information and determine that it cannot be resolved and therefore that none of it should be used to update the neural network topology.

Once error correction and data verification has been dynamically performed at the time of a user query, the neural network topology is updated and the recommendation engine 112 provides a recommendation set based on a current real-time snapshot of information contained within the Internet. Accordingly, information provided to the users is as accurate as possible with respect to information harvested from the Internet. Further, this allows the system 100 to determine "trendiness" data among web sites such as certain attribute data which is likely to change rapidly. This provides the system 100 with the ability to identify various types of fickle data and provide appropriate weights when calculating nodal links strengths within the neural network so that the user receives recommendation sets based on the most stable and accurate information harvested by the system 100.

Geometric Contextualization

As discussed above, error correction and data verification provides the system 100 with a way to avoid outlying recommendations as well as a way to monitor venue, reviewer and user attributes that change over time. However, in addition to these gradual characteristic changes over time, users are often inclined to change their interests spontaneously to try something new or simply to see what options the system 100 may produce in response to queries containing a variety of user filters. For example, the user may express an affinity for a particular venue but may want to further limit the search to venues that have particular hours, attire and neighborhood requirements. Accordingly, in selected embodiments, the recommendation engine 112 must generate a plurality of recommendation data having venues with the strongest link strength to the venue provided by the user but which are also limited to the hour, attire and neighborhood requirements. Of course, the more filters the user provides with a search query, the harder it is for the recommendation engine 112 to generate a good recommendation that meets all of the requirements of a user. For example, if a user queries the system 100 for recommendations within the state of Massachusetts, the recommendation engine 112 may not recommend certain venues from Salisbury, Mass. based on weak nodal link strengths even though they are located in the state of Massachusetts. As such, in selected embodiments, the recommendation engine 112 determines a plurality of venue recommendations based on nodal link strengths and then compares the nodal link strength of each recommendation to a recommendation threshold to determine whether or not the venue should be recommended to the user. The recommendation threshold indicates a watershed overall link strength value or in other selected embodiments a percentage identifying the number of recommendations that will be recommended by the recommendation engine 112 to the user out of the recommendation set. Accordingly, for example, if in response to a particular user query the recommendation engine 112 generates ten venues based on the above-described data interrelationships, the recommendation engine 112 may only serve recommended venues having nodal link strengths exceeding the recommendation threshold such that only 3 out of the 10 recommended venues are served to the user.

However, if the user then performs the same query but limits the geographic limitations of the search to Salisbury, Mass., or a neighborhood of Salisbury, Mass., and the recommendation engine 112 only determines a few recommended venues based on the nodal link strengths, the recommendation engine 112 may not recommend any venues if none of the nodal link strengths are greater than the recommendation threshold. In this instance, the user would be served with a useless empty recommendation set thereby lowering user confidence in the system and increasing the likelihood the user will turn to other systems for information.

FIG. 21A illustrates an exemplary search according to the above-noted principles by describing the outputs of the recommendation engine 112 based on a query for a recommendation for an American restaurant with casual attire and a user affinity for Restaurant 5. Based on this query, the recommendation engine 112 determines the venues having the strongest nodal link strength to Restaurant 5 while also limiting the recommendation set having these strong nodal link strengths solely to American restaurants with casual attire. This example is limited to two restaurants based on the data set illustrated in FIG. 4, but it is assumed that other restaurants may exist which are listed as Restaurants X. For the foregoing examples, the value X may represent a small number of restaurants or a large number of restaurants. In this example, as with FIG. 9, the recommendation is a blending of at least the content-based link strength 2100, collaborative link strength 2104 and content-collaborative link strength 2108. Each link strength is assigned a distinct weighting factor 2102, 2106 and 2110. By referring to FIGS. 4, 7, and 8, FIG. 21A provides respective values for content-based link strength 2100, collaborative link strength 2104 and content-collaborative link strength 2108. As Restaurant 3 has no content-based interrelationships or collaborative interrelationships with Restaurant 5, the content-based link strength 2100 and collaborative link strength 2104 is zero. The content-collaborative link strength 2108 is exemplary as are the weighting factors 2102, 2106 and 2110. Based on a first order sum of products, the overall link strength for Restaurant 3 is 0.075. Restaurant 6 has the same attire as Restaurant 5 and therefore has a content-based link strength 2100 value of 0.25 but has a negative collaborative link strength 2104 value of −1.0 based on a strongly opposite affinity expressed by Reviewer 3. As with Restaurant 3, the content-collaborative link strength 2108 of Restaurant 6 is exemplary as are the weighting factors 2102, 2106 and 2110. Accordingly, in this example, a first order sum of products produces and overall link strength 2112 value of −0.1875. For the other Restaurant(s) X, values of A-F are assigned, respectively, for content-based link strength, collaborative link strength, content-collaborative link strength and their corresponding weighting factors. Further, Restaurant(s) X have an overall link strength of G.

As illustrated in FIG. 21A and described above, the result of the above-noted query is Restaurant 3, Restaurant 6 and Restaurant(s) X. Therefore, assuming X represents a small number of restaurants having an overall link strength less than Restaurant 3 and Restaurant 6, and based on the filter state implemented by the user via the user interface at the time of the query for recommended venues, the recommendation data set for this filter state is very small. Further, the overall link strengths of Restaurant 3 and Restaurant 6 are low enough that the recommendation engine 112 may not recommend them to the user if they do not pass the recommendation threshold. For example, if the recommendation threshold is set at a value of 0.25, neither Restaurant 3 or Restaurant 6 would be recommended by the recommendation engine 112 and an empty recommendation set would be provided to the user. Accordingly, as noted above, while the recommendation threshold is effective for reducing a large recommendation data set, it can also act as a barrier for passage of all recommendations when the recommendation set is extremely small and/or has small overall link strength values therein. Therefore, the system 100 must provide a way to avoid serving empty recommendation sets to users when the search returns a limited recommendation set having low overall link strength values. In other words, the system 100 must balance the need to provide information to the user while also considering the value or relevance of the information being presented to the user such that user does not lose interest or confidence in the system 100.

Geometric contextualization is a mechanism for overcoming the problem of limited recommendation sets by ensuring that at least one recommendation is always provided to the user via the recommendation engine 112. One method of performing geometric contextualization is to adjust the overall link strength values of the recommendation set generated by the recommendation engine 112 until at least one of the recommended venues exceeds the recommendation threshold. The recommended venues exceeding the recommendation threshold can then be served to the user or a predefined percentage of recommendations out of the recommendation set that have had their overall link strengths adjusted are served to the user. In this embodiment, the overall link strength values of each recommendation are normalized using a normalization factor that is based on various factors until the overall link strength value of at least one recommended venue exceeds the recommendation threshold. Accordingly, in selected embodiments, geometric contextualization is performed every time a recommendation a set is generated by the recommendation engine 112 to further redefine recommendation rankings based on a variety of factors to enhance the accuracy of the percentage of recommendations served to the user.

One factor that can be used to generate the normalization factor for normalizing the recommendation set is the number of potential recommendations available based on the filter state set by the user at the time of performing the query. For example, if there is a large number of recommendations available based on the filter set and the only issue is that none of the recommendations of the set exceed the recommendation threshold, a minimal normalization factor may be utilized to normalize the recommendation set such that a limited amount of recommendations exceed the recommendation threshold. Therefore, the recommendation engine 112 may generate a normalization factor to ensure that a predetermined number of recommended venues exceed the recommendation threshold. This ensures that the recommendation engine 112 can serve the user with at least one recommendation but increases the chance that the recommendations provided are the "best" recommendations out of the group based on the overall link strength values. In other words, by having the recommendation engine 112 perform geometric contextualization with a low normalization factor for a large recommendation set, only the recommendation values with the largest overall link strength will be provided to the user. If the recommendation set is smaller in size, the recommendation engine 112 may need to generate a drastically different normalization factor to ensure that at least one recommended venue will be normalized to a value exceeding the recommendation threshold based on the nodal link strengths of the smaller set of recommended venues.

In selected embodiments for performing geometric contextualization based on the number of recommendations available in the filter state, the normalization factor value itself can be set by the recommendation engine 112 based on specific calculations with respect to the recommendation set. For example, the recommendation engine 112 can analyze the recommendation data set and determine a normalization factor that will ensure that the overall link strength of at least one recommended venue exceeds the recommendation threshold. Further, the system 100 or the user via the user interface may set a specified number of recommendations to receive for each query. Therefore, the recommendation engine 112 may calculate a normalization factor that will ensure the overall link strengths of the specified number of recommended venues exceeds the recommendation threshold to ensure the user receives the requisite number of recommendations.

In addition or alternatively, the recommendation engine 112 may set the normalization factor based on user statistics known to the system 100 relating to venue attributes, user attributes, reviewer attributes, ordered relationships, content-based interrelationships, collaborative based interrelationships and/or content-collaborative interrelationships. These statistics are determined as described above with respect to determining the effectiveness of recommendations. For example, if past recommendations of the user indicate that recommendations based on content-based link strength are more effective than recommendations based on collaborative links strength, the recommendation engine 112 may calculate a normalization factor that ensures at least one recommendation having strong content-based link strength is elevated past the recommendation threshold even if other recommendations having higher overall link strengths exist in the recommendation set. In this instance, the recommendation engine 112 may apply the normalization factor only to those venues in the recommendation set that have a requisite level of content-based link strength. Of course, this method may be applied based on collaborative link strength, content-collaborative link strength and/or higher order interrelationships. This provides the system 100 with the ability to elevate those recommendations that have a lower overall link strength but that may prove more effective for the user based on previous user statistics. This enhances the users overall experience with the system 100 and provides enhanced data for merchant vendors.

An example of geometric contextualization using a normalization factor based on the number of potential recommendations is illustrated in FIG. 21B with reference to FIG. 21A. In this example, it is assumed that the recommendation engine 112 has generated Restaurants 3, 6 and Restaurant X1 in response to the user query identified for FIG. 21A. In this example, assuming a recommendation threshold of 0.25 and an overall link strength value G that is less than 0.25 for Restaurant X1, none of the overall link strengths 2112 exceed the recommendation threshold. Accordingly, the system 100 determines that the recommendation engine 112 needs to perform geometric contextualization on the recommendation data. When performing geometric contextualization, the recommendation engine 112 determines that there is a small number of recommendations (3) available and therefore an adequate normalization factor must be calculated to ensure that at least one of the recommended venues exceeds the recommendation threshold once the process of geometric contextualization is finished. Accordingly, assuming a user specified or system 100 specified recommendation limit of two, the recommendation engine 112 must calculate a normalization factor such that two of the overall link strengths are elevated above the 0.25 recommendation threshold. Accordingly, a normalization factor of +0.175 is added to the overall link strength 2112 value of each venue in the recommendation set. FIG. 21B illustrates the effects of geometric contextualization on the recommendation data illustrated in FIG. 21A as discussed. In FIG. 21B, due to the effects of normalization, both Restaurant 3 and a Restaurant X1 out of the set of recommended venues have the requisite overall link strength of at least 0.25 to ensure they are higher than the recommendation threshold and can therefore be served to the user via the user interface.

However, in other selected embodiments and as previously discussed, if the system 100 determines statistically that content-based interrelationships have often proven to be the most successful factor in determining the effectiveness of the recommendation, the recommendation engine 112 may generate a normalization factor specific to venues having the highest content-based link strength thereby providing extra emphasis to the overall link strength of Restaurant 6 with respect to the predetermined threshold. Standard normalization factors may then be applied to the remaining venues in the recommendation set. Therefore, if a strong enough normalization factor is applied specifically to Restaurant 6, Restaurant 6 may exceed the recommendation threshold upon completion of geometric contextualization. However, as Restaurant 6 has such a low overall link strength with respect to Restaurant 3 and Restaurant X1, the recommendation engine 112 may determine a normalization factor such that Restaurant 6 still does not exceed the recommendation threshold despite the previous user statistics with respect to the content-based interrelationships. Therefore, the recommendation engine can perform geometric contextualization to avoid empty recommendation sets while taking into account previous user statistics and balancing them against overall link strengths determined from the nodal links of the neural network.

Further, if, for example, the system 100 contains data strongly correlating a low venue price point to the effectiveness of the recommendation, the recommendation engine 112 may only perform geometric contextualization on recommendations having lower price points thereby elevating recommendations strongly relating to user-specific characteristics. Therefore, although not shown in FIG. 21B, the recommendation engine 112 may only perform geometric contextualization on Restaurant 6 as it has a low price point with respect to Restaurant 3. Accordingly, in this example, even with a negative overall link strength, Restaurant 6 may be elevated above the recommendation threshold such that the user receives a recommendation tailored to his characteristics.

The recommendation engine 112 may also perform geometric contextualization based on the aggregate or individual quality of the recommendation data identified in the recommendation set. The quality of the recommendations in the recommendation set can also be determined based no the overall link strength between the recommended venues and venues identified by the user in a search query. Further, in selected embodiments, the quality of the recommendation data is determined by identifying the effectiveness of the recommendation based on previous recommendation stored in the data repository 118. As described above, certain prior recommendations may have a validation label if the recommendations have been determined effective based on user reviews, user financial data, user geographic data or other information as previously described herein. Further, the quality of the recommendation data can be determined based on the recommendation effectiveness data previously described herein with respect to identifying user financial transactions at the recommended venue, habitual user proximity to the venue and so forth. Accordingly, assuming the recommendation engine 112 generates a recommendation set having data for five recommendations that are all below the recommendation threshold, the recommendation engine 112 can search each recommendation data item to determine which recommended venues are most closely related to the recommendation data that has previously been determined to be effective or have the strongest overall link strength to venues identified in the search query. Based on this determination, the recommendation engine can then perform geometric contextualization by determining a normalization factor that will elevate the requisite amount of recommendations from the "effective subset" above the recommendation threshold.

An example of geometric contextualization using a normalization factor based on the aggregate or individual quality of the recommendations in the recommendation set is illustrated in FIG. 21C with reference to FIG. 21A. In this example, as with the previous example, it is assumed that the recommendation engine has generated Restaurants 3, 6, and Restaurant X1 in response to the user query identified for FIG. 21A. In this example, assuming a recommendation threshold of 0.25 and an overall link strength value G that is less than 0.25 for Restaurant X1, none of the overall link strengths 2112 exceed the recommendation threshold. Accordingly, the system 100 determines that the recommendation engine 112 needs to perform geometric contextualization on the recommendation data. When performing geometric contextualization, the recommendation engine 112 determines that Restaurant 3 and Restaurant 6 are of higher quality based on the effectiveness of previous recommendations made by the recommendation engine 112 that are stored in the data repository 118 with a validation label. For example, the recommendation engine 112 can determine from data stored in the data repository 118 that User 2 has visited Restaurant 8 numerous times based on financial transactions from Restaurant 8 and further based on geographic habituations with respect to User 2 proximity to the neighborhood 02196. Accordingly, the recommendation engine 112 determines a quality factor for Restaurant 6 based on similarities between Restaurant 6 and Restaurant 8 such as having an identical price-point as Restaurant 8. Further, the recommendation engine 112 may determine the effectiveness of Restaurant 2 based on a multitude of positive review data from User 2 and further determine that User 2 often eats at venues having casual attire and lives in neighborhood 02199 such that a quality factor for Restaurant 3 is calculated based on these considerations. Further, for the purposes of this example, it is assumed that the recommendation engine 112 does not calculate Restaurant X1 as a high quality recommendation as the recommendation engine 112 can not determine many similarities to other venues based on effectiveness data in the data repository 118. Therefore, although Restaurant 6 has a low overall link strength 2114, the recommendation engine determines that a normalization factor should be generated based on Restaurant 6 and Restaurant 3 in order to elevate the overall link strength of these restaurants past the recommendation threshold.

In the example illustrated in FIG. 21C, the recommendation engine 112 determines a quality factor of 0.65 for Restaurant 3 as it has multiple similarities to previously determined effective recommendations. Further, the recommendation engine 112 determines a quality factor of 0.55 for Restaurant 6 as it has fewer similarities to previously determined effective recommendations stored in the data repository 118. For Restaurant X1, the recommendation engine 112 determined a quality factor of 0.15. At this point, assuming a user specified or system 100 specified recommendation limit of two, the recommendation engine 112 must calculate a normalization factor based on the quality factors such that two of the overall link strengths are elevated above the 0.25 recommendation threshold. Accordingly, exemplary values of overall link strengths are illustrated in FIG. 21C based on normalization based on the quality factors such that Restaurant 3 and Restaurant 6 are both above the recommendation threshold. Therefore, even with a low overall link strength, Restaurant 6 is still recommended in this example as two recommendations were required to be provided to User 2 and Restaurant X1 had an extremely low quality factor.

The recommendation engine 112 may also perform geometric contextualization based on the diversity of the recommendations in the recommendation set. For example, assuming the recommendation engine 112 generates six recommendations, only three of these recommendations may be related whereas the other three may be diverse from each other and the three related recommendations. For example, three of the recommendations may relate to restaurants all have the same genre and neighborhood whereas the other three recommendations have different genres and neighborhoods. The recommendation engine 112 may further compare price points and venue attire to determine similarities between the recommended venues. Accordingly, content-based links, collaborative links and content-collaborative links between the recommended venues are determined by the recommendation engine 112 to determine overall link scores therebetween thereby identifying which recommended venues are most closely related and which recommended venues are diverse from each other. The recommendation engine 112 may then determine a normalization factor to elevate recommendations that are similar to each other above the recommendation threshold as it is likely that multiple similar recommendations are closer to the affinity of the user as opposed to a variety of potential outlying recommendations have little to no relationship therebetween.

An example of geometric contextualization using a normalization factor based on the diversity of the recommendations in the recommendation set is illustrated in FIG. 21D with reference to FIG. 21A. In this example, as with the previous examples, it is assumed that the recommendation engine has generated Restaurants 3, 6, and Restaurant X1 in response to the user query identified for FIG. 21A. In this example, assuming a recommendation threshold of 0.25 and an overall link strength value G that is less than 0.25 for Restaurant X1, none of the overall link strengths 2112 exceed the recommendation threshold. Accordingly, the system 100 determines that the recommendation engine 112 needs to perform geometric contextualization on the recommendation data. When performing geometric contextualization, the recommendation engine 112 determines that Restaurant 6 and Restaurant X1 are closely related based on content-based links, collaborative links and content-collaborative links and that Restaurant 3 is quite diverse from both Restaurant 6 and Restaurant X1. For example, the recommendation engine 112 can determine from data stored in the data repository 118 that Restaurant 6 and Restaurant X1 have similar price points, similar neighborhoods, similar review data and similar hours of operation. Accordingly, the recommendation engine 112 determines a diversity factor for Restaurant 6 based on similarities between Restaurant 6 and Restaurant 3 and Restaurant X1. Further, the recommendation engine 112 repeats this diversity determination for both Restaurants 3 and X1 to determine their diversity factor with respect to the other restaurants in the recommendation set illustrated in FIG. 21D. Based on these determinations, exemplary values of diversity factors are identified in FIG. 21D with respect to each recommended venue. According to this example, recommended venues having a lower diversity factor are venues that have more similarity to other venues win the recommendation set whereas recommended venues having higher diversity factors are venues that are not that related to other venues in the recommendation set. For example, Restaurant 6 has the lowest diversity amongst the recommended venues and therefore has a diversity factor of 0.25 whereas Restaurant 3 is the least related amongst the venues and has a diversity factor of 0.75. Accordingly, exemplary values of overall link strengths are illustrated in FIG. 21D based on a normalization factor generated based on the diversity factors such that Restaurant 6 and Restaurant X1 are both above the recommendation threshold.

Geometric contextualization can also be performed with respect to a distance function defined by the user and/or the system 100 and stored as part of the user attribute data illustrated in FIG. 6. For example, each user may predefine his own individual distance function identifying geographic preferences with respect to any recommendations made on his behalf. The system 100 may also further redefine this distance function based on the local geography and cultural geography of a given location. For example, the user may live in a city and not have a car such that the system 100 defines the local public transportation boundaries as a distance function for recommendations such that any recommendation served to the user should be within those boundaries. The user may also identify the city limits as their geographic distance function. Further, the system 100 can analyze information from different cities to identify which cities are, for example, walking cities and which cities allow for broader transportation options. As such, for walking cities, the system 100 will define a smaller geographic distance function where as for driving cities, such as Los Angeles, the system 100 will define a larger geographic distance function. Accordingly, in selected embodiments, a radial distance function is defined for the user such that the recommendation engine 112 generates recommendations within the boundaries defined by the user and the system 100 even if these recommendations do not have as high of an overall link strength as other recommended venues in neighborhoods outside the users radial distance parameters. Further, for example, if the recommendation engine 112 generated 50 recommendations but only 20 of those were within the distance function defined with respect to that user, the recommendation engine 112 may focus only on the 20 geographically appropriate recommendations and then serve a recommendation set based on those that have overall link strengths above the recommendation threshold. In other selected embodiments, the system 100 may in this instance serve a percentage of those recommendations have the highest overall link strengths that are within the number of recommendations in the radial distance of the user.

The system 100 may also provide recommendations based upon a combination of the above-noted geometric contextualization methods. For example, the system 100 may perform geometric contextualization based on the number of potential recommendations, the individual quality of the recommendations, the diversity of the recommendations, the distance function and serve the user with recommendations based on the results of all three geometric contextualization processes. The recommendation engine 112 may determine a subset of recommendations within the generated recommendation set that are determined to be higher quality, determine an adequate normalization factor based on the number of recommendations in the subset and then perform geometric contextualization based on the normalization factor to generate the requisite amount of recommendations that are above the recommendation threshold. Further, the recommendation engine 112 may determine a subset of recommendations by determining which recommendations comply with the distance function identified by the user and/or system 100, determine a ranking of these recommendations in terms of quality with respect to overall link strength and effectiveness data and provide a heavy weighting factor to this ranking based on quality factors, determine which of these recommendations have the lowest diversity factor and slightly adjust the ranking to ascend recommendations having lower diversity factors and lower recommendations having high diversity factors, and then identify the number of potential recommendations to identify a percentage of recommendations that should be served to the user based on overall link strengths. In selected embodiments, the recommendation engine 112 can identify overlapping recommendations based on the various methods and serve these recommendations to the user. The recommendation engine 112 may also weigh the various methods of geometric contextualization based on their perceived effectiveness based on the recommendation data set and provide recommendations to the user based on overlap and weighting effects of the different processes.

Further, in selected embodiments, the normalization factor generated by the recommendation engine 112 may be calculated based on a combination of data relating to the number of potential recommendations available in the filter state, the aggregate or individual quality of those recommendations, and the diversity of those recommendations. Accordingly, the recommendation engine 112 can calculate a normalization factor by using calculated data values based on these factors as inputs. The normalization factor is then applied as described above to elevate the requisite amount of recommendations above the recommendation threshold.

As discussed previously herein, in other selected embodiments or in combination with the above described geometric contextualization methods, the system 100 may require that a certain percentage of recommendations out of the recommendation set be served to the user for each user query. This percentage can change based on factors such as the number of recommendations generated or the number of recommendations generated that have overall link strengths above the predetermined threshold. Accordingly, upon determining a set of recommendations based on overall link strength as previously described herein, the recommendation engine 112 may perform geometric contextualization to redefine a ranking of the recommendations based on at least the number of the recommendations, the quality of the recommendations, the diversity of the recommendations, and the distance function in order to provide an enhanced set of recommendations to the user. Upon ranking the recommendations in the recommendation set based on geometric contextualization, the most highly ranked recommendations are selected in descending order until the percentage of required recommendations is met. This set of recommendations is then server by the recommendation engine 112 to the user via the user interface.

In selected embodiments, and to lower processing requirements on the system, geometric contextualization can be performed only when a predetermined number of recommendations generated by the recommendation engine 112 based on overall link strength do not have overall link strengths above the recommendation threshold. Geometric contextualization then elevates the required amount of recommendations above the recommendation threshold such that the required amount of recommendations can be provided to the user via the user interface. However, in other selected embodiments, the system 100 may perform geometric contextualization for every search query performed by the user such that recommendations generated by the recommendation engine 112 and provided to the user based on overall link strength are further enhanced and reordered based on at least the number of potential recommendations, the quality of the recommendations, the diversity of the recommendations and the distance function of the particular user or users.

Regardless of how geometric contextualization is performed, the system 100 can serve the recommendation data or datum to the user via the user interface with the caveat that the system had to perform some additional processing based on the filter state to obtain the specified number of recommendations. Therefore, the user can be warned that although they have been provided the requisite number of recommendations that these recommendations did not perfectly match the filter state and should therefore be strongly considered. The system 100 could also provide the user with information based on the type of geometric contextualization performed with respect to the filter state. For example, if geometric contextualization is performed based on the number of potential recommendations and known user characteristics, the user may be informed that a certain venue was selected outside the filter state based on previous user characteristic venue price points. Alternatively, the system 100 could provide the user with a combination of recommendations based on this geometric contextualization method such that the system 100 informs the user that one recommendation is based on elevated overall link strength and the other recommendation is based on previously known user characteristics.

Figure 22:
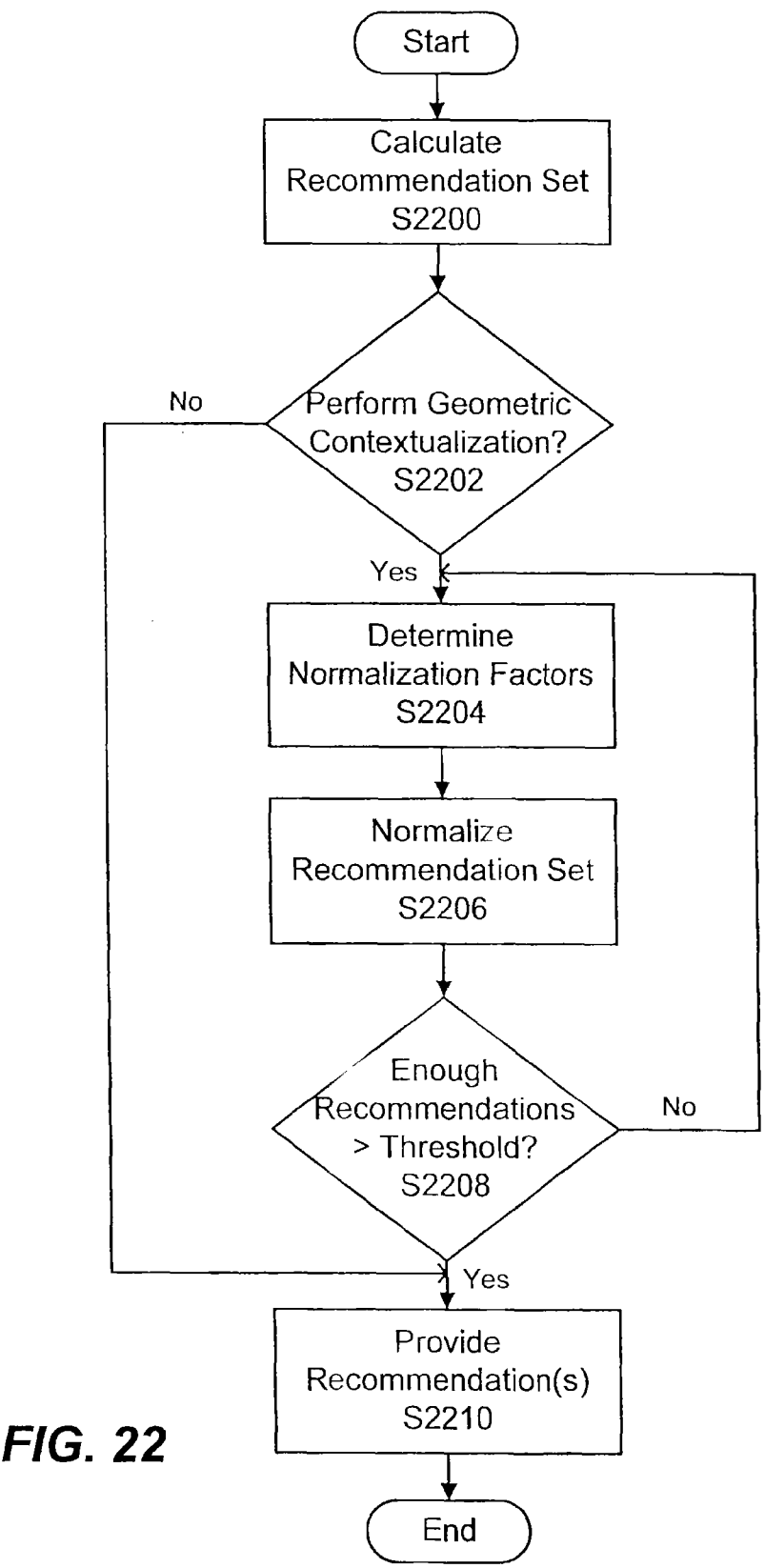
FIG. 22 is a flow chart illustrating geometric contextualization processing according to one example.

A description of the geometric contextualization according to selected embodiments is illustrated in FIG. 22. First, the recommendation engine 112 calculates the recommendation set at S2200 based on the filter state provided by the user at the time of the query. Accordingly, the recommendation engine 112 may determine a large set of recommendations based on overall link strength with respect to an affinity of a venue provided by the user but the number of recommendations in this recommendation set will be lowered based upon the user filter state. Therefore, the recommendation engine 112 must determine at S2202 whether geometric contextualization is required based upon the recommendation set. If there is a large number of recommendations in the recommendation set that exceed the recommendation threshold, the recommendation engine 112 may determine that geometric contextualization is not required thereby lowering the processing load on the system and providing quicker results to the user. At this point, the recommendation engine 112 proceeds to S2210 to provide the one or more recommendations to the user. However, if there a requisite amount of recommendations that exceed the predetermined threshold has not been generated, the recommendation engine 112 determines at S2202 that geometric contextualization is required. Further, the system may find a number of recommendations that exceed the recommendation threshold but if this number is lower than a user or system 100 specified number of recommendations required to be presented to the user, the recommendation engine 112 will proceed with geometric contextualization to obtain the requisite amount of recommendations. Further, in other selected embodiments, the recommendation engine 112 may always perform geometric contextualization on the recommendation set to further redefine a ranking of recommendations in the recommendation set based on the above-noted input factors such as quantity of recommendations, quality of recommendations, diversity of recommendations and user distance factors.

Upon determining that geometric contextualization is required, the recommendation engine 112 determines the normalization factor based on the information contained in the recommendation set itself as previously described. Therefore, the recommendation engine 112 determines which method or combination of methods for generating a normalization factor will be the most effective and proceeds to generate the normalization factor based on these methods at S2204. The recommendation engine 112 then normalizes the overall link strength values identified from the search results to obtain at least one recommendation with an overall link strength value above the recommendation threshold.

Once the recommendations have been normalized, the recommendation engine 112 analyzes at S2208 the normalized recommendation values to ensure that the recommendation set now contains enough recommendations values that exceed the recommendation threshold. If the number of recommendation values exceeding the recommendation threshold is still below the number of recommendations required by the user or system 100 for search results, the recommendation engine 112 repeats steps S2204 to S2208 to determine another appropriate normalization factor and re-normalize the recommendation set. This process is repeated until the requisite number of recommendation values exceeding the recommendation threshold is obtained. Once the recommendation engine 112 determines at S2208 that there is an adequate number of recommendations greater than the recommendation threshold, the recommendation engine 112 serves the one or more recommendations to the user via the user interface at S2210. The user can then perform additional searches and/or set a further filter state to further refine the search for additional recommendations.

As calculating what recommendations the recommendation engine 112 will generate for each possible filter state provided by a user ahead of time is extremely difficult and time consuming, the system 100 in selected embodiments performs the geometric contextualization in "real-time" to provide enhanced recommendation accuracy at the time of a search. Accordingly, via geometric contextualization processing, the system 100 can ensure that the recommendation engine 112 will always provide at least one recommendation to the user regardless of the filter state. This bolsters user confidence in the system and decreases the likelihood that users migrate to other systems.

Further, once geometric contextualization has been performed and the recommendation engine 112 has determined a recommendation set having an adequate number of recommendations, the system 100 may then perform error correction and data verification to further ensure and/or strengthen the accuracy of the recommended venues which may in turn be used to identify reviewers who have submitted review data with respect to the recommended venues and venues in other locations requested by the user.

Interconnectivity Augmentation

As previously described, the system 100 can present a user with recommendations based on user input and neural connections created between a variety of nodes via content-based relationships, collaborative relationships and content-collaborative relationships. Therefore, a user in Boston can get recommendations for other venues in Boston based on overall link strengths and post-recommendation processing performed by the recommendation engine 112. However, an issue arises when a user in one geographical area wants to get recommendations for venues in a geographically distant or diverse geographic location in which the system 100 does not contain much information about user interests. For example, a user in Boston may have an upcoming trip to New York and may query the system 100 for recommendations on places to eat in New York. This request may be difficult if there is an information deficit within the system 100 such that it contains large amounts of information as to which venues the user likes in Boston but not much, if any, information on the likes or dislikes of a user with respect to New York. In other words, neural network connections between the extensive neural network topology of the user in Boston and the limited neural network topology of the user in New York are not well defined. Therefore, the system 100 must use information known about the user in Boston to extrapolate information the recommendation engine 112 can use to generate a set of recommended venues in New York.

In one embodiment, the system 100 can use information relating to the geometric locale of the user performing the search by taking advantage of a predetermined amount of interconnectivity of venues in the neural network developed at that geometric locale. For example, FIGS. 7 and 8 represent neural network interconnectivity based on connections formed via content-based and collaborative interrelationships defined based on user data, review data and venue data as previously described. This information is based on Restaurants 1-12 that are located in Boston, Mass. Therefore, the system 100 already has at its disposal a variety of interconnectivity information with respect to the user and venues in the state of Massachusetts. The recommendation engine 112 can then, at the time of generating a recommendation, use review data relating to the local venues as well as the venues in New York to determine connections to venues in New York that are most closely related to venues in Boston.

First, the recommendation engine 112 receives which locale the user would like to obtain recommendations for and polls reviewer information to identify reviewers who have reviewed venues in the locale the user is searching for and the locale the user is located in when performing the search. This reviewer information is obtained from a variety of sources as described above with respect to web crawling and the identification of venue reviews. Once the recommendation engine 112 has determined the plurality of reviewers having provided reviews for both locales, the recommendation engine 112 processes the geometrically interconnected review data to form collaborative interrelationships values such that the system 100 can augment the neural network based on the collaborative nodal link values between the two locales. Accordingly, the recommendation engine 112 determines positive or negative affinity connections between a variety of venues within multiple locales based on the review data linking the locales via collaboratively formed interrelationships. At this point, the data repository 118 contains amplified inter-connections between venues in both locales from which the recommendation engine 112 can draw upon to make recommendations for the user.

To determine which venues from the geographically distance locale to recommend to the user, the recommendation engine 112 looks for strong overall link strengths between venues in the geographically distance locale and the venue(s) the user expressed an affinity for as part of his search query or venues the user is known to like. The venues in the geographically distant local having the strongest overall link strengths to these venues are then generated by the recommendation engine 112 and served to the user via the user interface. Therefore, the system 100 can provide a user with the ability to identify venues of interest in foreign locales by using review data between locales in which the system 100 contains a highly developed neural network topology with respect to user interests and a foreign domain in which the system 100 does not have much information about user interests by augmenting the neural network interconnectivity therebetween via correlative review data.

FIGS. 23 and 24 provide an illustrative example of the initial processing of interconnectivity augmentation of determining interconnection data between two geographically diverse locals in response for a user query for a venue in New York based on an affinity for a venue in Boston. For the purposes of this example, it is assumed that the user lives in Boston and would like to determine a venue of interest for his upcoming trip to New York. Assuming the system 100 contains a well-developed neural network topology for users' interests in Boston but contains little information on users interests in New York, the system 100 must augment the existing neural network established based on interrelationships developed in Boston to include additional links to venues located in New York. Accordingly, in selected embodiments, all of the review data in which reviewers have provided reviews for both Boston and New York venues is identified and is used to determine collaborative relationships values between the venues in both cities. This information can then be used to update interconnectivity between the neural network topology in both Boston and New York thereby allowing the system to follow links from Boston to New York to recommend venues to the user.

To increase efficiency and decrease processing demands, in selected embodiments the system 100 may only perform interconnectivity augmentation with respect to venues that are closely related to the venue in which the user has expressed an affinity for in his search as determined based on at least the overall link strength or other methods described above. For example, in this embodiment if the user expresses an affinity for an American restaurant having casual attire and a low price point, the recommendation engine 112 will determine a set of venues having a strong overall link strength with respect to this restaurant within Boston and then perform interconnectivity augmentation to determine which of these venues have review data in which the reviewer also provided data for venues in New York. If there is not enough review data to determine ample interconnectivity information between the generated venues in both locales, the recommendation engine 112 will identify a plurality of other venues having a strong overall link strength with the previous set of generated venues and the system 100 will again determine if there is enough review data between both locales such that nodal links between both Boston and New York can be updated in a way that allows the recommendation engine 112 to recommend venues in New York with a high level of confidence. This process is repeated until the system 100 determines that a predetermined number of venues in which review data is available for both locales has been reached.

FIG. 23 provides an illustrative example of a plurality of venues identified by the system 100 in which Reviewers 1-5 have provided review data for both Boston and New York. For illustrative purposes and the ease of explanation, FIG. 23 provides three venues in both New York and Boston but it is noted that this is only a non-limiting example as additional restaurants would likely be included when performing interconnectivity augmentation. As seen in FIG. 23, Reviewer 1 is an avid reviewer and has provided a plurality of reviews in both Boston and New York and Reviewer 3 is less active and has only provided review data for one restaurant in New York and Boston. For the purposes of this example, it is assumed that Restaurant D is the actual venue the user expressed an affinity for when performing a search for restaurants in New York, Restaurant E is a restaurant having a strong overall link strength to Restaurant D, and Restaurant F is a restaurant having a low overall link strength to Restaurant D. Assuming that an adequate number of venues having reviews in both Boston and New York have been identified by the system 100, collaborative based link strengths are determined based on the review data.

FIG. 24 illustrates the collaborative based links strengths between Restaurants A-F based on the reviewer ratings illustrated in FIG. 23. Accordingly, Restaurant A and Restaurant F have a strong collaborative interrelationship nodal link value of +1.5 based on strong reviews by Reviewer 1 whereas Restaurant D and Restaurant F have a very low collaborative nodal link value of −1.5 based on opposite affinities expressed by both Reviewer 1 and Reviewer 2. These collaborative venue link values represent interconnections between Restaurants A-C of New York and Restaurants D-F of Boston. Therefore, as previously discussed, through the process of interconnectivity augmentation, the system 100 traces sparse cross connections between venues of different locals (Boston and Yew York) to create "spider webs" of information therebetween. The recommendation engine 112 can then navigate links of these spider web based on overall link strengths to determine recommended venues in New York based on the neural network topology interconnections between Boston and New York.

FIG. 25 presents a connectivity diagram illustrating the spider web generated by the system 100 based upon a user query for a restaurant in New York and the review data obtained for venues in both New York and Boston. Solid connections between the venues represent a positive collaborative link between the venues whereas dotted connections represent a negative collaborative anti-link between the venues. Further, the thicker the line illustrated in FIG. 24, the stronger the value (either negative or positive) for that particular nodal link. For example, the nodal link 2500 between A and F is a solid line with relative thickness based on the overall collaborative link strength value of +0.75. Further, the nodal anti-link 2502 between D and F is has a relative thickness and is dashed to represent a negative overall collaborative link strength of −1.5. Based upon these links created by the system 100, the recommendation engine 112 can determine a variety of recommendations for the user for New York based on the overall collaborative interconnectivity link strengths between the restaurants in Boston and New York.

For example, as it is assumed that Restaurant E is the actual restaurant in Boston the user expressed an affinity for in his search query, the recommendation engine 112 may generate a recommendation containing Restaurant A in New York as Restaurant A is directly linked to Restaurant E via nodal link 2500 and has a positive collaborative nodal link value. The recommendation engine 112 may also recommend Restaurant B as it is linked to Restaurant E via Restaurant A (nodal link 2504) and has a strong nodal link strength with Restaurant A. As Restaurant C does not have any collaborative connections to Restaurant E or Restaurant A, the recommendation engine 112 would likely ignore this node when presenting New York venue recommendations to the user.

Assuming the user expressed an affinity for Restaurant F in his search query for recommended venues in New York and the network topology was defined by the system 100 based on reviewer data as illustrated in FIG. 23, the recommendation engine 112 may still recommend Restaurant A over Restaurant B even though both Restaurant A and Restaurant B are linked to Restaurant F as Restaurant A has a stronger collaborative nodal link strength with Restaurant F via link 2500. However, Restaurant B could also be served to the user as an alternative choice. However, if the restaurant for which the user has expressed an affinity for in the search query is not included in the network topology data because there was not enough reviewer information relating to that restaurant, the system 100 will determine the venue having the strongest overall link to the restaurant provided in the search query but which also has ample review data with respect to venues in the foreign local in which the user is seeking recommendations. The recommendation engine 112 can the navigate the neural network amplified via interconnectivity augmentation to find a recommendation in New York based on the venue in Boston having the strongest overall link strength value to the venue the user expressed an affinity for in his search query.

Accordingly, the interconnectivity augmentation process determines venues having strong overall link strengths with venues the user expresses an affinity for when performing a search query and then determines a plurality of reviewer data with respect to these venues and the location in which the user is requesting recommended venues. A network topology based upon the collaborative values between venues with respect to the review data is generated and it is determined whether there enough information from which the system 100 can make a recommendation to the user. If there is not enough information, the system 100 generates additional local venues with links to the restaurant provided in the search query and the network topology is updated based on review data with respect to the venues and the venues in the foreign local. Once there is a predetermined amount of collaborative link strength data between the plurality of venues both within the locale of the user and the foreign local, the recommendation engine 112 determines recommended venues in the foreign local by following the strongest overall nodal links in the network topology while starting at the local node expressed in the search query or the local node having the strongest overall link to the venue identified in the user search query. The recommended venues are then served to the user via the user interface.

If the user provides additional filters with the search query in addition to the affinity for a particular venue, the system 100 will take this into account when creating the network topology by harvesting data on the local and foreign venues and identifying which data corresponds to the data within the filter. For example, if the Boston user is a New England Patriots fan and is looking to watch the Monday night game in New York while avoiding heckling from New York Giants fans who mistakenly believe Eli Manning is better than Tom Brady, the user may indicate that he would like a restaurant identified as Patriots friendly. Accordingly, based on the example illustrated in FIG. 25 in which the user expressed an affinity for Restaurant E in Boston as part of his search query, if Restaurant A is a Giants friendly venue and Restaurant B is a Patriots friendly venue, the recommendation engine 112 will recommend Restaurant B over Restaurant A even though Restaurant A has a stronger overall collaborative link value to Restaurant E based on the reviewer data therebetween. Further, the user may have kids and will therefore want a venue that is friendly to children. Therefore, venue attributes and user characteristic attributes can also be taking into account by the system 100 when performing interconnectivity augmentation to determine recommendations in locations where the system 100 does not have a lot of information about what the user likes in that particular location.

In other selected embodiments, the system 100 may perform interconnectivity augmentation to recommend venues in a foreign local in which the system 100 has very little information about user interests by taking into account user specific information known to the system 100 in other locals As with the examples discussed above, the system 100 may not have much information about what the user likes in New York but may have ample information about what user likes in Boston. Accordingly, user attributes, review data from the user, previous recommendations known to have been effective and the interrelationships formed based on content and reviewer data from the user local can all be used to extrapolate venue "clones" in a foreign local that are similar to or identical to venues known by the system 100 to be well received by the user. These nodal doppelgangers can then be incorporated into the neural network topology previously defined as discussed above based on content and collaborative interrelationships within the local area of the user such that the system 100 can follow the nodal links to determine venue clones in a foreign locale that may be of interest to the user. Further, the list of nodal doppelgangers will inherently be cross-connected with a plurality of other venues within the foreign locale such that additional recommendations can be made to the user. Accordingly, alternatively or in addition to review data between two locales, interconnectivity augmentation can also be performed based solely on user interest information from other locales.

FIG. 26A is a chart illustrating an exemplary sample set of venues within New York, N.Y. that are stored within the data repository 118. As with FIG. 4, each Restaurant A-E has its own price, genre, hours of operation, attire, and neighborhood. Accordingly, as described previously with respect to FIG. 4-12 and FIG. 23, the system 100 contains information, determined via web crawling and web harvesting, about venues in Boston and nodal interrelationships therebetween and knows information about venues in New York but does not have information on nodal links between the venues in Boston and the venues in New York. Therefore, interconnectivity augmentation can be performed utilizing nodal cloning in order to determine intercity nodal relationships between Boston and New York.

Assuming the user is located in Boston and has performed a search query for venues in New York, the system 100 must determine which venues the user is typically interested in Boston. The system 100 can receive as part of the search query for venues in New York, restaurants in Boston that the user likes in which he wishes to find similar restaurants in New York. The system 100 can also determine which venues the user likes based on previous recommendation data that has been determined to be effective via financial transactions of the user, positive review data, GPS data or other data as described previously herein. The system 100 then compiles this list of interests of the user within Boston and compares each venue or piece of interest to known venues in New York to determine nodal doppelgangers within New York that have many of the same features of the venues identified within Boston.

FIG. 26B is a chart illustrating the results of processing to determine a congruency factor representing a similarity level between the venues of interest from Boston and venues in New York. In FIG. 26B, it is assumed for the purposes of this example that both Restaurant 6 and Restaurant 10 were included as part of the search query by the user for restaurants in New York and/or were determined to be venues that were previously recommended and were effective with respect to the user. Accordingly, the system 100 compares each attribute of Restaurant 6 and Restaurant 10 to each attribute of a plurality of identified venues within New York in an attempt to determine one or more venue clones having a high congruence factor with Restaurant 6 and Restaurant 10 of Boston.

Based on these comparisons, Restaurant C of New York has the highest congruency factor with respect to Restaurant 6 as the price is the same as Restaurant 6, the genre is the same as Restaurant 6 and the attire is the same as Restaurant 6. Conversely, Restaurant D has the lowest congruency factor with respect to Restaurant 6 as the price point is extremely high, the genre is different and the attire is different. With respect to Restaurant 10 of Boston, Restaurant D has the highest congruency factor as the price point is similar, the genre is the same and the attire requirements are the same. Accordingly, by determining the congruency factors, the system 100 can identify venues in a foreign local that have the features similar to user-provided venue filters and/or venues which have been determined to be effective for the user in the past.

The congruency factor scores are exemplary and will change based on various venue attributes as well as different weights assigned to various venue attributes. For example, genre may be weighted the highest as a user searching for restaurants in New York who provides Restaurant 6 of Boston as part of the search query will likely identify with New York restaurants that have the same type of food. Further, price may be weighted less than genre but more than attire. These weights can be set automatically by the system 100 or manually by the user performing the search. The congruency score for Restaurant 6 of Boston in comparison to Restaurant C of New York is not 1.0 because it is assumed that there may be other factors taken into consideration in determining how similar Restaurant C is to being a clone of Restaurant 6. These factors include, but are not limited to, hours of operation, review data, user characteristic data and previously defined nodal link interrelationship information between Restaurant 6 and other restaurants in Boston or New York. The user may also indicate likes and dislikes which will affect the weighting of the various venue attributes. For example, if the user detests dressing up when going out to dinner, the system 100 may apply an extremely high weighting factor to the attire attribute thereby causing restaurants requiring formal attire to have extremely low congruency factors even though they are similar to the identified local restaurant in many other respects.

Once the system has determined the plurality of congruency scores with respect to the restaurants of interest identified based on the venues provided in the search query or those known by the system 100 to be effective, the system 100 updates the neural network topology to form nodal links between the identified venues of interest and the venues identified in the foreign local. In selected embodiments, the system 100 may link all nodes between the locales regardless of the congruency factor or may link only those nodes having a strong congruency factor therebetween. Accordingly, the system 100 or user may assign a predetermined threshold congruency factor for magnifying nodal interconnectivity between various locales.

Figure 27:
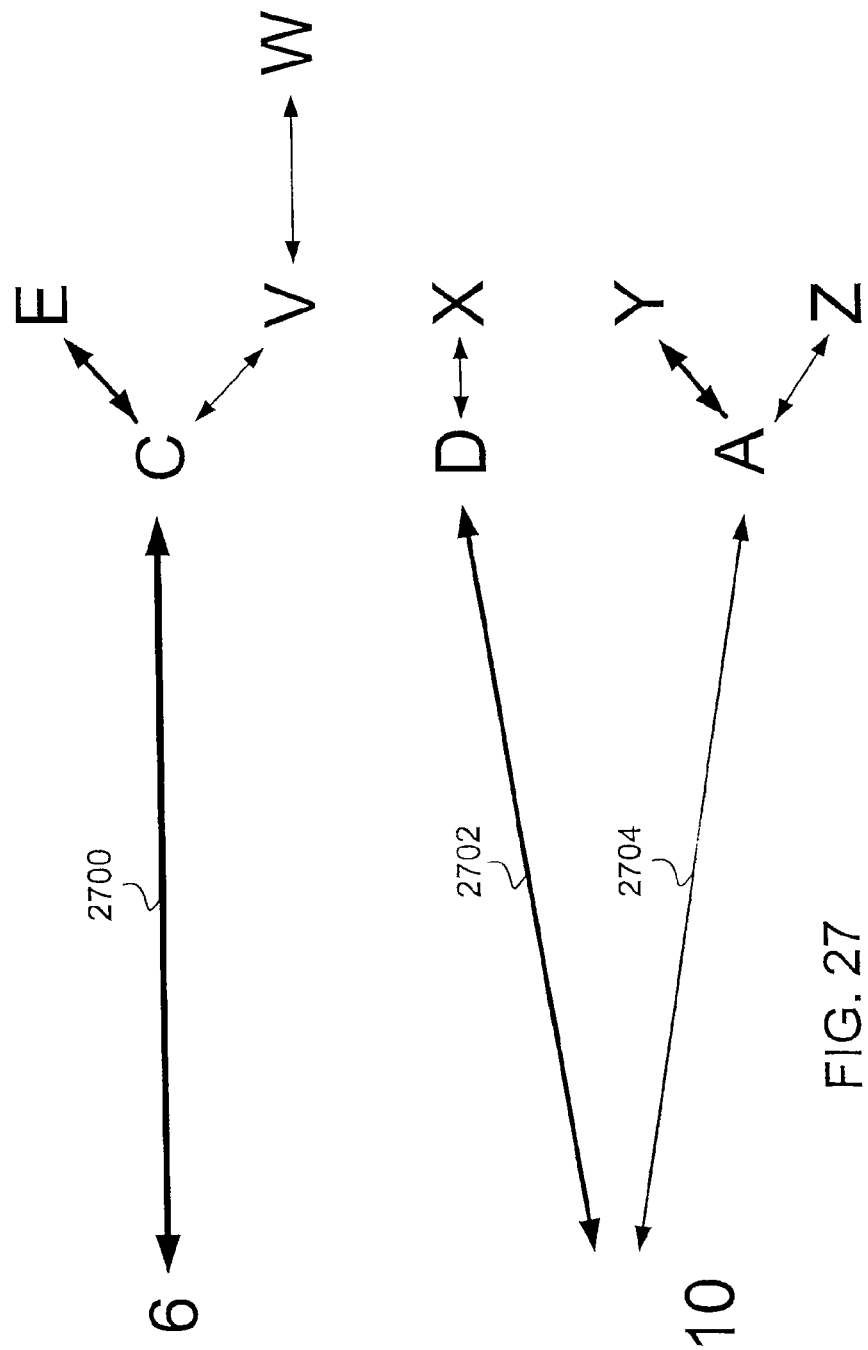
FIG. 27 illustrates inter nodal connections after interconnectivity augmentation processing according to one example.

FIG. 27 represents nodal interconnection magnification between Boston and New York based on the plurality of congruency factors determined with respect to Restaurant 6 and Restaurant 10 of Boston, and Restaurants A-E of New York. For the purposes of this example, FIG. 27 only illustrates nodal inter-locale augmentation for nodes having a congruency score of at least 0.60 or better. As illustrated in FIG. 27, a nodal link 2700 is formed between Restaurant 6 of Boston and Restaurant C of New York as the congruency factor therebetween as determined by interconnectivity augmentation processing is 0.85. Further, nodal links 2702 and 2704 are formed between Restaurant 10 of Boston and Restaurants A and D of New York as Restaurant 10 and Restaurant A have a congruency factor of 0.65 and Restaurant 10 and Restaurant D have a congruency factor of 0.75. The difference in thickness of the nodal link represents the strength of the congruency factor such that the thicker the nodal link the more similar the venues are to each other. Accordingly, nodal link 2504 based on a congruency factor of 0.75 is thicker than nodal link 2502 having a congruency factor of 0.65. Further, nodal link 2500 based on a congruency factor of 0.85 is thicker than both nodal link 2502 and nodal link 2504. Restaurants E, V, W, X, Y and Z are Restaurants in New York that have strong overall link strengths to Restaurants C, D and A as illustrated based on content-based interrelationships, collaborative interrelationships, content-collaborative interrelationships and tiered relationships as described previously herein.

Based on the amplified neural network formed between Boston and New York formed as a result of the interconnectivity augmentation performed in response to a search query for a venue in New York based on an affinity for Restaurant 6 and/or Restaurant 10 of Boston, the recommendation engine 112 can traverse the links in the updated neural network topology to provide recommendations to the user for venues in New York. For example, as illustrated in FIG. 27, for a user expressing an affinity for Restaurant 6, the user will be served with a recommendation for Restaurant C in New York. Similarly, for a user expressing an affinity for Restaurant 10, the user will be served with Restaurant D and Restaurant A with an indication the Restaurant D was the closest venue based on the user's search query. Further, interconnections within the neural network of New York can further be used to provide larger recommendation sets. For example, for a user expressing an affinity for Restaurant 6 in a search query, Restaurant E may be recommended next as having a strong overall link strength to Restaurant C with Restaurant V and W being recommended next as alternative venues based on their overall link strength with respect to Restaurant C.

As described previously, if the user provides additional filters with the search query in addition to the affinity for a particular venue, the system 100 will take this into account when creating the network topology by harvesting data on the local and foreign venues and identifying which data corresponds to the data within the filter. For example, if the user performs a search query by expressing an affinity for Restaurant 6 but also provides a filter that requires a medium price point for recommended venues, the recommendation engine 112 may recommend Restaurant E over Restaurant C as the recommendation engine 112 is able to traverse the nodal link 2700 to determine the Restaurant C is a good match but further determines based on venues having strong overall link strengths with respect to Restaurant C that Restaurant E is a better choice because it has a medium price point as compared to Restaurant C's low price point. Therefore, venue attributes and user characteristic attributes can also be taking into account by the system 100 when performing interconnectivity augmentation to determine recommendations in locations where the system 100 does not have a lot of information about what the user likes in that particular location.

It should be noted that the system 100 may also contain large amounts of information with respect to user interests in locales other than the one in which the user is located that can also be used to perform interconnectivity augmentation based on congruency factors via a determination of nodal doppelgangers. In other words, when a user from Boston is looking for venues of interest in New York, the system 100 may also perform interconnectivity augmentation in the above-noted manner by using recommendations known to be effective in other areas with respect to the user, such as Washington D.C., to further enhance the variety of recommendations provided to the user. Further, congruency factors determined between different locales can be weighted differently based on user time spent in the locales, the number of effective recommendations or the like and then compared to determine a more accurate recommendation set for the user. Additionally, the system 100 may encounter difficulties performing interconnectivity augmentation between Boston and New York if venue information from New York is not readily available. In such a situation, if the system 100 already contains strong links to another city, such as strong links between Boston and Washington, D.C., and strong links from Washington D.C. to New York, the system 100 may determine recommendations by navigating the nodal network topology from Boston to New York via nodal links provided in Washington D.C.

Although the links may be uni-directional or bi-directional as previously described herein, the nodal links determined via interconnectivity augmentation as illustrated in FIGS. 25 and 27 are bi-directional to further enhance information available to the system 100 in the event that similar future searches are performed by the same user or other users with similar interests either in Boston or New York.

As note above, the system may perform interconnectivity augmentation based on both review data between different locations and via a determination of nodal doppelgangers in different locales. Accordingly, the system 100 may update the neural network topology of nodes between different locales based on review data and then may further update this network topology based on nodal link determinations identified via congruency factors. As such, interconnectivity augmentation therefore provides the system 100 with the ability to extrapolate information about foreign systems to generate an updated neural network topology having connections between a locale in which the system has ample information about what the user likes and a local in which the system 100 has very little information about what the user likes. This provides enhanced functionality to the user in that the system 100 acts as a travel companion to provide venues of interest to a user when a user is traveling to various locations. This increases the likelihood that the user will enjoy his experience when traveling and will further enhance the network topology thereby increasing the accuracy of future recommendations to the user.

Further, error correction and data verification can be performed to ensure and/or strengthen the accuracy of the recommended venues which may in turn be used to identify reviewers who have submitted review data with respect to the recommended venues and venues in other locations requested by the user.

Merchant Interface

The venues are operated by merchants, or third party vendors, which may comprise merchants such as restaurant owners, airlines, or hotel operators. The system 100 may be configured to provide merchants a visualization of users' behavior. For instance, merchants may be provided access to ant trail data patterns, including in real time. Merchants can "interact" with these patterns and request the system 100 to inject disruptive content such as promotional offers related to a user's present location and expressed preferences.

Merchants may also be provided anonymized profiles of the likes and dislikes of their customers (i.e. users who patronize their establishment). This can include reviews provided by reviewers and users who provide feedback (who also constitute reviewers).

Additionally, it is anticipated that merchants will likely wish to provide personalization services to their customers to ensure customer retention while increasing revenue. For example, merchants selling products either online or in the brick-and-mortar world may want to identify recommendations for their customers based on at least previous purchases by the customer, customer attribute data, review data, data about the product itself and the accompanying neural network topology generated based such information. However, it is unlikely that merchants will have this functionality to provide users, much less the ability to provide these types of services on the scale and accuracy of the system 100. Accordingly, the system 100 provides an application programming interface (API) operated by the server 102 for allowing merchants to supply data to the system 100 which can be used by the recommendation engine 112 to determine recommendation or similarity data. The system 100 then sends this data back to the merchant.

Figure 28:
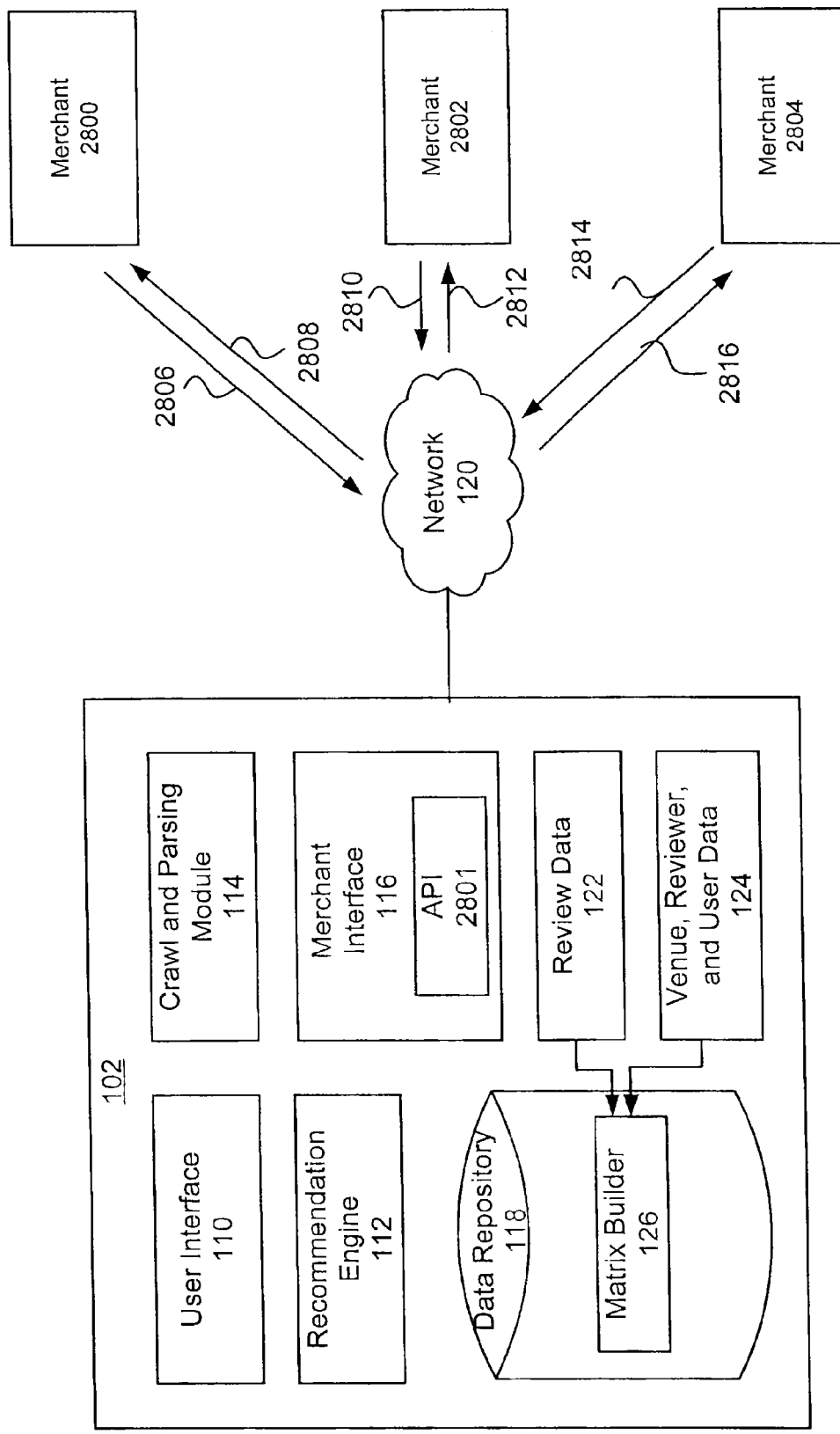
FIG. 28 illustrates an exemplary interaction via the system API between the server and a plurality of merchants.

FIG. 28 illustrates an exemplary interaction between the system 100 and a plurality of merchants/third party vendors 2800, 2802 and 2804 via an API 2801. FIG. 28 includes the server-based recommendation generation system 100 hosted on the server 102 as illustrated in FIG. 1 and therefore like designations are repeated. Further, the merchant interface 116 is illustrated as including the above-noted API 2801. As illustrated in FIG. 28, the server 102 is connected to a plurality of merchants 2800, 2802 and 2804 via the network 120. Each merchant can provide the server 102 with a plurality of requests which are received by the API 2801 via the network 120. The requests can include information such as identification information of the merchant, the type of request, the type of information included in the request, the data which the system 100 will process, a request for a quote for processing the request, and temporal information with respect to the request itself. In response to receiving requests from the merchants, the recommendation engine 112 processes the requests and generates results which are output to the merchants via the API 2801 and network 120.

In selected embodiments, the API 2801 includes a set of programming instructions and standards for accessing the system 100 such that merchants can appropriately format their requests in a manner understood by the system 100 and so the API 2801 can provide responses to the merchants in a manner manageable by their systems. In other words, the API 2801 provides programming such that the server 102 and remote applications operated by the merchants 2800, 2802 and 2804 can communicate with each other through a series of calls. For example, web services having a collection of technological standards and protocols, such as extensible markup language (XML) may be provided thereby allowing various parties from different systems to communicate. The API 2801 may be included as part of a software development kit (SDK) along with programming tools thereby providing the merchants 2800, 2802 and 2804 with instructions on how to best interact with the system 100. Additional technological standards, protocols and programming languages may be included such as simple object access protocol (SOAP) for encoding XML messages so that they can be understood by operating systems over any type of network protocol, and universal description, discovery and integration (UDDI) for allowing the merchants 2800, 2802 and 2804 to list themselves. Mashups may also be implemented within the system 100 thereby providing functionality from the API 2801 of the system 100 in conjunction with other web applications.

For the ease of explanation, FIG. 28 illustrates three merchants 2800, 2802 and 2804 providing different requests to the server 102 but one of ordinary skill in the art would clearly recognize that more than three merchants can connect to the server 102. In FIG. 28, it is assumed that the merchant 2800 has identified a cluster of items of which a customer of the merchant 2800 has expressed a preference as determined by purchase data, shopping habits, and other methods as would be understood by one of ordinary skill in the art. For the purposes of this example, it is assumed that the customer of the merchant 2800 has purchased three bottles of wine (or has three bottles of wine in their shopping cart) and is looking for one more bottle of wine. The merchant 2800 may want to provide the customer with a recommendation of additional wines for purchase and therefore interacts with the server 102 via the request 2806 and API 2801. The request 2806 defined by the API 2801 infrastructure includes a request for the recommendation engine 112 to determine one or more recommended items that the user may like based on the cluster of items included in the request 2806. The request 2806 may include identification information of the merchant 2800, information specifying the type of request such as a request for recommendation data, a categorical description of the data, and the data of which the system 100 will determine recommendations. For example, the request 2806 may include the name and address (virtual and real-world) of merchant 2800, a request for recommendations based on the data set provided by the merchant 2800, information specifying that the data set relates to beverages or more specifically alcoholic beverages such as wines, and the list of wines for which the merchant 2800 would like the system 100 to process. This request 2806 may be served to the system 100 at the time of a purchase by the customer or at a later time when the merchant 2800 is attempting to determine advertisement information based on previous customer activity.

Once the request 2806 is received by the API 2801 via the merchant interface 116 and network 120, the system 100 determines the type of request and the type of information included in the request. For example, the system 100 parses the system call from the merchant 2800 to determine that the recommendation engine 112 must generate recommendations as described above based on the list of wines provided in the request 2806. If the type or genre of information is not included in the request, the system 100 may generate an error message to the merchant 2800 or may attempt to determine the type of information. For example, the recommendation engine 112 may attempt to determine whether the items within the request 2806 relate to cars, food, video games, or as in this instance, wine based on keywords identified in the request 2806 itself.

Once the recommendation engine 112 has determined the type of request and what type of information is included in the request, the recommendation engine 112 identifies whether the data repository 128 includes the appropriate neural network topology generated by the matrix builder 126 in which to process the request 2806. Specifically, in selected embodiments the system 100 may generate network topologies in all types of fields and for all types of products in addition to the venues discussed above. Therefore, the data repository 118 may already contain a neural network topology for the cluster of items relating to wine contained in the request 2806. In other embodiments, the system 100 may dynamically generate a new network topology or update a previously existing network topology as previously described herein (via harvesting, creating nodal links, error correction and data verification, interconnectivity augmentation, etc) based on the type of items identified in the request 2806.

Once the system 100 has determined that a suitable neural network topology exists for which to process the request 2806, the recommendation engine 112 generates a recommendation set for the merchant 2800 of items that users may like based on the cluster of items provided in the request 2806. Specifically, the recommendation engine 112 generates recommendations based on the methodologies described previously herein such as identifying overall link strength rankings, performing error correction and data verification with respect to source sites, performing geometric contextualization with respect to the generated recommendation set and performing resonance checking of each recommendation in the recommendation set. Once the final recommendation set is generated by the recommendation engine 112, the server 102 provides the recommendation set including a plurality of recommended wines to the merchant 2800 in a response 2808 via the merchant interface 116, API 2801 and network 120.

FIG. 28 illustrates another example of a request 2810 from merchant 2802 including at least the merchant 2802 identification information, a request that the system 100 provide information as to what items may be similar to the items provided in the request 2810, an identification of the items as beverages and the list of one or more wines. For example, assuming that the data items included in the request 2810 again include three bottles of wine, the merchant 2802 requests information as to what other drinks may be similar to the bottles of wine such as other wines, champagne or liquor, that the user may like based on a similarity to the wine bottles included in the request 2810. In this instance, the recommendation engine 112 identifies the type or genre of information included in the request 2810 and determines whether the appropriate neural network topology exists for similar items. Specifically, the recommendation engine 112 determines a plurality of items that may be similar to the items included in the request 2810 and determines whether an adequate neural network exists for each item.

The system 100 may determine similarity to an item in a variety of ways. For example, in selected embodiments, the system 100 determines that bottles of wine fall into a drink category and therefore that only drinks should be contemplated by the system 100 when attempting to determine similarities. This can be accomplished by performing keyword searches with respect to the items included in the requests and/or by referring to a previously defined database updated based on user and vendor requests. Next, additional subcategories are determined until the system 100 identifies a plurality of categories deemed to be most similar to the items included in the request. For example, the system 100 may further identify the wine is a type of alcohol and therefore the system 100 should only search for other alcohols such as beers and liquors. Accordingly, the system 100 can generate a similarity score of various beverages based on nodal link strengths between beverages having similar attributes within the neural network. In other selected embodiments, the merchant 2802 may also provide in the request 2810 similar categories to search based on the items provided by the merchant 2802.

Once a list of items deemed to be similar to those listed in the request 2810 has been determined, the recommendation engine 112 generates a recommendation set as previously described herein and provides the recommendation set to the merchant 2802 in a response 2812. Specifically, overall link strengths are calculated by the recommendation engine 112 via collaborative-interrelationships data based on reviewer data between wines identified in the request 2810 and items deemed to be similar (such as liquors and beers), content-based interrelationships based on similar attribute data with respect to users who both drink the wines identified in the request 2810 and liquors and beers and wine attribute data such as the type of wine, the alcohol content, the location in which the wine is created, and content-collaborative interrelationships. Further, interconnectivity augmentation may be performed to bolster the neural network connectivity as well as geometric contextualization and error correction and data verification to enhance recommendation accuracy.

As described previously above, the requests coming from the merchants may also include filters with respect to the items included in the requests. For example, Merchant 2800 may request that the system 100 only return recommendations for wines that were made in or before a certain year. Merchant 2802 may request that recommendations for similar items be restricted to different types of beer rather than also including liquor as a subset. Accordingly, the recommendation engine 112 is able to provide merchants not only with recommendations for the same item or similar items included in requests but is also able to fine tune recommendations specifically tailored towards merchant requirements. Further, requests may include user attribute information from the merchant thereby providing the system 100 with additional information from which to generate a recommendation.

The API 2801 further provides the functionality for merchants to communicate a complete index of their items as well as user information with respect to the items to the system 100 with a request that the system 100 create a neural network topology specifically tailored to the communicated index of items. Accordingly, the request can also include item attribute data and item review data. The neural network topology generated by the system 100 can then be used by the recommendation engine 112 to provide enhanced recommendations that are finely tuned to the enriched data provided by the merchant. This neural network topology can be generated solely based on the merchant index of items or an existing system 100 neural network topology can be updated based on the information contained in the merchant index. Therefore, such a request may contain identification of the merchant, the type of data, the complete index of the merchant's products and a request that the system 100 build personalization maps such as a neural network topology based on the data provided by the merchant. The request may also include user attribute information with respect to these products. For example, request 2814 from merchant 2804 is a request providing the name and address of merchant 2804, an identification of the data as relating to wine, all of the wines sold or made by the merchant 2804 as well as user information with respect to each bottle relating to purchases statistics, likes or dislikes and other affinity data, and a request that the system 100 generate a neural network topology based on this information.

Once the request is received by the merchant interface 116 via the API 1801, the matrix builder 126 generates a neural network having internodal connections between all of the wines identified from the merchant-provided index and the user data provided in the request 2814. The system 100 may further augment the neural network using other information harvested by the system 100 as described previously herein. Accordingly, the request 2810 may also include information identifying whether or not the merchant 2810 wants the system 100 to use information additional to the information provided in the request 2810.

Once the neural network is generated by the system 100, the merchant 2804 can then submit further requests to the server 102 via the network 120 and merchant interface 116 as previously described herein in order to obtain recommendations or similar items generated by the recommendation engine 112. Further, the merchant 2804 may further request that the server 102 communicate the neural network topology information to the merchant 2804 in response 2816 so that the merchant can use such information internally.

Based on the information provided in the requests from the merchants, the API 2801 may capture this information such that the system 100 may update the neural network topology for further use with the merchant as well as with other users of the system 100. For example, when merchant 2800 sends the request 2806 including the three bottles of wine, the system 100 may determine that the user picked these three wines and that pairing information can be obtained with respect to the user and the wines themselves. Accordingly, this information can be used by the matrix builder 126 to create or update nodal links with respect to data items of this type. Further, the API 2801 can capture user information in the requests thereby mapping user attribute information with specific pairings of items. The system 100 may also capture via the API 2801 the effectiveness of the recommendations provided to the merchants in the system 100 responses. For example, the system 100 may send system call requests via the API 2801 to merchants requesting that the merchants return user effectiveness data with respect to recommended items such as increased revenue based on certain recommendations and/or whether certain customers of the merchants have purchased items based on the recommendations served by the recommendation engine 112.

Accordingly, via the API 2801 the system 100 is able to provide specific merchants with personalization services thereby helping merchants retain customers and increase revenue. Merchants can request recommendation data from the server 102 as well as specific personalization maps with respect to information provided by the merchants relating to the entire catalog of merchant products. Further, while providing these services to the merchants, the system 100 simultaneously harvests merchant information to increase the accuracy of nodal connections in existing neural network topologies in areas relating to merchant product catalogs. Therefore, the merchants are provided with beneficial personalization services while also further enhancing those services for other users and merchants alike through their interaction with the system 100.

Shared Recommendations for Harmonized Group Decision-Making

A harmonized group decision-making process may include providing shared recommendation results based on a unified taste profile of multiple users, where the shared recommendations ideally collectively suit the unified taste profile of the group seeking the shared recommendation. In certain aspects of the present disclosure, a user personality matrix representing an individual user's taste profile may be determined for each user in a group decision-making dynamic, wherein each group member's user personality matrix can be mathematically "merged" to form a unified taste profile corresponding to the group rather than the individual. Accordingly, recommendations based, for example, on interrelational nodal strength characteristics between candidate venues and the unified taste profile may be determined by methods set forth herein.

Figure 29:
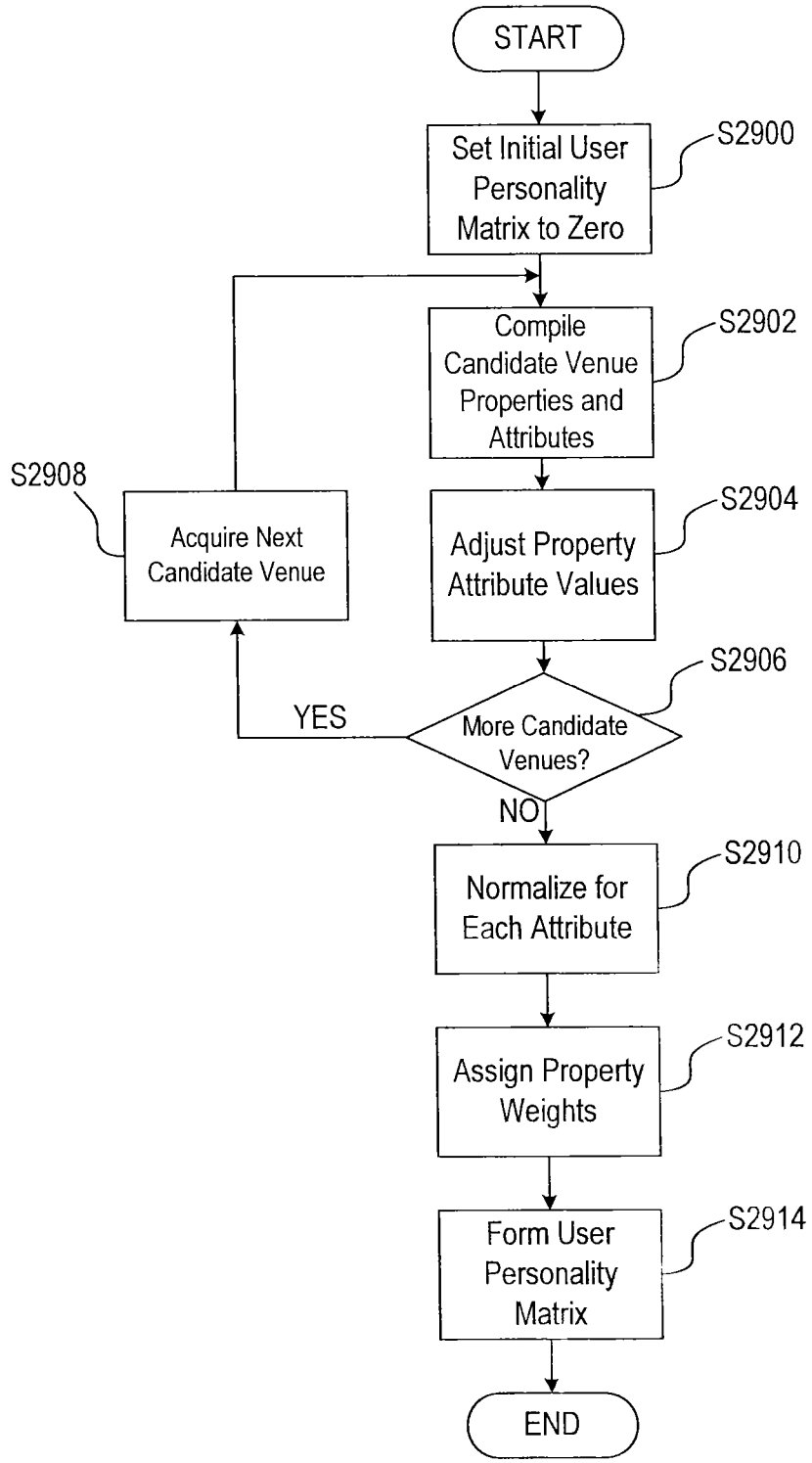
FIG. 29 is an exemplary algorithmic flow chart for calculating a user personality matrix according to one example.

FIG. 29 illustrates an exemplary algorithmic flowchart for calculating a user personality matrix. As discussed previously, the user personality matrix may represent a user's taste profile and/or a user's affinity for a set of venue properties. As previously noted, for convenience the term "venue" is used to refer to neural network nodes. It should be understood that the term "venue" is used herein to broadly refer to any entity or item (e.g., a restaurant, location, activity, content, users, reviewers, etc.) that is interrelated in the network with other network nodes. Venue properties included in the user personality matrix may be derived from a user's connection graph, which includes all venues for which a user has previously expressed an affinity. The user personality matrix may be calculated in real-time or saved and modified over time as affinities change and/or new venues are discovered and added to the user's connection graph.

Referring now to FIG. 29, the system 100 initially sets all values in the user personality matrix to 0 at step S2900. At step S2902, the system 100 compiles candidate venue properties and property attributes. Candidate venues may be broadly defined as any entity that may be returned as a shared recommendation result. Step S2902 may include acquiring a user's connection graph, extracting candidate venues from the user's connection graph, and dissecting the extracted candidate venues for their properties and property attributes. Exemplary venue properties and property attribute values are shown in the example of FIG. 4. Referring now to FIG. 4, column 1 in the figure represents twelve restaurant candidate venues that may be extracted from a user's connection graph. The second horizontal column listing categorical descriptors (city, state, etc.) represents a set of venue properties that may be extracted for the 12 restaurant candidates. The remaining portion of FIG. 4 represents attributes and corresponding attribute values, which may be represented as labels, codes, numerical values, or other identifiers.

Turning back to FIG. 29, the system at step S2904 adjusts the derived property attribute values based, for example, on nodal link strength with respect to the user. As discussed previously, nodal link strength with respect to the user may be determined, for example, by analyzing user reviews, frequency of visits, geospatial information, purchase history, second and higher order links with other users, second and higher order links with other attributes, or the like. The processing at step S2904 may result in property attribute values being calculated such that user preferences for a particular attribute and/or and overall affinity for a given property may be discerned.

Next, at step S2906 the system 100 determines if more candidate values exist in a user's connection graph and if so, acquires the next candidate venue from the connection graph at step S2908. Otherwise, the system 100 at step S2910 normalizes the attribute values within each property in the user personality matrix based, for example, on a maximum property attribute value for a given property. The processing at step S2910 may result in a numeric representation of a user's relative affinity for a property attribute with respect to all other attributes for that property. For example, the system 100 may determine that a particular user likes Chinese cuisine with an affinity of 0.95 with respect to all other cuisine types (e.g., American, Italian, Mexican, etc.).

Next, at step S2912 the system 100 may assign property weights based on a user's expressed affinity for a particular property with respect to all other properties in the user personality matrix. Whereas step S2910 provides a mathematical representation of user affinity for a particular property attribute with respect to other attributes in the particular property, step S2912 may provide a numerical representation indicating, for example, that an entire property field such as cuisine matters to a particular user by a value of 0.8 compared to all other properties (e.g., price, ambience, etc.). Consequently, the system 100 may assign a higher importance weight to the property field of cuisine than it would to other property fields.

Next, at step S2914 the system 100 forms the user personality matrix based on the normalized property attribute values and the assigned property weights. For illustration purposes, a non-limiting example of a user personality matrix corresponding to a given user is illustrated in FIG. 30. For simplicity, FIG. 30 illustrates property fields corresponding to restaurants; however, those of ordinary skill should appreciate that the present disclosure may easily be adapted such that user personality matrices including other property fields corresponding to other venue types may easily be determined using the exemplary methods within the scope of the present disclosure.

Referring now to FIG. 30, an exemplary user personality matrix 3000 is shown. Initially, it is noted that the format presented with respect to the user personality matrix 3000 of FIG. 30 is provided merely for illustration purposes and those of ordinary skill will appreciate that other formats may be used, such as those that may be easily adapted such that mathematical computations may be performed using, for example, processing circuitry. The user personality matrix 3000 includes an area 3002 illustrating various properties of a venue that may be derived, for example, at step S2902 of FIG. 29. Area 3004 includes various attributes corresponding to the properties of the area 3002. The property attributes and their corresponding values may be derived, for example, at steps S2902 and S2904 of FIG. 29. Additionally, the user personality matrix 3000 assumes that the attribute values have been normalized, for example, using methods described at least at step S2910 discussed for FIG. 29. The attributes and corresponding attribute values illustrated in the area 3004 represent a relative user affinity for attributes within a given property. In this example, analysis such as nodal interrelational link strength may indicate that a user has a normalized affinity value of 0.8 for American cuisine relative to other cuisines (i.e., Chinese, Japanese, Italian, and Mexican). Area 3006 includes a plurality of property weights calculated to correspond with the properties shown in the area 3002. The property weights of the area 3006 may be calculated, for example, at step S2912 of FIG. 29. The property weights of the area 3006 indicate a relative importance of a property with respect to other properties. That is, acquired user data and corresponding analysis of nodal interrelational link strength may indicate that a user strongly prefers a particular venue property relative to others. Similarly, the user data and/or nodal interrelational link strength may indicate that a user is largely indifferent to a particular venue property with respect to other properties for the given venue type. Property weight may be determined, for example, by analyzing the attribute values, such as those illustrated in the area 3004. In this case, high variability in attribute value magnitude may indicate a strong preference for a particular property relative to other properties. Conversely, low variability within attribute values may indicate that a user does not place a high importance on that particular property. For example, a user may consistently express an affinity for casual restaurants and rarely express a desire to choose formal or business attire when selecting a restaurant, as indicated by the attribute values corresponding to the attire property shown in the area 3004. Consequently, the system 100 may calculate a high property weight value corresponding to the high importance that the user places on the attire property when selecting a restaurant venue. Similarly, the same user may select venues having a high price attribute at approximately the same frequency at which he or she selects venues having medium and low price attributes. Consequently, the system 100 may calculate a low property weight of 0.2 indicating that the user places a low importance on price when selecting restaurant venues.

It is noted that while the user personality matrix illustrated in FIG. 30 corresponds to a venue type of restaurants, in certain aspects of the present disclosure user personality matrices corresponding to a plurality of venue types may be calculated such that a single user taste profile is maintained for a variety of different venue types (e.g., favorite movies, favorite restaurants, favorite schools, favorite neighborhoods, etc.). In other aspects of the present disclosure, user personality matrices may be calculated such that they are venue type specific, such as the user personality matrix 3000, which corresponds to restaurant venue types. Additionally, user personality matrices may be stored and adapted over time rather than calculating new user personality matrices for each new shared recommendation query.

Figure 31:
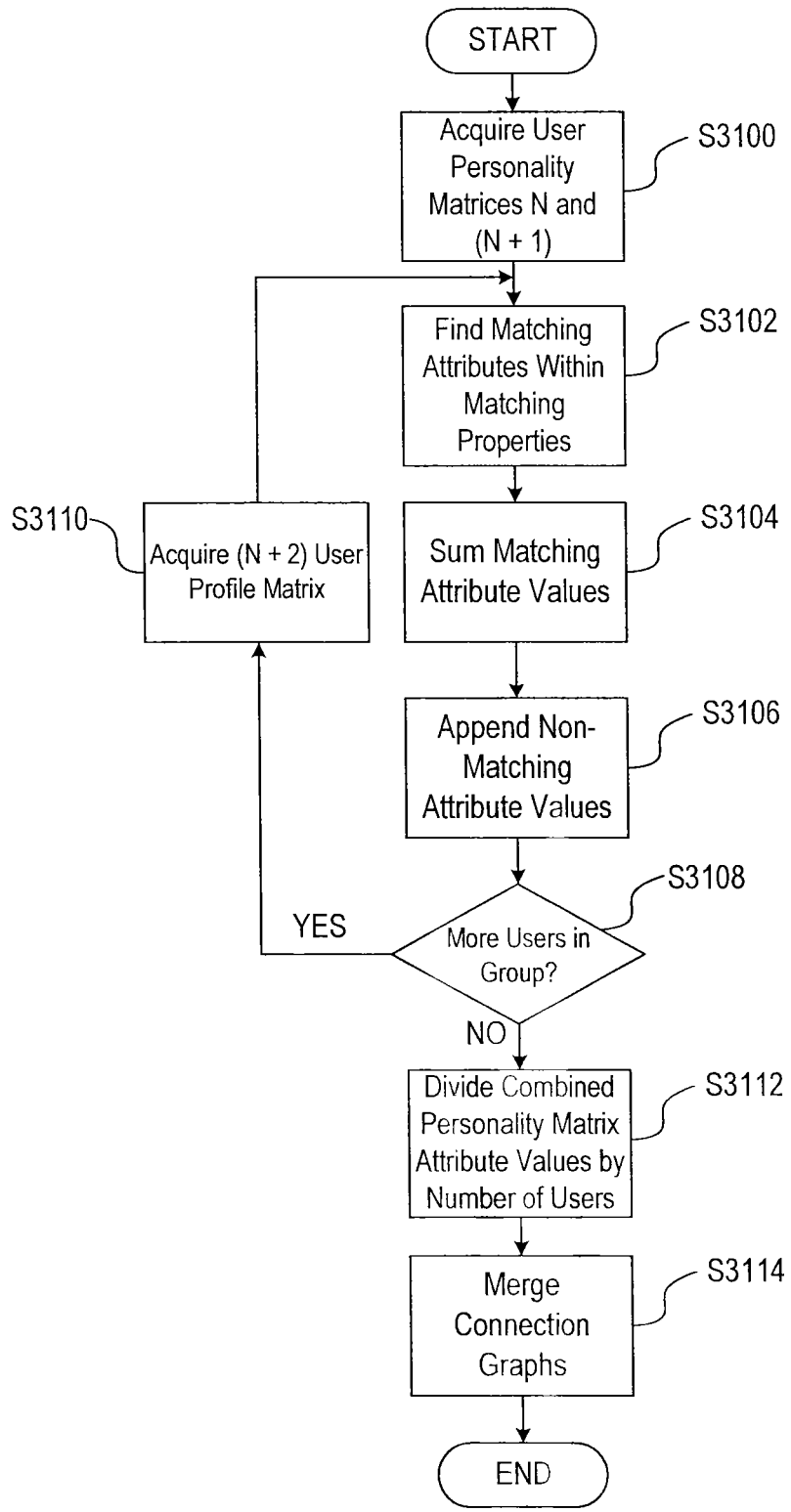
FIG. 31 is an exemplary algorithmic flow chart for calculating a combined personality matrix according to one example.

Next, FIG. 31 illustrates a non-limiting example of an algorithmic flowchart for computing a combined personality matrix. As discussed previously, a combined personality matrix may represent a unified taste profile for an ensemble of users seeking a shared recommendation. Referring now to the figure, the system 100 at step S3100 acquires user personality matrices N and N+1. In certain aspects of the present disclosure, the system 100 may set one of the acquired user personality matrices as a "base" matrix to which other user personality matrices can be merged to form the combined user personality matrix.

At step S3102, the system 100 compares the acquired user personality matrices and finds matching attributes within matching properties of a given venue. For example, the system 100 may compare two user personality matrices and determine that both matrices include a cuisine property and matching attributes corresponding to Chinese cuisine.

At step S3104, the system 100 sums matching attribute values. For example, in a case in which the above-noted users each expressed an affinity for Chinese cuisine based on their matching attributes in their respective user personality matrices, the system 100 may sum their attribute values (e.g., user 1 has an affinity of 0.5 and user 2 has an affinity of 0.7 for Chinese cuisine, resulting in a combined user affinity score of 1.2) to calculate a combined attribute value with which to include in the combined personality matrix.

At step S3106, the system 100 compares the user personality matrix N and the user personality matrix N+1 to identify non-matching attributes, and appends non-matching attribute values to the base matrix. For example, the user personality matrix N may include an "Ethiopian" attribute in its cuisine type property. The system 100 may determine that the user personality matrix N+1 does not include the Ethiopian attribute in its cuisine type property. Consequently, the system 100 may append the attribute value corresponding to the Ethiopian attribute in the user personality matrix N to the base profile at step S3106.

Next, at step S3108 the system 100 determines if more user personality matrices are available to merge into the combined personality matrix. If more user personality matrices are available, the system 100 at step S3110 acquires the next user profile (i.e., user profile matrix N+2 in this example) and performs the above-described matrix merging process in an iterative fashion until all user personality matrices for the entire group have been merged.

After aggregating the attribute values as described above, the system 100 at step S3112 divides the values in the combined personality matrix by the number of users present in the group requesting a shared recommendation. This step results in a set of attribute values representing a unified taste profile for the entire group. In certain aspects of the present disclosure, the number of users (N) may equal the number of users included (i.e., contributing a user personality matrix) in the shared recommendation processing. In other aspects of the present disclosure, the number of users N may be adjusted such that it does not equal the actual number of users included in the group requesting a shared recommendation. For example, a user's personality matrix may be included when forming the combined personality matrix; however, the number of users may be adjusted to alter the relative weight of the user personality matrices.

At step S3114, the system 100 merges the connection graphs for all users from which a user personality matrix was derived. As discussed above, the connection graph may represent all venues, such as restaurants, for which a user has previously expressed an affinity. Thus, the processing at step S3114 results in a connection graph corresponding to all venues to which all members in the group requesting shared recommendations have previously expressed an affinity, which can subsequently be used to provide candidate venues from which the recommendation engine can provide a shared recommendation. In certain aspects of the present disclosure, the recommendation engine may also determine additional candidate venues from which to provide a shared recommendation based, for example, on interrelational nodal link strengths between a venue in the merged connection graph and another "unknown" venue, information of which may be acquired by methods set forth previously (e.g., web crawling, etc.).

While the example discussed with respect to FIG. 31 may represent a case in which a fixed set of users seeks to make a shared decision using the shared recommendation process described herein, it should be appreciated that aspects of the present disclosure may be adapted such that recommendations for partners to participate in a given activity may also be recommended. For example, a group of users may seek an ideal location to go rock-climbing, and also request the system 100 provide recommendations as to other partners with which to go rock-climbing with. In this case, the system 100 may perform processing in accordance with methods set forth above to determine interrelational nodal strengths between the users making the request and the potential venues with which the users might wish to go rock-climbing. In addition, the system 100 may utilize the aforementioned processes for determining interrelational nodal strength to analyze acquired user personality matrices (e.g., downloaded from a server). Link strengths between the users initiating the requests and users corresponding to the acquired user personality matrices may be analyzed such that shared recommendations can be made as to which partners may wish to also go rock-climbing, as well as the users that the initiators making the request may share common personality traits. Shared recommendation outputs corresponding to suggestions for an activity as well as suggestions for partners to perform an activity with may be presented individually or as a package. For example, the system 100 may perform the aforementioned shared recommendation processes such that a package of multiple activities and multiple partners is presented to a user seeking to participate in an activity in a group setting.

In a similar vein, certain aspects of the present disclosure may determine how different user personality matrices match one another. For example, the system 100 may calculate that aspects of two users' personality taste profiles corresponding to their respective user personality matrices correspond (as represented by, e.g., a percentage match). The calculation may be based on, for example, shared nodes that the two users like or dislike, similarities and features of nodes that they like or dislike, and/or nodes that the two users like or dislike that are connected through other common nodes. Aspects of visually representing the degree to which user personalities (or venue features) match are described later at least in the description relating to FIG. 39.

Moreover, while the example described with respect to FIG. 31 is drawn to the case in which a plurality of user personality matrices corresponding to distinct users are merged to form a combined personality matrix, it should be appreciated that aspects of the present disclosure may be adapted such that a plurality of user personality matrices corresponding to a single user may be merged to form a combined personality matrix representing multiple "moods" of the individual user. For example, a user may express particular affinities for venues based on, for example, the time of year, the location, the time of day, the group of people with whom the person is with at the present time, or the like. Specifically, the user may express certain affinities, for example, when taking trips to certain areas of the country during certain times of year, in which case the user may wish to develop a user personality matrix representing the affinities felt during those time periods, which may represent a particular mood that the user was in at that time. Similar steps may be taken for a plurality of different occasions representing different moods of the user, in which case the plurality of user personality matrices corresponding to the user's different moods may be accumulated (and stored for later use) and blended into a composite user personality matrix representing aspects of the user's various moods. The merged user personality matrices representing different moods of the same person may be weighted towards a particular mood if the user wishes to perform shared recommendation decision-making processes weighted towards the affinities associated with that mood.

Next, FIGS. 32A and 32B provide an illustrative example of merging two individual personality matrices 3200 and 3202 to form a combined personality matrix 3204. Turning first to FIG. 32A, the individual personality matrices 3200 and 3202 include a plurality of properties and attributes with corresponding values, similar to those described above with respect to FIG. 30. Of note, the respective individual personality matrices include attribute values corresponding to each respective user's personal affinity toward those attributes. Since the users may have different affinities for the different attributes, the individual personality matrices 3200 and 3202 reflect varied values for the matching attributes across both matrices. Additionally, the individual personality matrix 3202 includes attributes "U Street" and "trendy" in the neighborhood and ambience properties, respectively. These property attributes represent non-matching attributes determined, for example, at step 3106 of the algorithmic process shown in FIG. 31.

As discussed above with respect to FIG. 31, matching attribute values in the user personality matrices 3200 and 3202 may be summed to calculate a combined attribute value representing the overall affinity for both combined users for the particular attribute. The summed attribute values corresponding to matching attributes across the matrices may then be normalized to arrive at a combined attribute value to include the combined personality matrix. Taking the cuisine property as exemplary, combined personality matrix 3204 shown in FIG. 32B illustrates that because all attribute fields in matrices 3200 and 3202's cuisine property match, the attribute values of user personality matrices 3200 and 3202 in the cuisine property field may be summed and then divided by 2 to arrive at the attribute values shown in the combined personality matrix 3204 cuisine property field. Similarly, property weights illustrated in FIG. 32A for matrices 3200 and 3202 may be summed and divided by the number of users to arrive at a combined property weight value with which to include in the combined personality matrix 3204. Regarding the unmatched attribute fields discussed above for FIG. 32A, the system 100 may append the unmatched attribute field values (i.e., the trendy attribute value of 0.3 and the U Street attribute value of 0.4) when forming the combined personality matrix 3204. The process of appending non-matching attribute field values is illustrated in the fact that the attribute values for the trendy and U Street attribute value fields are the same in the individual personality matrix 3202 and in the calculated combined personality matrix 3204.

Figure 33:
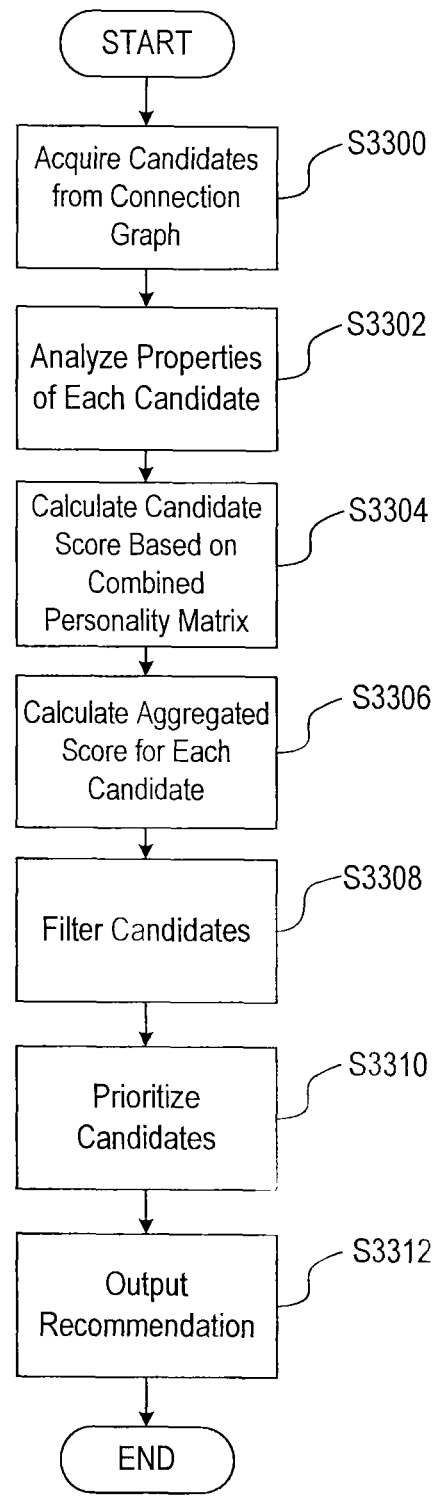
FIG. 33 is an exemplary algorithmic flowchart for determining shared recommendations according to one example.

After calculating a combined personality matrix, a set of shared recommendations for venues may be determined for an ensemble of users represented by the combined personality matrix. For example, candidate venues included in a merged connection graph and/or connected to restaurants included in the merged connection graph (e.g., based on interrelational nodal strength) may be quantitatively analyzed to determine a degree to which the set of candidate venues corresponds to the unified personality profile represented by the combined personality matrix. For example, each of the candidate venues in the connection graph may be analyzed to determine their respective properties and/or attributes, at which point a value indicating a degree to which the candidates correspond to the combined personality matrix may be calculated and a set of recommendations can be presented to the group of users (e.g., via an interface). In addition to the discussion of aspects of generating recommendations based on, for example, interrelational nodal strength, FIG. 33 illustrates a non-limiting example of an algorithmic flowchart for generating a shared recommendation for a group of users based on a combined personality matrix. It should be appreciated that any and all aspects of descriptions in foregoing sections related to generating recommendations based on user data may be incorporated into the example of FIG. 33.

Turning to FIG. 33, the system 100 at step S3300 acquires a set of candidate venues with which to provide a shared recommendation. As a non-limiting example, the candidate venues may be acquired using a merged connection graph. In addition, the candidate venues may be acquired by analyzing the merged connection graph to determine restaurants which are not included in the merged connection graph, but have a connection to the venues in the connection graph (e.g., by way of a strong interrelational nodal strength).

The system 100 at step S3302 may analyze the candidate venues to determine their various properties and/or attributes. For example, a candidate venue corresponding to a restaurant may be analyzed by the system 100 to determine its properties relating to cuisine type, attire, ambience, etc. After determining the various properties of each of the candidate venues, the associated attributes and attribute values of each property are determined by the system 100.

Once the properties and associated attributes are determined by the system 100, the system 100 at step S3304 may then calculate a candidate venue score based on the combined personality matrix. As a non-limiting example, candidate venues may be scored in relation to the combined personality matrix based on the degree to which the candidate venue "resonates" with the unified user profile represented by the combined personality matrix. Similar to the above-described case in which a venue recommendation is provided to an individual user based on interrelational links between the user and the venue, the combined personality matrix forms a hypothetical unified individual to which shared recommendations may be made. Nodal link strength between each candidate venue property and/or venue attribute may be calculated for all candidate venue properties, and attributes and an aggregated score for each candidate venue may be calculated by the system 100 at step S3306.

At step S3308, the system 100 may filter candidates based on predetermined filter criterion. For example, the system 100 may filter candidates based on the aggregated score calculated at step S3306 being below a predetermined threshold level. Additionally, filters may be set in a case in which the combined personality matrix and/or another received input indicates a strongly positive or negative affinity toward a candidate venue's property and/or attributes. For example, a group of users may request a shared recommendation that is limited to only a certain set of neighborhoods, cuisine types, and price ranges. In other aspects of the present disclosure, the system 100 may determine that a candidate venue should be excluded from any shared recommendation due to, e.g., a user represented in the combined personality matrix having a medical condition and/or a religious belief that would automatically exclude such a venue from any actual decision made by the group. In certain aspects of the present disclosure, candidate venues may be immediately filtered as an input to the recommendation engine to improve processing efficiency. For example, a candidate venue may be precluded from merging to a connection graph in response to receiving an input indicating a particular candidate venue and/or a particular venue type should be excluded from shared recommendations. Further aspects of filtering are described in later sections (at least at FIG. 34 and the related discussion thereto).

After calculating an aggregated score for each candidate venue and filtering out unwanted candidate venues from the shared recommendation process, the system 100 at step S3310 prioritizes the unfiltered candidates based on their aggregated score. For example, the system 100 may rank candidate venues from high to low aggregated score. In other aspects of the present disclosure, the system may segregate prioritized candidate values. For example, the venues may be ranked with respect to a given property (e.g., highest scored restaurants in a neighborhood). A candidate list of venues may be generated prior to or after filtering and/or prioritizing the venues, and the candidate list may be received as an input to the recommendation engine 112 for generating shared recommendations of venues.

After prioritizing the unfiltered candidate venues, the system 100 at step S3312 may then provide a shared recommendation output. In certain aspects of the present disclosure, the system 100 outputs a single candidate venue as a shared recommendation that best resonates with the group of users participating in a shared recommendation processing. In another aspect of the present disclosure, the system 100 may output a subset of candidate venues that have aggregated scores above a predetermined threshold. In further aspects of the present disclosure, subsets of the candidate venues output as shared recommendations may be selected by the users participating in the shared recommendation processing using a voting system. In further aspects of the present disclosure, the system 100 may utilize user data and/or predetermined inputs indicating that a particular user should have a higher weight when making shared recommendations (further exemplary aspects of weighting shared decision making according to user weights is discussed at least in the discussion relating to FIG. 35).

In combination with, or alternatively, with respect to the recommendation processing described above calculating overall scores and outputting prioritized shared venue recommendations, the recommendation processing described herein with respect to various link strengths can be used in selected embodiments to provide recommendations to the user based on the final filtered and/or prioritized set or the final set of venues each having an overall score. As such and in selected embodiments, the processing described herein with respect to determining a set of candidate venues, scoring them based on a combined personality matrix, and identifying a final prioritized and filtered set and overall scores, provides the recommendation engine 112 with a smaller sample set of venues from which it will make recommendations based on link strength. In this embodiment, recommendations are made based on link strengths rather than overall score with respect to weighting values. Accordingly, if a user requests a search by providing a venue to which he has an affinity, the recommendation engine 112 will only provide recommendations based on overall link strengths with respect to the venues identified and ranked in the final filter set. The final prioritized and filtered set and/or overall scores of each venue in the final set may therefore, in selected embodiments, be used to identify the final set of venues to which the recommendation engine 112 will use to provide recommendations based on overall link strength as previously described herein. Further, based on the final filter set, the recommendation engine 112 may provide recommendations out of this set relating to venues of which have the strongest link strength to user attributes.

Figure 34:
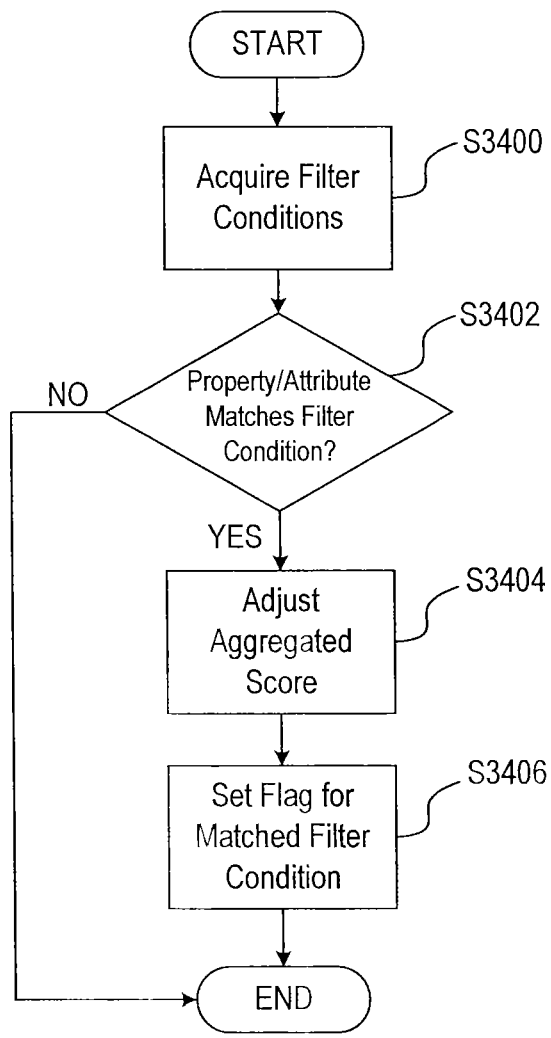
FIG. 34 is an exemplary algorithmic flowchart for filtering candidate venues according to one example.

Next, FIG. 34 illustrates a non-limiting example of an algorithmic flowchart for filtering candidate venues, such as in the processing related to step S3308 of FIG. 33. Referring now to FIG. 34, the system 100 at step S3400 acquires filter conditions with which to use in shared recommendation processing. In certain aspects of the present disclosure, the filter conditions used in shared recommendation processing are defined by the users participating in such processing. For example, a group of users participating in shared recommendations may define a set of criteria with which to focus the search when providing shared recommendations. That is, the users may define a focus area or search to limited venue properties and/or attributes, such as only searching low cost venues, only searching certain cuisine types, or only searching for venues in certain locations. In other aspects of the present disclosure, venue candidates may be explicitly identified for exclusion by the users. For example, a venue which may or may not be included in the merged connection graph may be identified by a user or users such that the identified venue candidate is excluded from being provided as a shared recommendation. In other aspects of the present disclosure, user data indicative of previous actions of one or more of the users may be acquired and utilized to generate filter conditions for shared recommendation processing. For example, user data acquired using methods set forth above may indicate that a user in a group has seen a particular movie, in which case that movie may be excluded from being provided as a shared recommendation because the user who has seen the movie is unlikely to want to see the movie again. Similarly, user data that is acquired and/or inputs received, for example, in a shared recommendation interface may eliminate certain properties and/or attributes from shared recommendation processing. For example, a shared recommendation interface may provide a filter condition section with which users may select filter conditions when performing shared recommendation searches. For example, a user may indicate a particular allergy to a certain food, in which case properties and/or attributes that are associated with the food allergy would be identified and any venue candidates corresponding to those identified properties and/or attributes would be excluded from shared recommendation processing.

Next, at step S3402 the system 100 compares the acquired filter conditions with the set of candidate venues and determines whether attributes and/or properties corresponding to the candidate venues match one or more of the filter conditions. In the case in which an attribute or property of a candidate venue matches a filter condition, the system 100 at step S3404 adjusts the aggregated score corresponding to the matched candidate venue. As a non-limiting example of adjusting the aggregated score of the candidate venue, the system 100 may add a high magnitude negative value to the aggregated score. Magnitudes of values that may be added to the score should be selected so as to ensure exclusion based on the nature of the calculation/processing. Alternatively or in addition to adjusting the aggregated score of a candidate venue, similar processes can occur at the user personality matrix such that the combined personality matrix is heavily weighted by the user's expressed negative affinity for a particular venue property and/or attribute. For example, when calculating a user's personality matrix, the system 100 may identify that the user routinely responds negatively to a particular property and/or attribute based on user data acquired as set forth above. Such analysis may trigger a "negative blocker" that is set in the user personality matrix such that the property and/or attribute to which the user has an expressed negative affinity is excluded from shared recommendation processing. Alternatively, or in addition to the processing described with respect to step S3404, a "flag" may be set in either the user personality matrix or the combined personality matrix (or in another memory area of the system 100) to indicate that a candidate venue should be excluded from shared recommendation processing. For example, the system 100 may set a bit indicating that a particular candidate venue property should be excluded.

In certain aspects of the present disclosure, the system 100 may preclude all filtered candidate venues from being output as a shared recommendation, for example, in a user interface. Such processing in essence results in candidate venues being filtered in background processing such that the users participating in shared recommendation process are unaware that the candidate venue was filtered. In other aspects of the present disclosure, candidate venues that do trigger filter conditions may be included in prioritized shared recommendation outputs, but identified as a venue that should likely be excluded as a potential candidate in the decision making process. This allows users participating in shared recommendation processing to make an informed decision as to whether or not the venue should be excluded as a possible decision. For example, in the case in which a user's acquired user data indicates recently viewing a particular movie, users participating in shared recommendation processing in order to determine a movie that all the users in the group would enjoy may receive a prioritized recommendation output that includes the movie recently seen by the user. The movie may be identified (e.g., highlighted or otherwise demarked in a user interface) such that it is easily discernible that the venue (i.e., the movie) should likely be excluded from the decision making process. However, in the case in which the user highly enjoyed the movie and would like to see the movie again, the group of users may also appreciate the previously viewed movie being included in possible shared recommendations for decision making.

Figure 35:
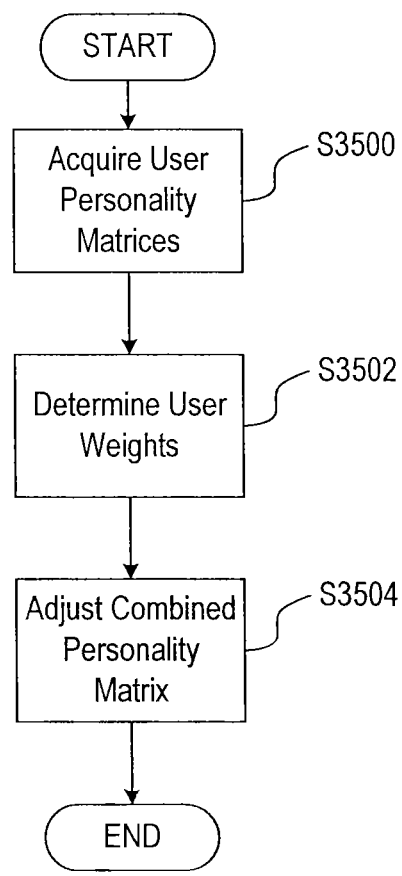
FIG. 35 is an exemplary algorithmic flowchart for applying user weights to shared recommendations according to one example.

Next, aspects of utilizing user influence weights when executing shared recommendation processing is illustrated in the exemplary algorithmic flowchart of FIG. 35. It is noted that the exemplary process illustrated in FIG. 35 can be performed before or after merging user personality matrices to form a combined personality matrices. For example, aspects of FIG. 35 may be incorporated into step S3310 of FIG. 33 and/or into the exemplary process shown in FIG. 31.

Referring now to the figure, the system 100 at step S3500 acquires the user personality matrices corresponding to all users participating in the shared recommendation decision making process. At step S3502, the system 100 determines user weights corresponding to each of the users in the group. In certain aspects of the present disclosure, the user weights used in shared recommendation processing may be determined as received inputs, for example, from a user interface. For example, the user interface may include features allowing members of the group to indicate a particular occasion corresponding with the group decision. The indicated occasion may, for example, correspond to a user in a group's birthday, in which case the user may be provided with a higher influence user weight (i.e., 3× normal) than would otherwise be afforded that particular user. Additionally, the user interface may allow for excluding one or more users of the group in the decision-making process, such as when a user may desire to withhold influence from a shared recommendation process so that the other members of the group can happier with the outcome. In other aspects of the present disclosure, the system 100 at step S3502 may obtain user data utilizing methods set forth above, in which case the user data may indicate certain features of the users within the group that can be used to calculate user weights. That is, different "strengths of influence" over the group decision can be afforded to particular users based on acquired user data. As a non-limiting example of features which may be used to assign strengths of influence over a group decision, the system 100 may analyze acquired user data to determine relative relationships within the group, such as family hierarchy, social rank, or other group dynamics such as an individual's propensity to be difficult or otherwise picky when making a decision.

After determining user influence weights at step S3502, the system at step S3504 may adjust values in the combined personality matrix based on the determined user weights. That is, the calculated combined personality matrix may be weighted to more closely resemble one or more user's user personality matrix. In certain aspects of the present disclosure, a weighting factor may be used to weight an individual's user personality matrix during the calculation of the combined personality matrix. In this case, values in the user personality matrices may, for example, be multiplied by a weighting factor that is based on the determined user weights such that when the group members' individual user personality matrices are merged (e.g., as in FIG. 31), the resultant combined personality matrix is weighted towards the users with the higher weighting factors (similar to calculating a weighted average). Similarly, negative weighting factors may be used to exclude a user personality matrix from the decision/shared recommendation process. In this case, the number of users assumed when forming/calculating the combined personality matrix may need to be adjusted, such as in the case of step S3112 of the exemplary processing illustrated in FIG. 31. Alternatively or in addition to adjusting values within the combined personality matrix to account for user weights in a decision-making process, aggregated candidate venue scores, such as those calculated at step S3306 of FIG. 33, may be adjusted based on user weight. For example, system 100 may adjust the aggregated score to weight nodal linkage strengths towards a particular user's user personality matrix.

Exemplary User Interfaces

Aspects of shared recommendation processing discussed in the foregoing sections naturally lend themselves to real-time computations for determining a set of shared recommendations given a set of restrictions across multiple users. For example, a group of users may combine taste profiles corresponding to their respective user personality matrices, set specific filters within combined taste results based on their current preferences, and obtain a dynamic list of results calculated in real time that fits the taste profile of the entire group within specific categories.

Figure 36:
FIG. 36 illustrates an exemplary user interface according to one example.

FIG. 36 provides a non-limiting example of a user interface for performing shared recommendation processing. Turning to the figure, the exemplary user interface 3600 includes an area 3602, an area 3604, an area 3606, and an area 3608. The area 3602 may be provided such that a user may, e.g., select other users that should be included in a shared recommendation process for a group decision. User personality matrices from the selected users may be used when forming combined personality matrices. In certain aspects of the present disclosure, the pool of users displayed in the area 3602 may, for example, be derived from a social network, in which case the system 100 may query the social network to determine a set of potential users that may form the inputs of the combined personality matrix. In other aspects of the present disclosure, the pool of users displayed in area 3602 may, for example, be derived from a user's contact list stored in a memory.

The areas 3604 and 3606 displayed in the user interface 3600 include various attributes that may be selected for a particular property. In the case of the area 3604, the attributes correspond to different cuisine type properties (i.e., French, American, Japanese, and Italian cuisines). In the case of the area 3606, a user is prompted to select a location property from four attributes, which in this example are neighborhoods in a predetermined location (i.e., Penn Quarter, Dupont Circle, Atlas District, and Chinatown). In certain aspects of the present disclosure, the properties and/or attributes shown in the areas 3604 and 3606 may, for example, be derived as prioritized properties and/or attributes that a particular user has shown the strongest affinity for, based on derived user data. For example, a user may display the user interface 3600 on their personal mobile device, in which case the system 100 may analyze user data and/or the user's personality matrix in order to display attributes and/or properties that the user has shown the strongest affinity for in the past (in this case cuisine and location).

The area 3608 includes various filters that may be applied during shared recommendation and/or decision making processing. As discussed previously, the exemplary filters shown in the area 3608 may be applied during shared recommendation processing such that candidate venues are filtered from the processing and therefore, would not be displayed as recommendations in response to any shared recommendation request from a user. As a non-limiting example of FIG. 36, member 1, member 2, and member 4 may wish to obtain a shared recommendation for lunch. After selecting the members in the area 3602, the user may wish to limit the shared recommendation processing such that lunch recommendations are only provided for French and American restaurants in the Penn Quarter and Atlas District neighborhoods. Accordingly, the corresponding attributes of French, American, Penn Quarter, and Atlas District are selected in the areas 3604 and 3606, and the shared recommendation processing proceeds under these limitations. The user may select additional filters in the area 3608, such as limiting the price of the American and French restaurants in the given neighborhoods to only moderately or low priced restaurants. In response to receiving this request for a shared recommendation given the aforementioned limitations, the system 100 may carry out shared recommendation processing to form the respective user personality matrices for the plurality of members requesting the shared recommendation, merge the user personality matrices to form a combined personality matrix for the users, and determine candidate venues based on the combined personality matrix while excluding all candidate venues that do not fit the stated criteria selected in the user interface 3600.

Figure 37:
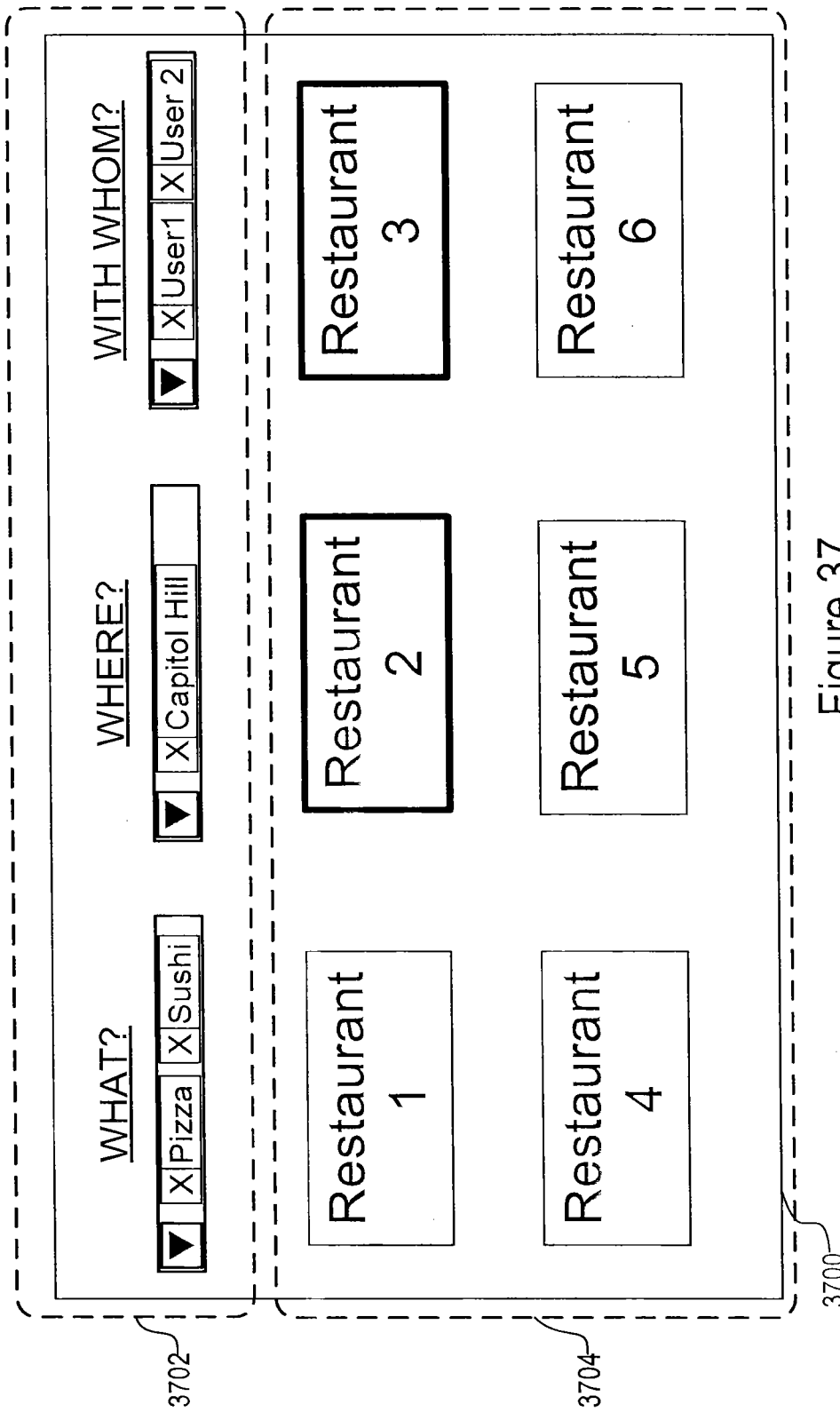
FIG. 37 illustrates an exemplary user interface according to one example.

Next, FIG. 37 provides another non-limiting example of a user interface 3700 that may be utilized when performing shared recommendation processing to improve decision making in a group dynamic. The exemplary user interface 3700 includes an input area 3702, which provides a universal search bar to perform a targeted shared recommendation process. In the example of FIG. 37, the universal search bar of the input area 3702 queries the user with questions of what, where, and with whom a user would like to perform a certain activity. For example, a user may request a shared recommendation to make a decision amongst a first user 1 and a second user 2. The users 1 and 2 may desire a recommendation for pizza and/or sushi restaurants in Capitol Hill. In response to receiving the request for the restaurants, the system 100 may, for example, perform the shared recommendation processing set forth in the above methods, and provide a list of recommendations in the area 3704. The example of FIG. 37 illustrates six restaurant recommendations, but it should be appreciated that the present disclosure may be adapted such that any number of restaurant recommendations may be made. For example, the system 100 may provide a single recommendation that best corresponds to the query limitations provided in the area 3702 and the combined personality profile of the user 1 and the user 2. Once the list of prioritized shared recommendations are displayed in the area 3704, users may then select one or more restaurants that may interest the user (e.g., Restaurant 2 and Restaurant 3 have bolded frames), and in response to the selections the system 100 may, for example, display further information regarding the restaurant, such as menus, hours of operation, reservation availability, etc. Aspects of the present disclosure may also allow users to make reservations and invite other users once a decision has been made as to which restaurant will be selected.

Figure 38:
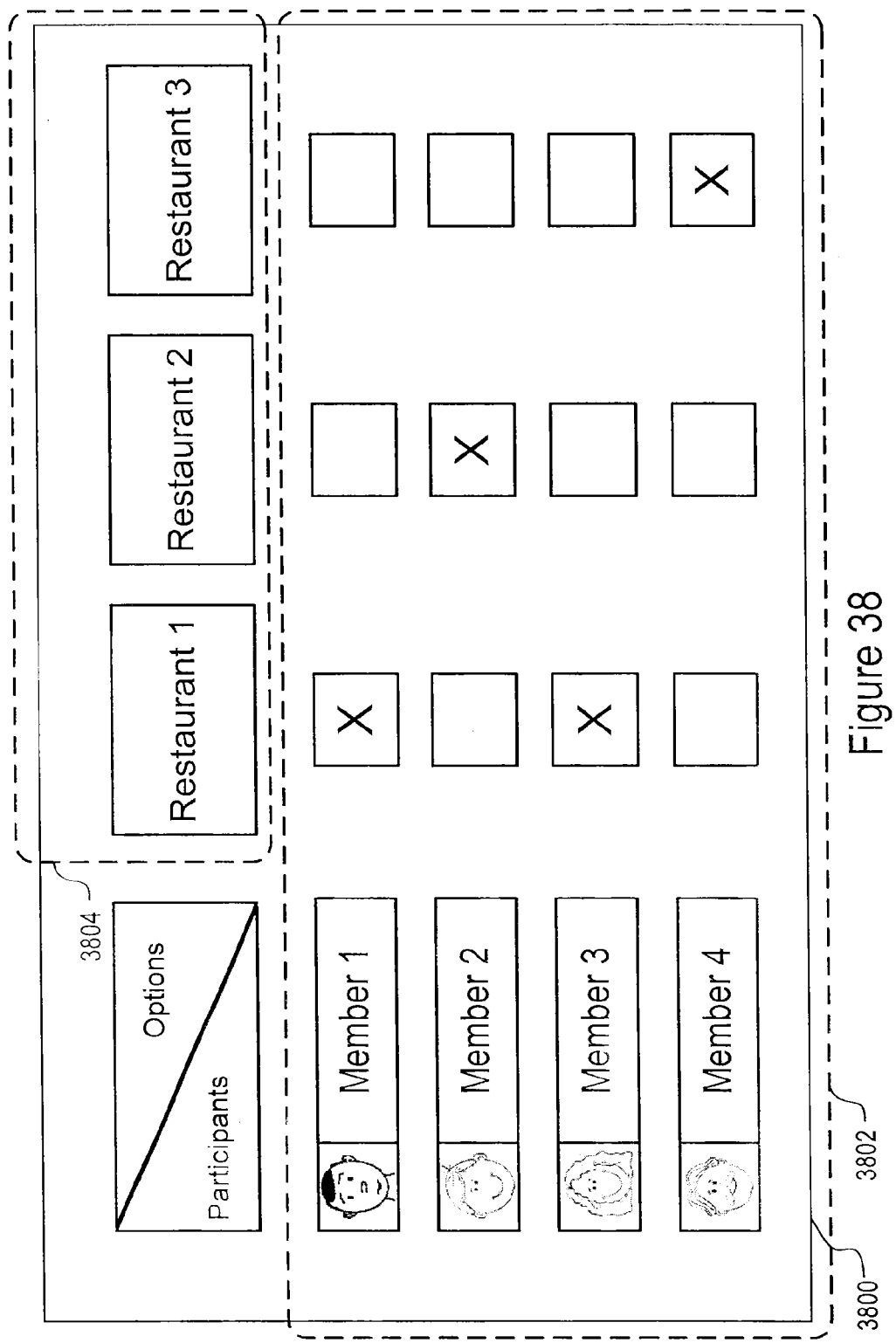
FIG. 38 illustrates an exemplary user interface according to one example.

Next, FIG. 38 provides a further non-limiting example of a user interface that may be utilized to perform aspects of the shared recommendation processing set forth by the above-described methods. The figure shows an exemplary user interface 3800, which includes an area 3802 and an area 3804. In this example, the members 1 through 4 may, for example, query the system 100 to provide restaurant recommendations with which to make a shared decision. In response to the query for a shared recommendation for restaurants, the system 100 may output prioritized recommendations based on processing set forth in methods described above. The area 3804 shown in FIG. 38 may be used to provide the highest ranked prioritized restaurants. In this example three restaurants are shown, however it should be appreciated that any number of restaurants may be output as potential recommendations with which to make a group decision. The system 100 may be configured to receive an input from the user interface 3800 corresponding to "votes" for the various restaurants displayed in the area 3804. This feature may allow the members 1 through 4 to vote on the restaurants recommended by the shared recommendation processing described above. Votes for each of the restaurants displayed in the area 3804 may be tallied, and a restaurant decision may be made based on, for example, the restaurant receiving the highest number of votes. User voting may, in certain aspects of the present disclosure, be stored for future recommendations based on selection history.

Figure 39:
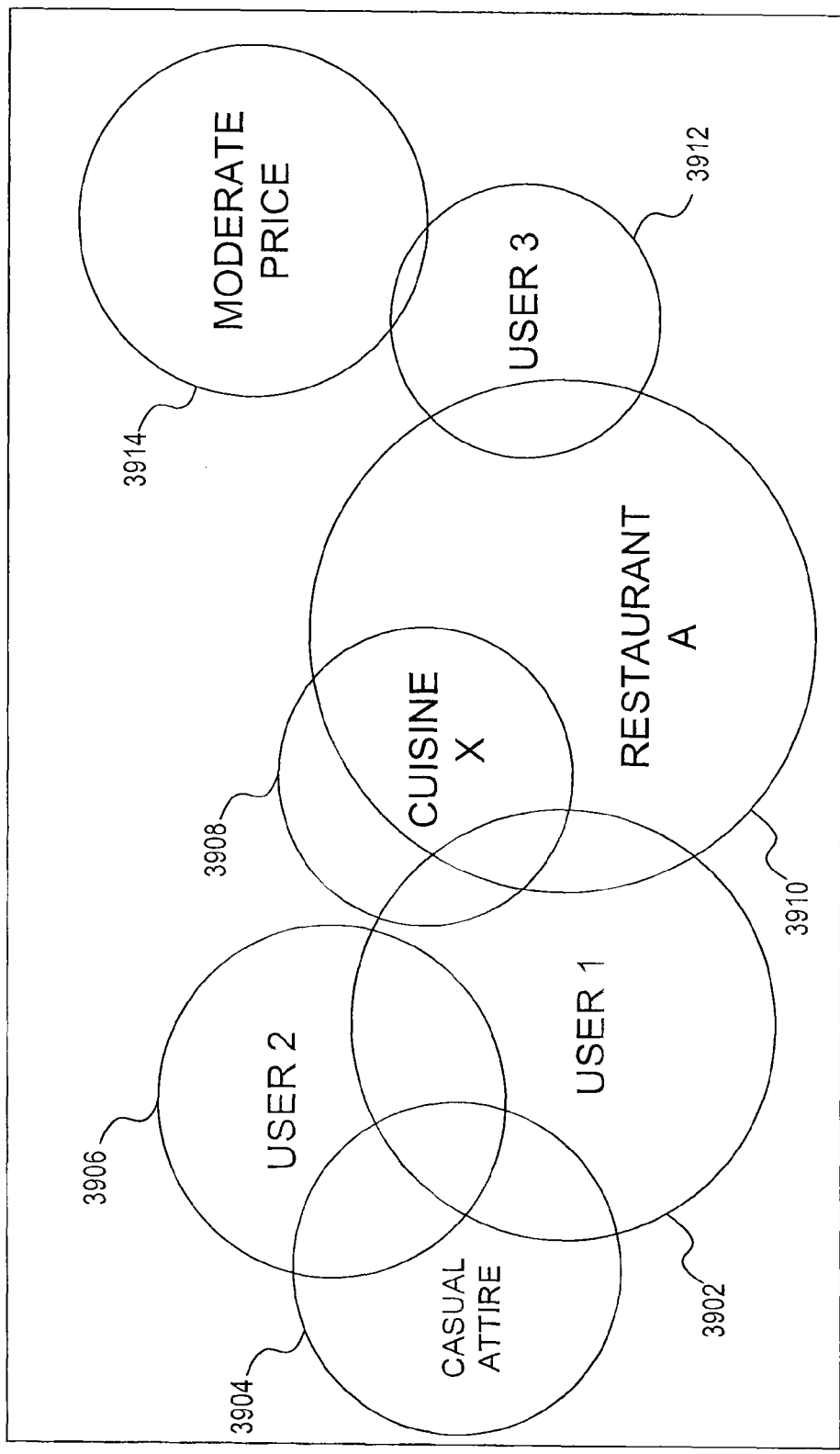
FIG. 39 illustrates an exemplary user interface according to one example.

Next, FIG. 39 provides another non-limiting example of a user interface that may be utilized for performing the shared recommendation processing set forth in the present disclosure. In certain aspects of the present disclosure, the exemplary user interface of FIG. 39 may provide a visual representation of shared affinities in a network of friends. In other aspects of the present disclosure, the exemplary user interface of FIG. 39 may provide a visual representation of nodal connections between venues that may be utilized as candidates for performing shared recommendation processing. The exemplary user interface 3900 shown in FIG. 39 displays a plurality of nodes 3902 through 3914. The nodes 3902 through 3914 may, in certain embodiments, represent users making a shared recommendation query to the system 100. In other aspects of the present disclosure, the nodes 3902 through 3914 may represent candidate venues, venue properties, and/or venue attributes, which may be used in the shared recommendation processing set forth by the present disclosure. The user interface 3900 may represent nodal interrelationships as overlapping nodes, such as in the case of nodes 3902 and 3904. Second and higher order inter-relational relationships may be represented in the user interface 3900, such as in the case in which two nodes do not necessarily overlap with each other but share a common overlapping node (e.g., nodes 3902 and 3904 overlap, and nodes 3902 and 3908 overlap, which may represent a second order connection with nodes 3904 and 3908). In other aspects of the present disclosure, nodal size and/or color may be used to distinguish similarities between nodes. For example, stronger shared affinities between users as represented by the combined personality matrix may be represented using bolder colors, for instance. As another example, a stronger affinity may be represented by a larger node size in the user interface 3900.

While the foregoing examples illustrate a case in which a group of users desires a shared recommendation to pick an ideal restaurant for that group of people, it should be appreciated that the present disclosure is not limited to selecting restaurant venues. As will be appreciated by one of ordinary skill, aspects of the present disclosure may easily be adapted such that other venue selections and/or shared decisions can be made. Specific examples of adapting aspects of the present disclosure to perform shared recommendation processing on non-restaurant venues include selecting clothing options based on a user personality matrix corresponding to a celebrity where the recommendations are still partially fitting with the taste of the user making the query. Further, aspects of the present disclosure may be adapted to, for example, select a balanced movie or TV show for a family movie night, search real estate for roommates or newlyweds based on their joint tastes, select a roommate for college students based on traits and tastes, creating travel packages for families or couples, selecting an activity for a group of people from a broad set of categories, selecting a college that will optimize a set of traits fitting with a student's abilities, selecting a specific business/political/military strategy by harmonizing computing interests, selecting areas to explore (e.g., mining, space exploration, etc.), and selecting a group that can work well together based on similar traits of thought patterns and/or decision making styles.

Illustrative Implementation

One illustrative system implementation consistent with the foregoing teachings is discussed below. The discussion is generally organized into four sections: content collection, content organization, personalization and user interface.

The purpose of the Content Collection system is to perform 3 steps:
1) identify "objects" (venues, events, and other instances of interest to the user),
2) find/match electronic pages with deep information on those objects (object characteristics, reviews, associations with other objects), and
3) retrieve pages into the storage system.

The objects to be retrieval in this example constitute any set of web pages based on objects of interest. The objects may be selected based on category, filters for a particular category and the content sources that are targeted.

This type of retrieval can in turn be broken up into several Content Modes. Content Mode 1 is called "Global Grab." In this mode, the system seeks to identify and retrieve information on every object in a category (e.g., "all restaurants in San Diego"). In Content Mode 2, Keeping Current, the system seeks to focus the collection on either (i) refreshing stale information on old objects, or (ii) identifying new objects that just arose for old categories. In Content Mode 3, known as Intelligent Browsing, the system seeks to have the data search update itself dynamically based on its real-time discoveries, to "zoom in" and focus on specific trends and objects.

One type of Global Grab is spidering. This is a conventional method used by Internet search engines according to which the system downloads the page of a content provider's site, scans that page for links to other pages on the site, and then downloads those pages. By repeating this process an entire site can be covered. The system can also implement paginated searches in which the system actively seeks, for example, page 1 of a term like "Restaurants," then page 2, and so on.

A second type of Global Grab is crawling. Sometimes it is desirable not to have to get pages directly from a content site, such as where the site blocks automated indexing. In this case one can replicate the structure of a site from the cache of a search engine, which crawl and cache every page as a "second copy" of the internet. Here, the system uses a search engine to search for the URL of interest. Usually, the URL will be included in the first result, along with a "Cached Page" link to the cached copy of the page. The system can then download the link listed in the "Cached Page," which is the same as the original page. The system can then scan that page for links to other pages on the site, and repeat the process for those pages.

A third type of Global Grab involves getting a list of all objects and then finding them within a site. This is a method designed to be more holistic than spidering, to ensure that every single object of a category is retrieved from a given site if available. First, a complete list of target objects is created, such as by crawling an internet directory like Yellowpages.com for "restaurants in San Diego." Then the system will have the complete list of objects for which data is desired. The next step is to search for each of these objects in turn in a search engine, restricting the search to the pages from the target website. Different combinations of data extracted from the internet directory can be used to seed the search query, and usually the business name, metro name, and phone number are useful ways to lock onto the object on the target site.

The search engine will retrieve pages that match these search query parameters on the target site of interest. Usually one of the first few pages in the results is the correct match. By repeating this search engine and retrieval process for every object in the Internet directory, the system is likely build a complete replica of the target site's data on that category.

A fourth type of Global Grab involves third-party crawlers. It is contemplated that third party services will crawl the web and make the results of those crawls available for purchase. In this case, the first step of the global grab methodology is simplified because the system can query the service for every page arising from a certain set of websites. If such third party services also make the pages available for retrieval then the speed of the crawl is increased.

Turning to Content Mode 2, Keeping Current, it is assumed that the system has completed a global grab and has data on all objects for a given category. The task then becomes staying current, or up to date, with the objects as their data changes. New objects can be introduced, such as when restaurants open. Old objects can become outdated, such as when restaurants close. Data on objects can change, such as when the hours of operation or menu items change. New and old objects can be identified by doing a crawl on global directories (which is fast) and then focusing in on any changes to the list of objects. Alternatively, the system can discard old data and then run a new global grab. Finally, the system can rely on "update notifications" which can be acquired in several forms: (i) some websites focus on these changes, such as "listings of new restaurants" in local papers, (ii) many content provider APIs will notify of openings and closings of sites, (iii) URLs and webpage titles will often receive a "CLOSED" stamp which can be rapidly screened. Each datum collected by the system is tagged with an expiration date, based on the type of the data (events expire immediately, restaurants may need to be refreshed every few months to check for major changes). Data that has expired can have associated pages re-retrieved for freshness. The re-retrieval process is simplified because the URL is already known.

Content Mode 3, Intelligent Coordinated Retrieval, involves "eating nodes," or retrieval computers, that can coordinate their searches based on real-time events to optimize content gathering in response to mass user behavior. In this implementation the retrieval computers are given "write" access to the retrieval queue. If the retrieval computers identify a trend that is similar to their original target, but stronger, the retrieval computers can recruit other computers to look more deeply at this phenomenon by writing the new target (or a set of targets within a target area) onto the retrieval queue. Retrieval computers can also interact intelligently in the collection process by alerting each others if a lead turns out to be faulty, and is indicative of more faulty leads (for example, if a region of a site is covered with spam or stale data). In this case, the retrieval computer(s) can scan the queue and delete similar jobs on the queue so that future computers don't devote resources to exploration of a lower value target area. In this way, different search nodes again inform one another about what they learn by virtue of the shared queue to help guide their collective search.

Turning next to matching objects to content pages, whenever the system is gathering data from target websites on an object of interest, the system should ensure that the data on the target site is actually referring to the object of interest. This is especially true when attempting to cross-reference objects across different sites. The system optionally utilizes a "likelihood of match" score to make this determination, taking into account multiple variables. For example, if the system is trying to match a venue on two different sites, the fact that they have the same phone number or address may tend to indicate that they are the same venue. Numeric identifiers on consistent scales are particularly valuable for this purpose, such as phone numbers, UPC symbols, and latitude/longitude. Non-numeric identifiers (strings) such as addresses can also be used, and one can check the similarity of the two sites' addresses by taking a Hamming distance on the characters, or parsing out each one's street number, street name, etc.

Data is cross-referenced across multiple sites by using data from one site to choose objects to find on another site, then use the steps discussed above to find new content pages from those objects on a different site.

A fleet of retrieval computers may be created by building each from scratch programmatically. Each computer is resurrected from a disk image, such as an Amazon Machine Image (AMI). The AMI is loaded as an elastic computing node on Amazon's EC2 (elastic cloud computing) or other service using standard libraries written in Java. The AMI is armed with everything that the computer will need, including a Java runtime environment, the capacity to communicate with a central version control repository such as Git, etc. The AMI is also armed with a startup script that runs when the EC2 node is born, and receives user parameters passed to the EC2 node at birth. The user parameters to the startup script tell it where to download the latest code instructions for the node, such as the URL of an S3 location, or the URL of a Git repository. The startup script is armed with the credentials to access the latest code instructions, and load the code onto the new EC2 node. Every EC2 node in the fleet downloads similar instructions, so they are all prepped around a common task. These instructions tell it how to connect to the message queue with the URLs to retrieve, and also how to go about the retrieval process. Each one then launches the downloaded code (runs the JAR file, etc) and thus begins working. Finally, each computer in the fleet is assigned its own IP address (via Amazon's Elastic IP system, etc) so that they can be throttled by content sites independently from the other nodes and work in parallel.

Tasks are distributed amongst the fleet of retrieval computers by using a list of URLs (usually long, millions) of pages that the system wants to retrieve. This list might be a text file, database table, or other simple serial storage system. The goal is to distribute those URLs among the many computers. This process is best implemented through a queue service that lives independently from all the retrieval computers. As an example, Amazon offers the Simple Queuing Service (SQS) in which every URL is stored as a string message on the queue. Thus, the queue retains a memory of which URLs still are to be crawled. Each computer in the fleet can query the queue for the next item to be crawled. The queue then assigns the item to a particular retrieval computer, and marks the item as "locked" so that other retrieval computers do not also try to work on the item. Meanwhile, the system monitors whether the retrieval computer completes the task in a timely manner. If the retrieval computer does not check back with the queue to say that the job is done, then the queue restores the item to "unlocked" so that other computers can perform the task. Once a computer checks back with the queue and informs it that the task has been completed the queue removes the item from the queue. Thus, a workflow is established that can be shared between an arbitrary number of retrieval computers where they can operate simultaneously to work through a list of retrieval tasks.

Pages are retrieved by all computers in the fleet. Each retrieval computer is already armed with a URL to retrieve by taking the message from the messaging queue. The computer then executes a function to stream the contents of the remote file (webpage, etc) into memory (in PHP, file_get_contents; in Java, url.openStream( ); etc). The computer then saves this file to the global storage system (see below). With respect to rate of repetition, it should be noted that no single computer hits a given content source too rapidly. Therefore, each computer is "throttled" to only complete one page request every 0.1-10 seconds. The use of third party crawlers, discussed above, may obviate the need to throttle in this manner. Every page request is checked to determine if it succeeded, and if failure occurs, a longer interval is used before the next attempt. The system can implement different schedules for the interval rollback, such as an exponential rollback.

The global storage system may be a distributed storage platform (Amazon S3, etc). In the case of Amazon S3, data is stored in buckets that are accessible from any computer as a URL. Each retrieval computer stores the contents of the retrieved file in a repository folder on S3 (or other service) as a file path string which is also URL. The file can thus be retrieved at a later date by entering the storage system URL. Access to these repository folders is private so that they can only be accessed by the system's Content Collection and Content Organization systems.

Turning now to content organization, the aim is to take content collected from the Internet and organize it for access through the Interface. The input may be a hard drive directory of the latest set of collected web pages. The output may be the data uploaded to a large-scale (but highly organized) database. The output may be generated by repeating the following process: 1) find a page, 2) parse the page for info, 3) match the page to an object in the database, and 4) update the database.

Another computer fleet may be deployed to organize the content. As noted above in the case of retrieval computers, content organization computers may be replicated by building them from scratch programmatically. Each computer is resurrected from a disk image, such as an Amazon Machine Image (AMI). The AMI is loaded as an elastic computing node on Amazon's EC2 (elastic cloud computing) or other service using standard libraries written in Java. The AMI is armed with everything that the computer will need, including a Java runtime environment, the capacity to communicate with a central version control repository such as Git, etc. The AMI is also armed with a startup script that runs when the EC2 node is born, and receives user parameters passed to the EC2 node at birth. The user parameters to the startup script tell it where to download the latest code instructions for the node, such as the URL of an S3 location, or the URL of a Git repository. The startup script is armed with the credentials to access the latest code instructions, and load the code onto the new EC2 node. Every EC2 node in the fleet downloads similar instructions, so they are all prepped around a common task.

Every computer in the Content Organization fleet receives 2 pieces of information (which it is programmed to seek out using in its boot instructions): 1) the storage space location of the code instructions to be its brain, 2) the location address of the job queue where it will receive the material to be processed. The system controls the Content Organization fleet by creating and managing the content organization process. The system defines the storage directory of all the pages that need to be organized. The system thus turns this directory into a list of jobs, where each job is a file to be processed. The system then creates a task queue (see below), loads that queue up with the tasks, and sets the properties of the queue to determine the time allotted for task completion before tasks are recalled and given to other computers.

The task queue may be implemented using Amazon Simple Queue Service (SQS) or some other service that is external to individual computers. The system loads up the job queue with a list of pages that need to be organized. Each item in the queue is a URL address in global storage space to a page that needs to be organized. The goal is to distribute those URLs among the many computers. The queue allows computers to take URLs, and retains a memory of which URLs still must be organized. Each computer in the fleet can query the queue for the next item to be crawled. The queue then assigns the item to the computer, and marks the item as "locked" so that other computers do not also try to work on the item. Meanwhile, the system monitors the queue to determine whether the computer completes the task in a timely manner. If the computer does not indicate to the queue that the task is done within the allotted time the queue restores the item to "unlocked" so that other computers can take the task. Once a computer checks back with the queue to say that it has completed the task, the queue removes the task from the queue. Thus, a workflow is established that can be shared between an arbitrary number of computers where they can operate simultaneously to work through a list of retrieval tasks.

The global storage system for the Content Collection fleet may be a distributed storage platform (Amazon S3, etc.). In the case of Amazon S3, data is stored in buckets that are accessible from any computer as a URL. Each retrieval computer stores the contents of the retrieved file in a repository folder on S3 (or other service) as a filepath string which is also URL. The file can be retrieved at a later date by entering the storage system URL. Access to these repository folders is restricted so that they can only be accessed by the system's Content Collection and Content Organization systems.

The system may utilize the following global structure for document namespaces: date_retrieved/data_format/content_provider/city/category/. For example: 2011-07-07/xml/google/boston/restaurants/. However, depending on the source of the crawl, the raw data files may not even be organized into this directory structure yet. In this case the crawl results should be sorted into files that are organized according to this structure.

To sorting raw crawl results, the system first inspects all the files retrieved during Content Collection and sort them according to the objects that they represent. One way to do so is inspect the URL of the crawl. The URL will disclose the content provider, the city/metro area, and category. For sites where this cannot be computed from the URL, the data can be extracted from elsewhere in the file (address field, etc.) The date of the crawl can be retrieved from the stored file's metadata. The crawl result file (or part of the crawl result file) that applies to the extracted object can then be saved in the directory structure described above. In this manner, all of the raw crawl results are placed in an organized directory structure to facilitate the subsequent organization to the database.

The queue is loaded by accessing the storage system directory where the sorted documents are located (see above). The system then spiders this directory to uncover the list of all files within that directory and its sub-directories. The system then creates a job queue (described above) to hold the list of files to parse. Next, the system uploads to the queue a list of file locations (URLs to the files), as an array of messages, to the queue. At this point the queue is loaded with a set of files to be parsed and organized.

Every time a computer in the fleet goes to the queue and retrieves a sorted page to organize, it first analyzes the following information from the URL: the "data format", which determines how to read the file's data; the "content provider", which determines which page parser to apply; and the "category", which determines what type of object to extract. The computer already has in its memory all of the different parsers that it downloaded when it was deployed. The computer picks one out based on the content provider and data format, and runs it on the file. Input is the file itself and the output is a data object in memory with values extracted from the file and stored in fields.

Every time a computer parses a file, and stores its data object in memory, the data is next added to the database. First, the computer has to identify the object's location in the database. This is accomplished by selecting the database table (in Amazon, a domain) based on the category of the object, and locating the row of the object by using, in descending order: i) the unique id of the object from the content provider (for example, restaurant id on local.yahoo.com), ii) another unique numerical identifier, such as the phone number, and iii) name, address, and latitude/longitude fuzzy matching. If the determined entry does not already exist, the computer creates a new row. The computer then runs an update on that row, updating every attribute (field) in a single database hit for efficiency. This is repeated for every sorted page that the computers come across in the queue, until all of the sorted pages have been organized into the database.

Next, the system personalizes the content by generating a neural network architecture that connects objects in the world as nodes within a network. The system activates a subset of the nodes based on what is known about the user's affinities. The activations are followed through the network to deduce what else the user will like.

The neural network may be implemented as follows. Connections TO a node a stored as a list of {N1, W1, N2, W2, ... } where the connected nodes N are paired with their weights W. This list is saved in the database in the same row as the other properties of the node. Optionally, a list of connections FROM the node can also be stored. Subsets of nodes to be activated are identified by user-provided data regarding likes and dislikes. Users may be required to answer regarding their "favorites" in different categories. Users may also provide feedback on recommendations that they are given, which can be either binary (approve or disapprove) or they can be continuous (e.g., 1 to 10, or −10 to 10). The system assembles a list of "positive activation nodes" and assign an activation level, which were either favorites (e.g., 10H activation) or feedback-driven (e.g., 1-10H activation). Similarly, the system assembles a list of "negative activation nodes" and assigns an activation level (e.g., −1H to −10H).

Connections are established by, for every node in the user's list, accessing in the database the set of common co-occurrences with that object on the web. The system retrieves this list of objects and builds connections from our node to those objects with five positive synapses each.

Connections also may be based on feature similarity. For every node in the user's list, the system identifies nodes with similar properties. For the category to be matched, the system takes the most salient properties (e.g., for a restaurant, price, cuisine and ambiance) and searches the database for other restaurants that match that feature set. Each match generates two positive synapses.

Connections also may be established based on cross-visitation. For every node in the user's list, the system identifies nodes that have been cross-visited by other users. These users can be users of the system (e.g., users of a subscription service associated with the system) or activity elsewhere on the Internet about which the system has data. This may be accomplished by indexing the reviews and responses to all nodes. The system identifies strong responses to the node of interest, identifies the users that furnished those responses, and identifies other nodes to which those users had similarly strong responses. The system can connect those nodes to our node of interest, with one positive synapse for every similar response.

Negative synapses can facilitate the recommendation process by factoring in what the user does not like and the things that are not like things that the user does like. Both of these associates involve negative synapses, which add richness to the representation. For example, the system can identify strong responses to the node of interest, identify users that made those responses, and identify other nodes to which those users had opposite strong responses. Alternatively, the system can identify nodes that the user did not like, identify other people who did not like that node, identify nodes that those people did like and positively link those nodes to our user's preferences.

Sometimes the network may exhibit "runaway connectivity" where something gets more connected, which then gives it an advantage in getting further connected (e.g., more co-occurrences) which in turn tends to generate even further connections. Therefore the system may normalize connectivity by inspecting the list of existing connections to a node, determining their total value (e.g., # connections N.times.average weight W), and in the event that total value exceeds some threshold, divide all of the connection weights by a constant value to bring them back into range. This may be repeated for all nodes. Normalization alternatively can be accomplished by dividing based on the N*W term going TO the node, dividing based on the N*W term coming FROM the node, dividing by the total N*W term across the network. The implementation for this may involve reading the list of node weights in the database, performing the normalization on those weights, and writing the new weights back to the database.

The addition of a new synapse connecting nodes can also immediately impact other connections. Upon adding the connection to the list, the other connections to that node can be "taxed" by an amount equal to the inverse of their proportion of the new connection's strength—that is, adding a +1 synapse then taxes the other 10 synapses already on that node by $\frac{1}{10}=0.1$. When synapses become so weak that they are below a certain threshold (either through interaction taxing or through normalization), then they are removed (deleted from the list).

Connections from node to node can be constantly analyzed, updated and consolidated to take into account patterns that emerge between nodes. As a simple example, if A forms a strong link to B, and A forms a strong link to C, then a connection can be consolidated linking B and C. Such patterns can be searched for using specialized scripts that check the database entries for such patterns, and then write back consolidation changes to the affected nodes' lists.

The result of all of these processes is a rich information base that accurately links a huge variety of nodes to a user's established nodes of interest, with a significant dynamic range, and with substantial retrieval efficiency.

To retrieve the list of nodes related to a user, the system need only then "activate" the user's established nodes, and follow their connections to retrieve more nodes that if connected sufficiently strongly will also activate, and depending on the initial activation strength follow those connections to further nodes until the activation peters out with each connection hop depending on the connection strength. The connection strength is therefore the inverse of the resistance to the propagation of the activation through the network.

The total list of nodes that was effectively activated by this process (recommendation set) can then be stored in a list that is linked to the user in the database, for retrieval with a single database call whereupon the list can be cross-referenced against a set of presented results. Optionally, different sub-lists can be stored for different categories, or different presentation scenarios, caching the results for fast personalization.

The user interface may comprise i) a set of HTML files that define the look and feel of the web interface, with design elements styled using cascading style sheets (CSS), iii) a server-side set of scripts that dynamically generate those HTML files using a backend scripting language (PHP, etc) running on a web server (Apache, etc.), iii) a client-side set of scripts and interface libraries that allows rich user interaction within the browser (Javascript, jQuery, etc.), and iv) a backend database that provides the data to the web application (Amazon SimpleDB, etc.).

The functionality of the user interface includes permitting the user to create an account and log in using secure credentials that are verified against an encrypted user table in our backend database. The interface also allows a user to browse objects and see whether they are recommended or not. The interface allows a user to filter those objects by city, by category, and then by a host of properties pertinent to those categories. The user can enter feedback on their recommendations by clicking on thumbs up/thumbs down or other feedback mechanisms. The interface allows a user to drag and drop recommendations onto a "being considered" area where they can be compared across different parameters using sortable headers, etc. The interface allows a user to drag an object onto their calendar in order to "action" it by going to the object at a certain time. The interface allows a user to build events, such as "My New York City Trip" where the user can create a group of restaurants, hotels, and other opportunities that have been recommended. The user can enter notes about their recommendations to remind themselves of various impressions, for example. The user can print out a copy of itineraries for their events, or email those itineraries to themselves. Their calendar is also synchronized with the global calendar on their smart phones, etc. The user can share their recommendations with others, or build events and share those with others.

The interface may be delivered via a scalable cloud architecture. Web servers run as Linux CPU nodes on Amazon's elastic cloud computing (EC2) system. Web servers receive independent IP addresses using Elastic IP or other IP address mediators. Web servers are monitored for load, and users are dynamically distributed among the servers. Excessive user load trips a threshold which leads to the creation of more EC2 nodes. When user load drops too low, that trips a threshold which leads to the delete of EC2 nodes to save cost.

A list of all recommended objects is pre-computed for the user. When the user requests objects via the interface, the system simply checks to IDs of those objects prior to presentation to see whether the objects appear on the recommended list or not. In another iteration, the personalization is computed in real time with no pre-cached list of recommended objects. In this example, as objects were going to be presented through the interface, they are run through the personalization engine at that moment to compute if they are recommended or not.

In some examples, the server and/or client device (e.g. desktop computer or smart phone) are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as an LCD (liquid crystal display) monitor or screen for displaying information to the user and, in the case of a desktop computer, a keyboard and a pointing device such as a mouse or a trackball by which the user provides input to the computer.

In various implementations, the client device is a smart phone such as that described in U.S. Pat. No. 7,966,578, entitled "Portable Multifunction Device, Method, and Graphical User Interface for Translating Displayed Content," assigned to Apple, Inc., which is incorporated herein by reference.

The server functionality described above is optionally implemented in a computer system that includes a back-end component, such as a data server, or that includes a middleware component, such as an application server or an Internet server, or that includes a front-end component, such as a client computer having a graphical user interface or an Internet browser; or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

Obviously, numerous modifications and variations of the present disclosure are possible in light of the above teachings. It is therefore to be understood that within the scope of the appended claims, the invention may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable processing circuits configured to execute program code and/or computer instructions to execute the functions, processes and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It must be noted that, as used in the specification and the appended claims, the singular forms "a," "an," and "the" include plural referents unless the context clearly dictates otherwise.

The invention claimed is:

1. A method comprising:
receiving, at at least one server, attribute data for a plurality of users, the attribute data relating to a plurality of attributes of the plurality of users and to one or more items for which the plurality of users has an affinity;
receiving, at the at least one server, item data for a plurality of items, the plurality of item including the one or more item for which the plurality of users have the affinity, the item data relating to a plurality of attributes of the plurality of item;
accessing, via the at least one server, a data network comprising nodes corresponding at least to the plurality of item and the plurality of users, and further comprising links between said nodes, each link reflecting a strength of an interrelationship between at least two nodes;
calculating, at the server and from the data network, user personality profiles for at least a first user and a second user of the plurality of users;
calculating, at the server and from the user personality profiles, a combined personality profile by calculating one or more composite link strengths representing a combination of data relating to link strengths from the user personality profiles;
determining, at the at least one server and based on the one or more composite link strengths and at least one item attribute, one or more recommended items that have the strongest links to the combined personality profile;
generating, at the at least one server, recommendation data comprising at least one recommended item of the one or more recommended items; and
serving to a client device the recommendation data for display on a screen of the client device.

2. The method according to claim 1, wherein the plurality of items include at least one of restaurants, hotels, and theaters.

3. The method according to claim 1, wherein the item data includes categorical property descriptors and corresponding property attributes for the plurality of items.

4. The method according to claim 1, wherein:
the user personality profiles include data relating to the link strength between the at least first and second users, and
the calculation of the combined personality profile includes calculating one or more composite link strengths representing a combination of the data relating to the link strength between the at least first and second users.

5. The method according to claim 4, wherein the recommendation data includes at least one recommended user of the plurality of users.

6. The method according to claim 1, wherein the calculation of the combined personality profile is a function of a mathematical blending of the data relating to the link strengths from the user personality profiles.

7. The method according to claim 1, further comprising:
determining, at the at least one server, a candidate list of items based on the combined personality profile, wherein
the candidate list of items includes at least one of the one or more items for which the at least first and second users have the affinity and additional items sharing a nodal interrelationship with the one or more items for which the at least first and second users have the affinity.

8. The method according to claim 1, wherein
at least a plurality of the link strengths are a function of at least the item data.

9. The method according to claim 8, further comprising:
calculating, at the at least one server and as part of the user personality profiles, weights corresponding to the at least first and second users' affinity for each item attribute of the one or more items for which the at least first and second users have the affinity; and
determining, at the at least one server and based at least on the weights, an overall score for each item attribute in the at least first and second users' user personality profiles.

10. The method according to claim 9, wherein the weights are calculated based on the attribute data for the at least first and second users.

11. The method according to claim 9, wherein the weights are calculated based on the link strength between the at least first and second users.

12. The method according to claim 9, wherein the weights are calculated based on the attributes of the one or more items for which the at least first and second users have the affinity.

13. The method according to claim 9, wherein the overall scores in the at least first and second users' user personality profiles are combined to generate the combined personality profile.

14. The method according to claim 8, further comprising:
receiving, at the at least one server, filter conditions corresponding to at least one of the one or more items for which the at least first and second users have the affinity and the one or more item attributes of the one or more items for which the at least first and second users have the affinity.

15. The method according to claim 14, further comprising:
adjusting, at the at least one server and based on the filter conditions, at least one of the user personality profiles, the recommendation data, and the combined personality profile.

16. The method according to claim 1, wherein
calculating the one or more composite link strengths includes applying a predetermined function to the data relating to the link strengths in the user personality profiles.

17. The method according to claim 1, wherein
wherein at least a plurality of the link strengths are a function of both content-based and collaborative interrelationships between the nodes in the data network.

18. The method according to claim 1, further comprising
receiving, at the at least one server, review data for the plurality of items, the review data reflecting an affinity of a plurality of reviewers for the plurality of items, wherein
the data network further comprises nodes corresponding to the plurality of reviewers, and
at least a plurality of the link strengths are further a function of the review data.

19. The method according to claim 1, wherein
the plurality of items include at least one of media content, consumer products, events, and experiences.

20. A method of providing recommendations on a client device, the method comprising:
transmitting, from the client device to at least one server, attribute data for a plurality of users, the attribute data relating to a plurality of attributes of the plurality of users and to one or more items for which the plurality of users has an affinity;
transmitting, from the client device to the at least one server, a recommendation request;
receiving, from the at least one server based on the recommendation request, recommendation data identifying one or more recommended items, each recommended item being selected based on at least one item attribute and the strength of a nodal interrelationship between a plurality of items and a combined personality profile; and
displaying, on a screen of the client device, the recommendation data identifying the at least one recommended item, wherein
the nodal interrelationships are developed within a data network comprising nodes corresponding at least to the plurality of items that includes the one or more items for which the plurality of users have the affinity and the plurality of users, and further comprising links between said nodes, each link reflecting a strength of an interrelationship between at least two nodes,
the combined personality profile is calculated based on user personality profiles calculated from the data network for at least a first user and a second user of the plurality of users, and
the combined personality profile represents a combination of data relating to link strengths corresponding to the item data of the one or more items for which the at least first and second users have the affinity.

21. The method according to claim 20, wherein:
the user personality profiles further include data relating to the link strength between the at least first and second users, and
the combined personality profile further represents a combination of the data relating to the link strength between the at least first and second users.

22. The method according to claim 21, wherein
at least a plurality of the link strengths are a function of at least the review data and the item data.

23. The method according to claim 22, wherein:
the at least one server calculates weights corresponding to the at least first and second users' affinity for each item attribute of one or more items, of the plurality of items, for which the at least first and second users have the affinity, and
the at least one server determines, based on the weights, an overall score for each item attribute in the at least first and second users' user personality profiles.

24. The method according to claim 23, wherein the overall scores in the at least first and second users' user personality profiles are combined when calculating the combined personality profile.

25. The method according to claim 22, further comprising:
- transmitting, from the client device to at the at least one server, filter conditions corresponding to at least one of the one or more items for which the at least first and second users have the affinity and the one or more item attributes of the one or more items for which the at least first and second users have the affinity, wherein
- the at least one server adjusts, based on the filter conditions, one or more of the user personality profiles, the recommendation data, and the combined personality profile.

* * * * *